(12) United States Patent
Atarashi et al.

(10) Patent No.: US 7,298,721 B2
(45) Date of Patent: Nov. 20, 2007

(54) SINGLE-CARRIER/DS-CDMA PACKET TRANSMITTING METHOD, UPLINK PACKET TRANSMITTING METHOD IN MULTI CARRIER/DS-CDMA MOBILE COMMUNICATION SYSTEM, AND STRUCTURE OF DOWNLINK CHANNEL IN MULTI CARRIER/DS-CDMA MOBILE COMMUNICATION SYSTEM

(75) Inventors: Hiroyuki Atarashi, Yokohama (JP); Sadayuki Abeta, Yokosuka (JP); Koichi Okawa, Yokohama (JP); Takehiro Ikeda, Yokosuka (JP); Mamoru Sawahashi, Yokohama (JP); Fumiyuki Adachi, Sendai (JP)

(73) Assignee: NTT DoCoMo, Inc., Tokyo (JP)

( * ) Notice: Subject to any disclaimer, the term of this patent is extended or adjusted under 35 U.S.C. 154(b) by 781 days.

(21) Appl. No.: 09/926,257

(22) PCT Filed: Feb. 2, 2001

(86) PCT No.: PCT/JP01/00750

§ 371 (c)(1),
(2), (4) Date: Jan. 4, 2002

(87) PCT Pub. No.: WO01/58072

PCT Pub. Date: Aug. 9, 2001

(65) Prior Publication Data

US 2002/0159470 A1    Oct. 31, 2002

(30) Foreign Application Priority Data

| Feb. 2, 2000 | (JP) | ............................. 2000-025766 |
| Feb. 25, 2000 | (JP) | ............................. 2000-050231 |
| Mar. 22, 2000 | (JP) | ............................. 2000-081051 |

(51) Int. Cl.
*H04B 7/216* (2006.01)
(52) U.S. Cl. ....................... 370/335; 370/342
(58) Field of Classification Search ................ 370/335, 370/342, 336, 347

See application file for complete search history.

(56) References Cited

U.S. PATENT DOCUMENTS 4,870,408 A    9/1989 Zdunek et al.

(Continued)

FOREIGN PATENT DOCUMENTS

CA    2182429    2/1997

(Continued)

OTHER PUBLICATIONS

K. Toshimitsu, et al., Technical Report of IEICE, vol. 93, No. 93, pp. 19-24, "The Spread Slotted Aloha System With Channel Load Sensing Protocol", Jun. 1993 (submitting English Abstract and English translation only).

(Continued)

*Primary Examiner*—Chi Pham
*Assistant Examiner*—Thai Hoang
(74) *Attorney, Agent, or Firm*—Oblon, Spivak, McClelland, Maier & Neustadt, P.C.

(57) ABSTRACT

The present invention provides a single carrier/DS-CDMA packet transmission method wherein a predetermined time slot is assigned to reservation demand packet transmission in regard to a spreading code, and the reservation demand packet and data packets are time-multiplexed for transmission. An uplink packet transmission method in a multi-carrier/DS-CDMA mobile communication system is also provided, wherein frames are set up in each communication channel of a subcarrier, time slots which are time-segments of the frames are set up further, and a mobile station spreads a packet to be transmitted by a spreading code and the information signal is transmitted to a base station in a predetermined time slot. A downlink channel configuration in a multi-carrier/DS-CDMA mobile communication system is further provided, wherein a plurality of communication channels assigned to each of a plurality of subcarriers are divided for every predetermined time frame, and multiplexed, and the plurality of the communication channels assigned to each subcarrier include a common-control channel used by a plurality of users in common, and communication channels peculiar to each user.

11 Claims, 52 Drawing Sheets

U.S. PATENT DOCUMENTS

| | | | |
|---|---|---|---|
| 5,867,764 A * | 2/1999 | Williams | 725/125 |
| 5,883,899 A | 3/1999 | Dahlman et al. | |
| 6,018,528 A | 1/2000 | Gitlin et al. | |
| 6,049,536 A | 4/2000 | Ariyoshi et al. | |
| 6,078,572 A | 6/2000 | Tanno et al. | |
| 6,259,724 B1 * | 7/2001 | Esmailzadeh | 375/143 |
| 6,269,088 B1 * | 7/2001 | Masui et al. | 370/335 |
| 6,396,868 B1 * | 5/2002 | Yoon et al. | 375/146 |
| 6,693,952 B1 * | 2/2004 | Chuah et al. | 375/140 |
| 6,791,994 B1 * | 9/2004 | Young et al. | 370/436 |

FOREIGN PATENT DOCUMENTS

| | | |
|---|---|---|
| EP | 0 297 062 A1 | 12/1988 |
| EP | 0 680 168 A2 | 4/1995 |
| EP | 0 652 650 A2 | 5/1995 |
| EP | 0 765 056 A1 | 3/1997 |
| EP | 0 920 226 | 6/1999 |
| EP | 0 936 832 A1 | 8/1999 |
| EP | 0 939 508 A2 | 9/1999 |
| EP | 0 954 124 A2 | 11/1999 |
| JP | 1-117607 | 5/1989 |
| JP | 6-504894 | 6/1994 |
| JP | 7-303090 | 11/1995 |
| JP | 9-55693 | 2/1997 |
| JP | 9-233051 | 9/1997 |
| JP | 9-327072 | 12/1997 |
| JP | 9-327073 | 12/1997 |
| JP | 10-135928 | 5/1998 |
| JP | 11-505392 | 5/1999 |
| JP | 11-164367 | 6/1999 |
| JP | 11-243380 | 9/1999 |
| JP | 2000-224231 | 8/2000 |
| WO | WO 93/10600 | 5/1993 |
| WO | WO 96/37079 | 11/1996 |

OTHER PUBLICATIONS

3$^{rd}$ Generation Partnership Project 2, 3GPP2, C.S0002-0, Version 1.0, pp. i-xxxviii and 1-1 to 3-151, "Physical Layer Standard for CDMA2000 Spread Spectrum Systems", Jul. 1999.

* cited by examiner

FIG. 4
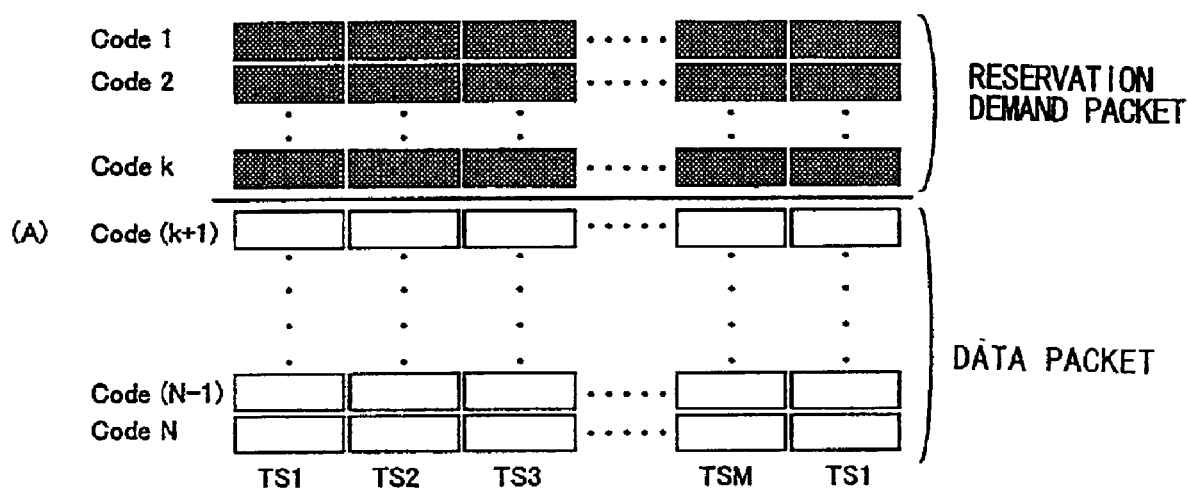
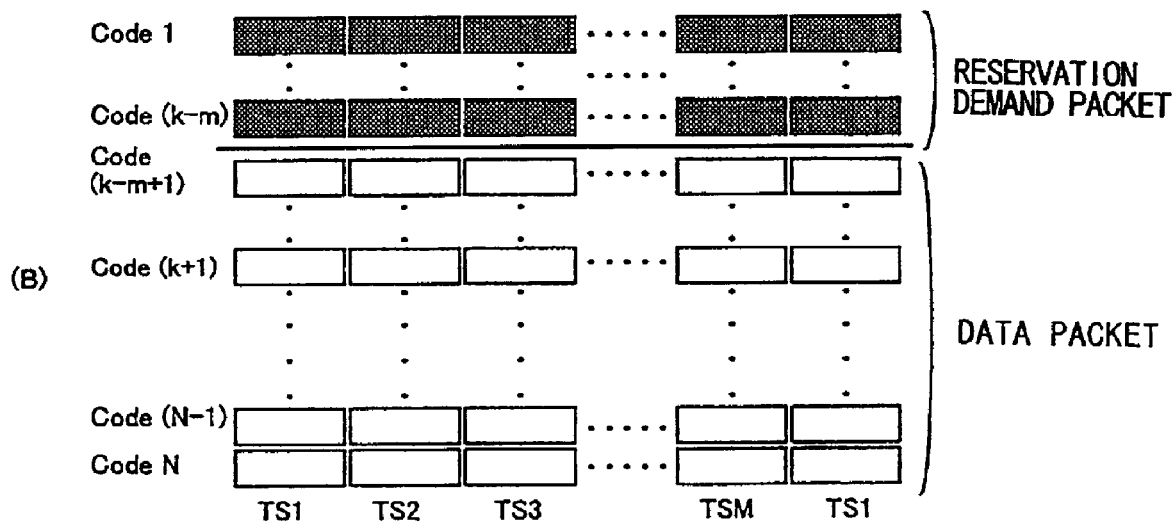

NUMBER OF AVAILABLE SPREADING CODES FOR RESERVATION DEMAND PACKET
RESERVATION DEMAND PACKET TRANSMISSION ADMISSION PROBABILITY

FIG. 10
(A) 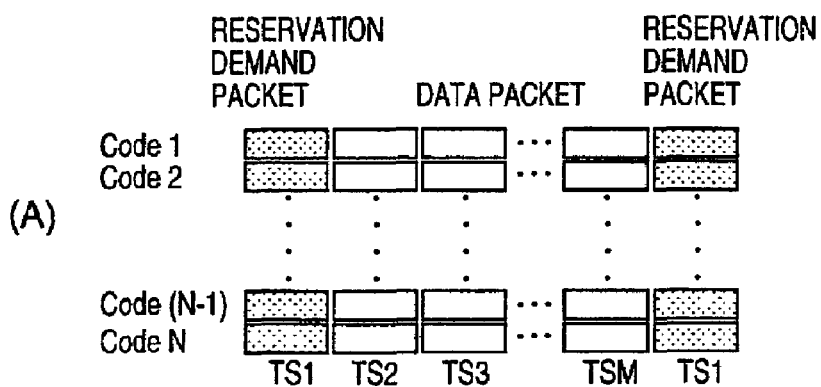
(B) 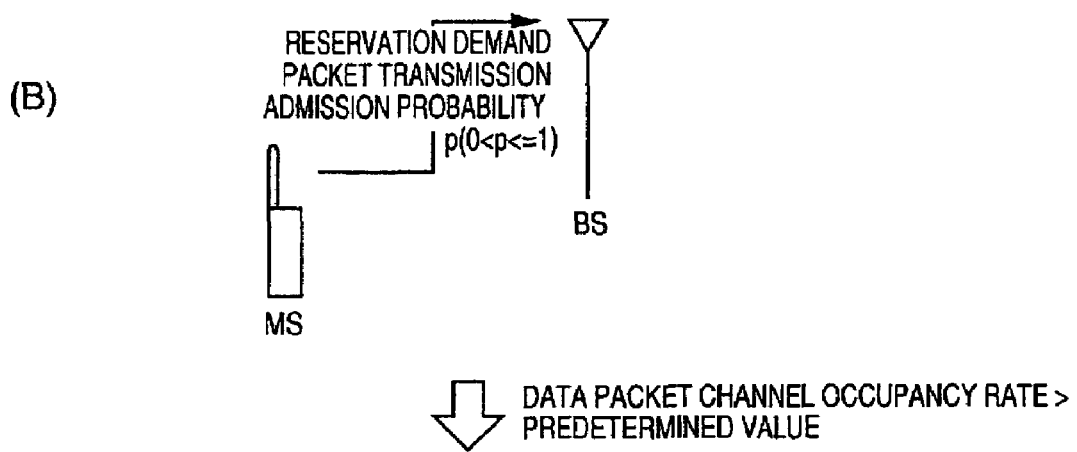
(C) 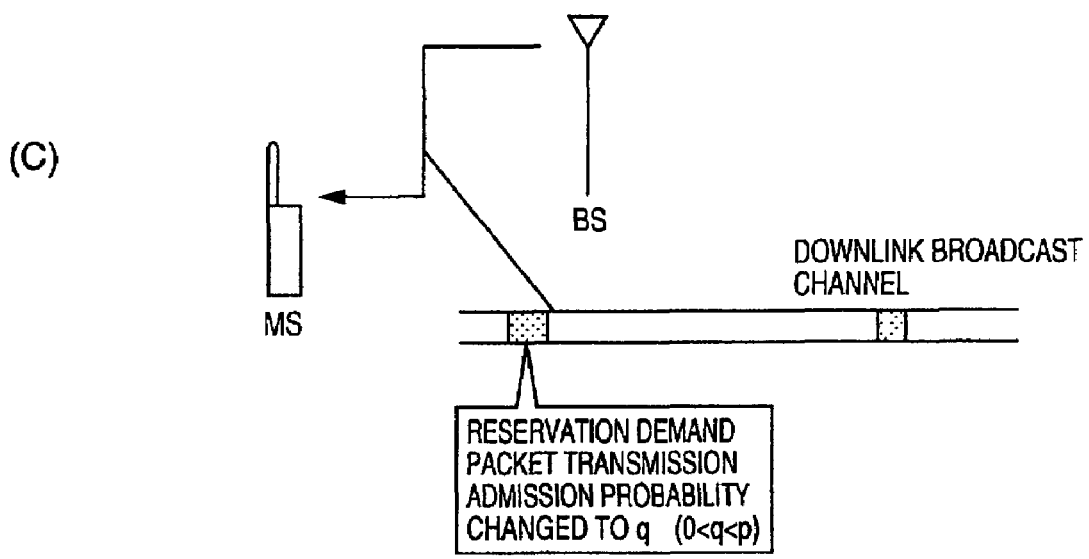

FIG. 11
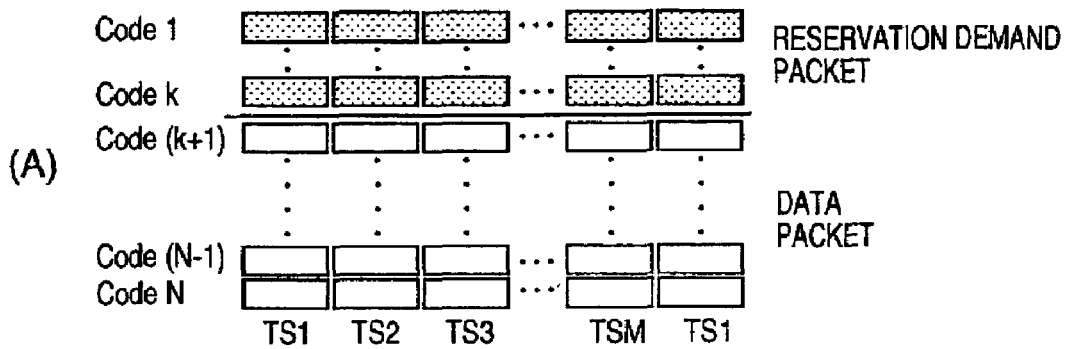
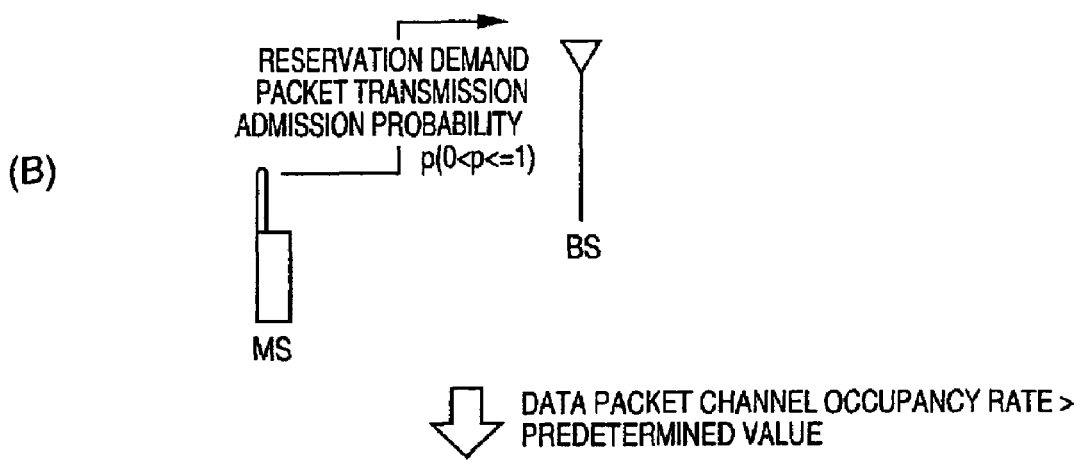
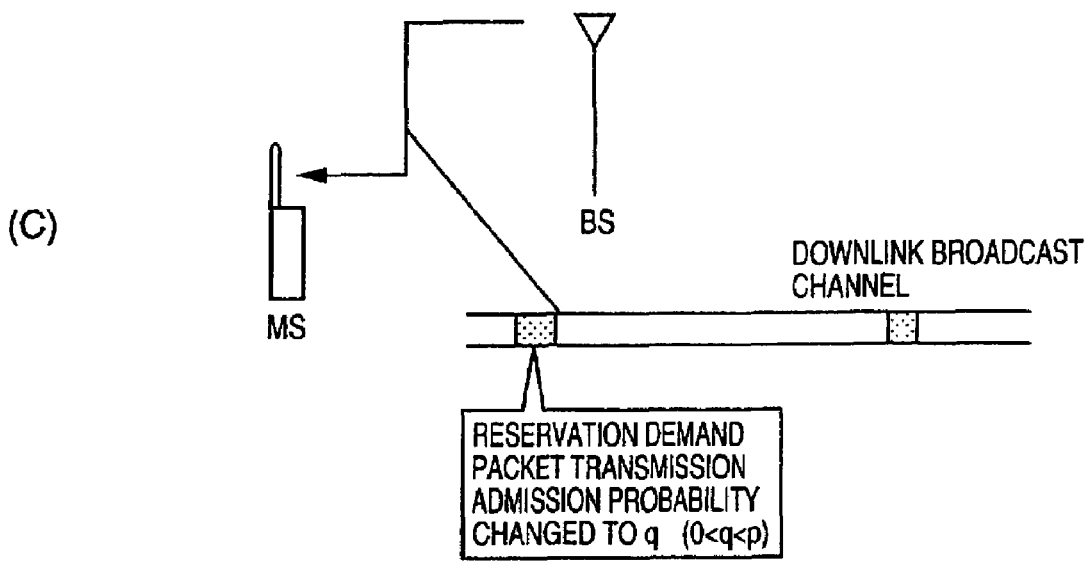

FIG. 12
(A) 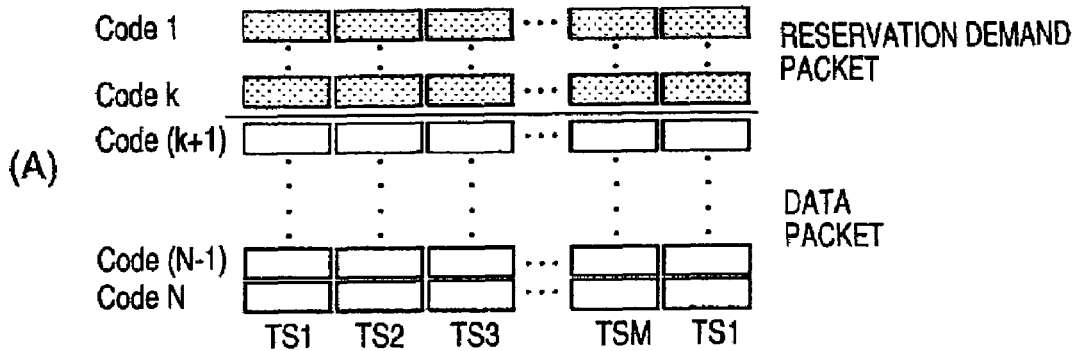
(B) 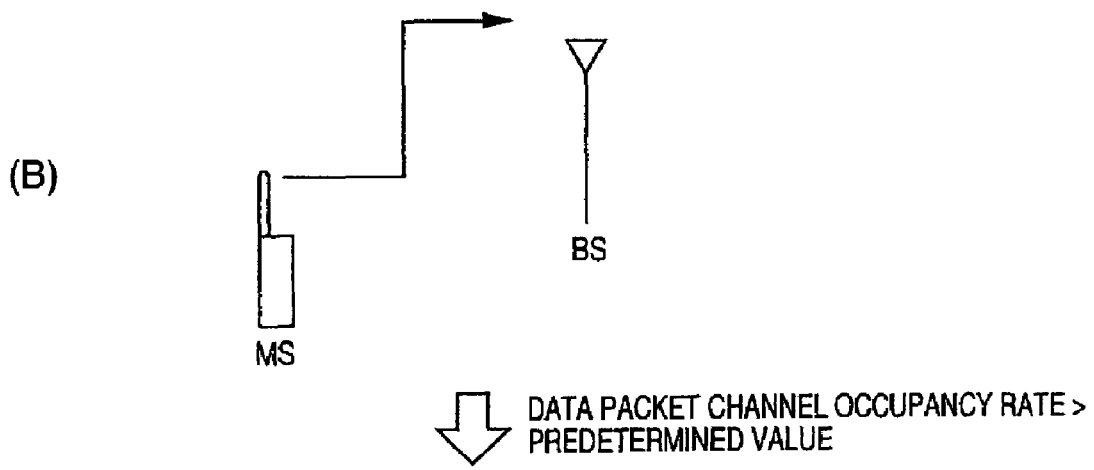
DATA PACKET CHANNEL OCCUPANCY RATE > PREDETERMINED VALUE
(C) 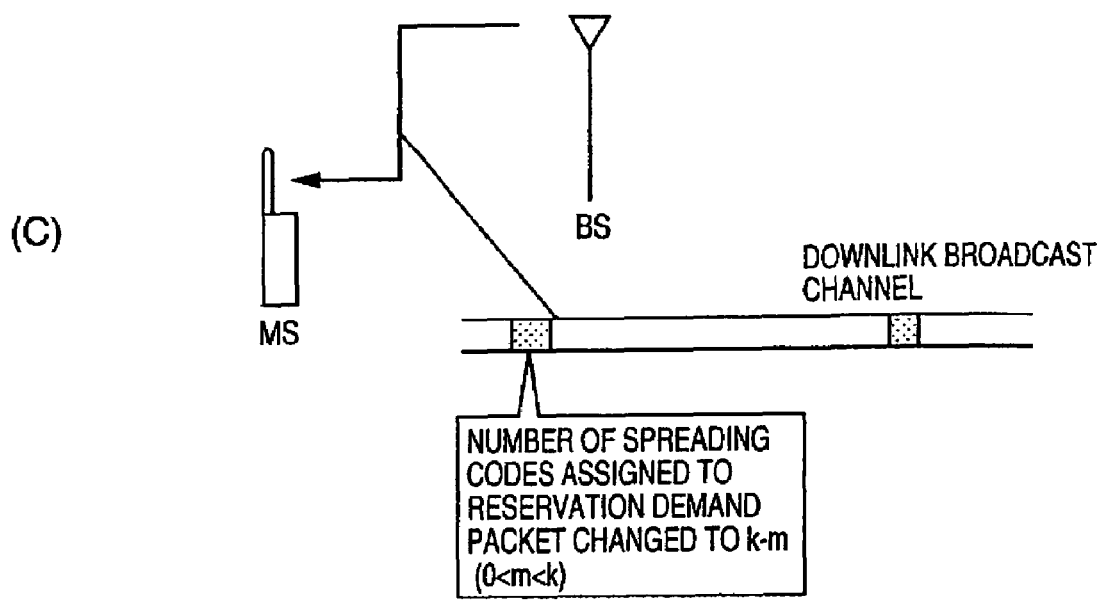
NUMBER OF SPREADING CODES ASSIGNED TO RESERVATION DEMAND PACKET CHANGED TO k-m (0<m<k)

FIG. 13

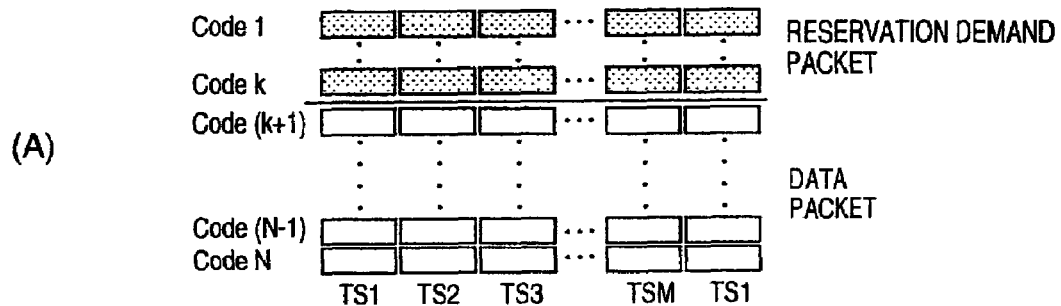

(A)

(B) RESERVATION DEMAND PACKET TRANSMISSION ADMISSION PROBABILITY $p(0<p<=1)$

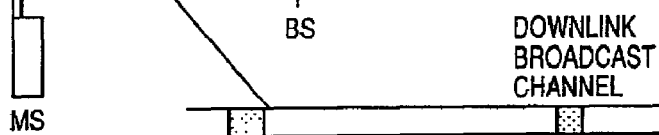

(C) DATA PACKET CHANNEL OCCUPANCY RATE > PREDETERMINED VALUE

RESERVATION DEMAND PACKET TRANSMISSION ADMISSION PROBABILITY CHANGED TO $q$ $(0<q<p)$

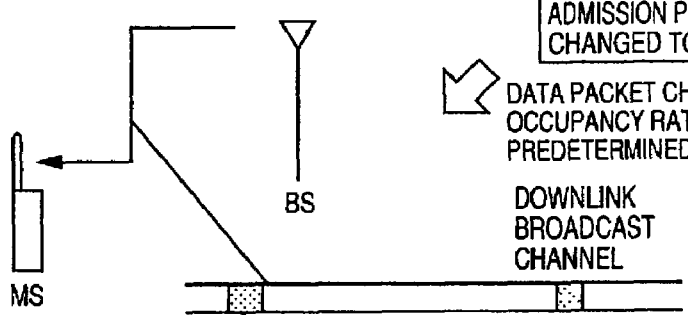

(D) DATA PACKET CHANNEL OCCUPANCY RATE > PREDETERMINED VALUE

NUMBER OF SPREADING CODES ASSIGNED TO RESERVATION DEMAND PACKET CHANGED TO $k-m$ $(0<m<k)$

RESERVATION DEMAND PACKET TRANSMISSION SLOTS (CAPABLE OF SIMULTANEOUS TRANSMISSION OF m1 RESERVATION DEMAND PACKETS BY m1 SPREADING CODES WITHIN SLOT)

FIG. 28
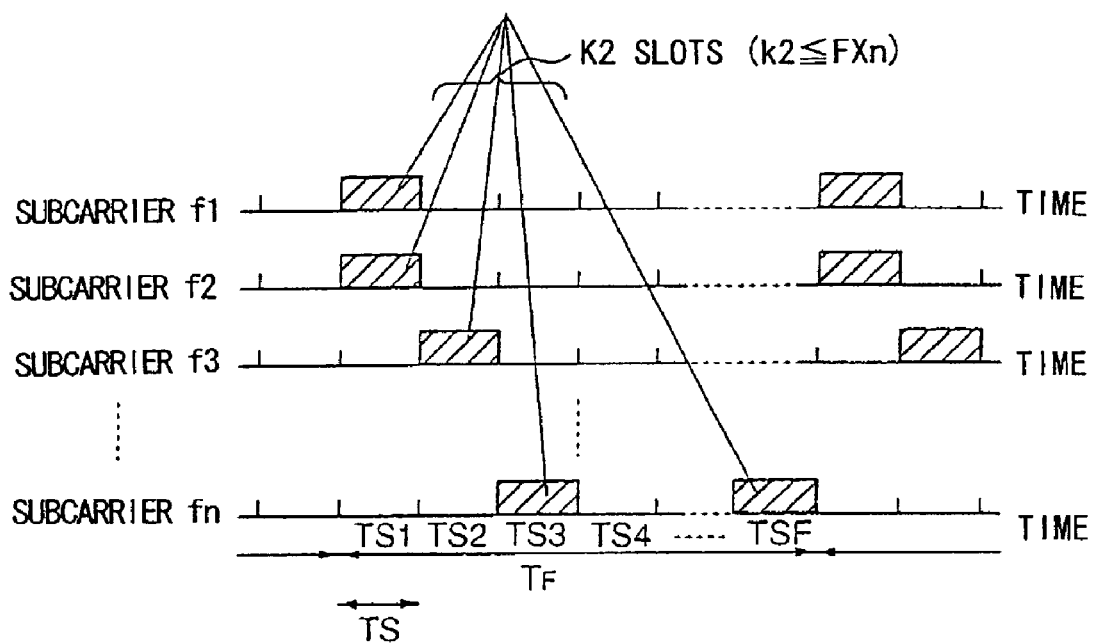

SINGLE-CARRIER/DS-CDMA PACKET TRANSMITTING METHOD, UPLINK PACKET TRANSMITTING METHOD IN MULTI CARRIER/DS-CDMA MOBILE COMMUNICATION SYSTEM, AND STRUCTURE OF DOWNLINK CHANNEL IN MULTI CARRIER/DS-CDMA MOBILE COMMUNICATION SYSTEM

TECHNICAL FIELD

The present invention relates to DS-CDMA (Direct Sequence-Code Divisional Multiple Access) mobile communications, and particularly relates to single carrier/DS-CDMA mobile communications and multi-carrier/DS-CDMA mobile communications.

BACKGROUND TECHNOLOGY

Multi-carrier/DS-CDMA mobile communications and single carrier/DS-CDMA mobile communications are used as DS-CDMA mobile communications.

When data length to be transmitted is far longer than one packet length in a single carrier/DS-CDMA uplink packet transmission method, an efficient transmission is achieved at the time of call connection by fixedly assigning spreading codes and time slots to be used in communication.

In this case, efficient multiplexing is necessary with respect to reservation demand packets for reserving the allocation of spreading codes and time slots as well as with respect to data packets for transmitting real data. Since the probability of reservation demand packets being able to be transmitted are not controlled in the conventional technique, collision of reservation demand packets occur frequently at the time of heavy traffic, giving rise to a problem that a transmission efficiency decreases.

In "Performance of orthogonal CDMA codes for quasi-synchronous communication systems" (V. DaSilva, E. Sousa: Proc. of ICUPC' vol. 2, pp995-999, 1993), first study was made about the multi-carrier/DS-CDMA method.

Unlike the single carrier/DS-CDMA, which transmits a CDMA signal on one carrier, the multi-carrier/DS-CDMA divides a radio-transmission bandwidth, and performs parallel transmission of a CDMA signal by two or more subcarriers.

With this provision, the speed of information transmission per subcarrier becomes low, and the speed of code spreading at which information signals are spread to generate CDMA signals also becomes low. Consequently, a chip length of the spreading code can be made longer in the multi-carrier/DS-CDMA than in the single carrier/DS-CDMA. As the chip length is increased, the influence of synchronization errors between spreading codes will be alleviated. Utilizing this feature, the above-mentioned paper applies the multi-carrier/DS-CDMA to communications from mobile stations to base stations in mobile communications systems, and presents a method of performing quasi-synchronous transmission.

Further, a performance evaluation has been conducted on a link level of the multi-carrier/DS-CDMA.

"On the Perfomance of Multi-carrier DS CDMA Systems" (S. Kondo and L. B. Milstein: IEEE Transactions on Communications, vol.44, no.2, pp.238-246, February 1996) demonstrates that the multi-carrier/DS-CDMA provides better properties than the single carrier/DS-CDMA according to a performance evaluation that is conducted in the presence of narrow-band interference.

However, conventional studies about the multi-carrier/DS-CDMA method have been centered around performance evaluations on the link level, and few studies have been made on how a mobile station should communicate with a base station and how a control signal therefor should be transmitted when this method is applied to a mobile communication system.

Furthermore, these studies have a problem in that they have been based on the circuit switching method which always secures a communication channel of exclusive use from the start of transmission to its end for signal transmission from a transmitter to a receiver as usually used in the conventional mobile communication system.

Moreover, digital mobile communication systems (for example, a PDC system, a GSM system, and the like) are focused onto voice communication services, and the systems are designed on the basis of the circuit switching at present. Further, although a packet transmission service is planned also in the next-generation mobile communication system (for example, IMT-2000), which will be introduced soon, the system design is also based on the circuit switching. Thus, in a radio-transmission system based on the circuit switching, channels for an uplink and a downlink are almost equal in number, and even if a data communication is performed, a symmetrical channel structure of the uplink and the downlink is used. For this reason, transmission of a control command to each user is performed using the channel corresponding to each user.

Conversely, in multimedia mobile communications for which demand is supposed to grow in the future, communications are asymmetrical between the uplink and the downlink. Accordingly, it is conceivable that downlink traffic accounts for most of the traffic when data is downloaded. Also, when data is uploaded, it is conceivable that the uplink traffic accounts for most of the traffic while the downlink is required only for response signals. In such a case, if one channel assigned to each user is used to send each user's control command, the efficiency of data transmission becomes poor.

In recent years, the multi-carrier/DS-CDMA mobile communication system has been attracting attention as a mobile communication system that is capable of high-speed data transmission. This multi-carrier/DS-CDMA mobile communication system has a problem in that no scheme has yet been proposed about a channel structure that takes into account the above-described asymmetry in the amount of data transmission between the uplink and the downlink in high-speed data communications directed to multimedia or the like.

DISCLOSURE OF INVENTION

A general object of the present invention is to provide an improved single carrier/DS-CDMA packet transmission method, an uplink packet transmission method in a multi-carrier/DS-CDMA mobile communication system, and a downlink channel structure in a multi-carrier/DS-CDMA mobile communication system, which solve the problems of the conventional technology mentioned above.

The first object of the present invention relative to the single carrier/DS-CDMA packet transmission method and transmission system is to provide-multiplexing of a reservation demand packet and a data packet efficiently, to improve transmission efficiency, and further to realize a flexible bandwidth control of a channel wherein the reservation demand packet and the data packet occupy according to changes in traffic amount.

In order to attain this object, the present invention is structured such that a predetermined time slot of part or all of spreading codes is assigned to reservation demand packet transmission, and the reservation demand packet and data packet are time-multiplexed for transmission, in the single carrier/DS-CDMA packet transmission method which carries out bandwidth expansion of an information symbol by a spreading code sequence, and carries out packet transmission using this spreading code.

Moreover, the single carrier/DS-CDMA packet transmission method which carries out the bandwidth expansion of the information symbol by the spreading code sequence, and carries out the packet transmission using this spreading code is configured such that k pieces of spreading codes, where 0<k<N and N represents the number of all spreading codes, are assigned to the reservation demand packet transmission, and the reservation demand packet and the data packet are code-multiplexed and transmitted, the reservation demand packet transmission admission probability determined in advance is lowered when a channel occupancy rate of the data packet exceeds a predetermined value, the number of the spreading codes assigned to the reservation demand packet transmission is decreased and the number of the spreading codes assigned to the data-packet transmission is increased when the channel occupancy rate of the data packet exceeds a predetermined value, when the channel occupancy rate of the data packet exceeds a predetermined value, the reservation demand packet transmission admission probability determined in advance is first lowered, and if the channel occupancy rate of the data packet still exceeds the predetermined value, even after lowering the reservation demand packet transmission admission probability, then subsequently, the number of the spreading codes assigned to the reservation demand packet transmission is decreased and the number of the spreading codes assigned to the data-packet transmission is increased, when the channel occupancy rate exceeds the predetermined value, first the number of the spreading codes assigned to the reservation demand packet transmission is decreased, and if the channel occupancy rate still exceeds the predetermined value, even after decreasing the number of the spreading codes assigned to the reservation demand packet transmission, then subsequently, the reservation demand packet transmission admission probability determined in advance is lowered, the channel occupancy rate of the data packet is measured, and the number of spreading codes available for the reservation demand packet and the reservation demand packet transmission admission probability are determined, the number of spreading codes available for the reservation demand packet and the transmission admission probability above-mentioned are inserted into an information channel by time-multiplexing, a short repetition period spreading code (Short code) is used as a code to expand the bandwidth of the reservation demand packet and the data packet, and as the code to expand the bandwidth of the reservation demand packet, the short repetition period spreading code (Short code) is used, and a long repetition period spreading code (Long code) is used as the code to expand the bandwidth of the data packet.

The second object of the present invention is to provide an uplink packet transmission method for a new multi-carrier/DS-CDMA mobile communication system, which can realize a packet transmission with a variable transmission speed.

In order to attain this object, the present invention relative to an uplink packet transmission method in a multi-carrier/DS-CDMA mobile communication system that has n subcarriers (n being a natural number two or larger) is structured such that frames that are segments for every fixed time are provided to each communication channel of the above-mentioned subcarriers, the frame is divided into time slots with F pieces (F being a natural number, two or larger), and a mobile station transmits a packet to be transmitted to a base station by spreading by a spreading code in synchronous with the timing of the above-mentioned time slot.

Further, the uplink packet transmission method for the multi-carrier/DS-CDMA mobile communication system which has n subcarriers is structured such that:

the above-mentioned mobile station requires an assignment of a time slot and a spreading code by transmitting a reservation demand packet to the above-mentioned base station which assigns a time slot and a spreading code to the demanding mobile station, and the above-mentioned mobile station spreads a packet by spreading the packet by the spreading code and transmits in the time slot assigned by the above-mentioned base station, the above-mentioned mobile station carries out the packet transmission through a random access to a time slot of one the above-mentioned communication channels without requesting the above-mentioned base station for an assignment of a time slot, transmission speed of the above-mentioned mobile station is changed according to a transmission volume of the packet which the above-mentioned mobile station transmits, the above-mentioned base station assigns k1 pieces (k1 being a natural number, and $k1<=F\times n$) of the time slot for the above-mentioned reservation demand packet transmission, and further assigns m1 pieces (m1 being a natural number, and m1<=total number of available spreading codes) of the spreading codes, and the above-mentioned mobile station transmits the reservation demand packet spread by one of the assigned spreading codes in the assigned time slot, the above-mentioned base station changes the number of the time slots k1 for the reservation demand packet transmission according to the number of the reservation demand packets during a predetermined period from the above-mentioned mobile station, the above-mentioned base station changes the number of the spreading codes m1 for the above-mentioned reservation demand packet transmission according to the number of the reservation demand packets during the predetermined period from the above-mentioned mobile station, the above-mentioned base station changes the number of the time slots k1 for the above-mentioned reservation demand packet transmission, and the number of the spreading codes m1 for the above-mentioned reservation demand packet transmission according to the number of the reservation demand packets during the predetermined period from the above-mentioned mobile station, the above-mentioned base station notifies a transmission limit of a reservation demand packet to the above-mentioned mobile station, when there are numerous reservation demand packets during the predetermined period from the above-mentioned mobile station, the above-mentioned mobile station transmits reservation demand packets, following the limit, the above-mentioned base station assigns k2 pieces (k2 being a natural number and $k2<=F\times n$) of the time slot in which packet transmission is possible and an m2 pieces (m2 being a natural number and m2<=total number of available spreading codes) of the spreading code is further assigned for spreading a random access packet, by the above-mentioned mobile station accessing randomly for the above-mentioned mobile station to spread and transmit the random accessing packet by one of the assigned spreading codes in the assigned time slot, the above-mentioned base station changes the number of the time slots k2 for the above-mentioned random access packet transmission according to the number of packets during the predetermined period from the above-mentioned mobile station which carries out random access, the above-mentioned base station changes the number of the spreading codes m2 for the above-mentioned random access packet transmission according to the number of packets during the predetermined period from the above-mentioned mobile station which carries out random access, the above-mentioned base station changes the number of the time slots k2 for the above-mentioned random access packet transmission, and the number of the spreading codes m2 for the above-mentioned random access packet transmission according to the number of packets during the predetermined period from the above-mentioned mobile station which carries out random access, the above-mentioned base station notifies a transmission limit of a random access packet to the above-mentioned mobile station, when there are numerous packets during the predetermined period from the above-mentioned mobile station which carries out random access, and the above-mentioned mobile station performs random access following the limit, the above-mentioned base station assigns p (p being a natural number, and p<=the total number of available spreading codes) pieces of spreading codes to the mobile station according to the magnitude of the transmission volume of the above-mentioned mobile station, the above-mentioned base station assigns a spreading code having a different spreading factor to the above-mentioned mobile station according to the magnitude of the transmission volume of the above-mentioned mobile station, and the above-mentioned base station performs assignment by changing at least two of the number of spreading codes p (p being a natural number and p<=total number of available spreading codes), spreading codes having different spreading factors, the numbers of time slots q (q being a natural number, and q<=F×n) according to the magnitude of the transmission volume of the mobile station.

The third object of the present invention is to provide a downlink channel structure that is capable of efficiently transmitting control information to each user in a situation where information transmission volumes are asymmetrical between an uplink and a downlink in a multi-carrier/DS-CDMA mobile communication system.

In order to attain this object, the present invention, relative to the structure of the downlink channel in the multi-carrier/DS-CDMA mobile communication system that transmits spreading codes obtained by expanding bandwidth of information symbols by a spreading code sequence using two or more subcarriers that have a predetermined frequency interval, is structured such that two or more communication channels assigned to each of two or more subcarriers are divided for every predetermined time frame, multiplexed and assigned to each subcarrier, the two or more communication channels being used by a common control channel for two or more users, and a communication channel peculiar to each user.

According to the downlink channel structure in the multi-carrier/DS-CDMA mobile communication system such as above, either or both of user-peculiar information and common information is/are included in the common-control channel of each of the above-mentioned subcarriers and transmitted, when the information is transmitted from a base station to each user (mobile station).

Moreover, from a viewpoint that information used by each user when transmitting information to the base station should be efficiently transmitted to each user, the downlink of the present invention can be structured such that information for controlling transmission of each user's uplink is included in the above-mentioned common-control channel. The information for controlling transmission of each user's uplink can include a transmission power control command to control the transmission power of each user (mobile station), a control command used to control a call origination, and a control command to control, for example, to control frequency, code (including a spreading factor), and time to be used by each user.

Moreover, from a viewpoint that a response to information transmitted by each user should be efficiently transmitted to each user, the structure of each downlink channel of the present invention can include information relative to a response to transmission of each user's uplink in the above-mentioned common-control channel. The information relative to the response to transmission of each user's uplink can include, for example, a reply signal ACK (Acknowledgement) and NACK (Non-acknowledgement) to an uplink communication.

Moreover, from a viewpoint that broadcast information to be transmitted in common to each user should be transmitted efficiently, the present invention can include the common broadcast information to each user in the above-mentioned common-control channel in the structure of each downlink channel mentioned above. The broadcast information to each user mentioned above can include time, cell (base station) information, traffic information about the cell to which the mobile station is connected, road traffic information, and broadcast information such as about television and the like.

Moreover, from a viewpoint that the downlink signal should be reliably demodulated according to a condition of a radio-transmission path between the base station and the user, the present invention can include a pilot symbol used for demodulating the received signal at each user in the above-mentioned common-control channel in the structure of each above-mentioned downlink channel.

Moreover, the present invention allows an assignment of a common-control channel to one or a plurality of code channels of part or all of the plurality of subcarriers in the structure of each above-mentioned downlink channel.

Moreover, the present invention allows the common-control channel in each subcarrier in the structure of each above-mentioned downlink channel to accommodate different kinds of information.

Moreover, the present invention allows information that is included in the common-control channel assigned to each subcarrier to be time-multiplexed into part of each time frame in the structure of each above-mentioned downlink channel.

Moreover, when information included in each common-control channel needs to be time-multiplexed into part of each time frame, time-multiplexing may be carried out with respect to the same timing portion of each time frame of each subcarrier, or may be carried out with respect to different timing portions of each time frame of each subcarrier as claimed in claim 10.

BRIEF EXPLANATION OF THE DRAWINGS

FIG. 4 is a drawing showing an example of assignment control of the number of spreading codes.

FIG. 10 is a drawing showing the first implementation of the first embodiment.

FIG. 11 is a drawing showing the second implementation

FIG. 12 is a drawing showing the third implementation

FIG. 13 is a drawing showing the fourth implementation

FIG. 28 is a drawing (No. 1) showing assignment of a random access packet transmission slot in the second embodiment.

THE BEST MODE OF THE INVENTION

In the following, embodiments of the present invention will be described with reference to the drawings.

The first embodiment of the present invention is an embodiment concerning a single carrier/DS-CDMA packet transmission method.

Figure 1:
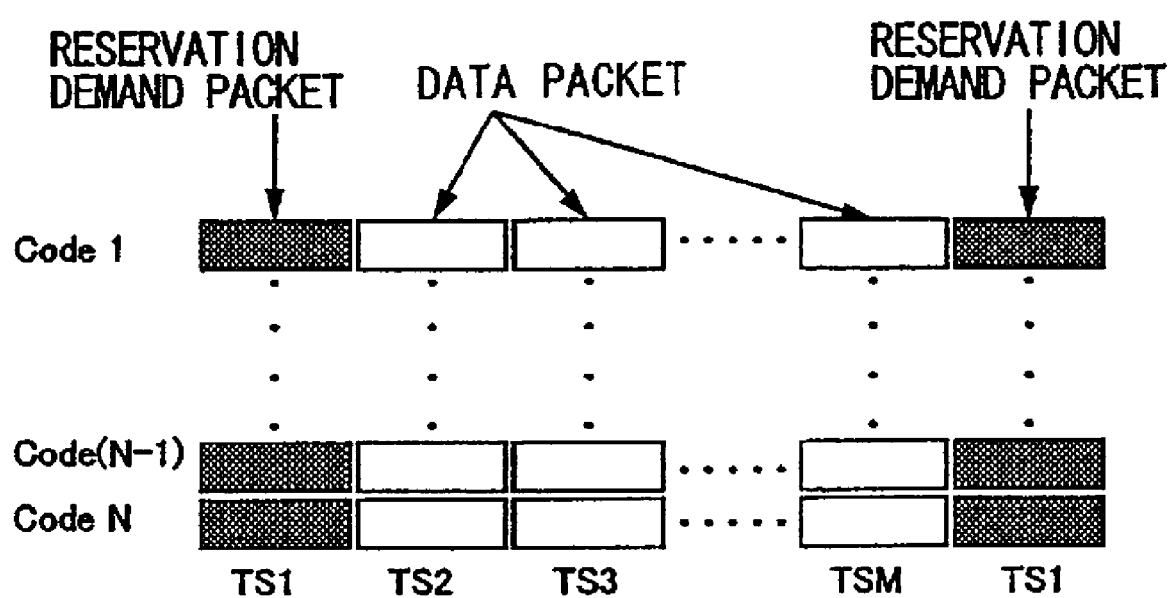
FIG. 1 is a drawing showing an example of a channel structure of the first embodiment.

FIG. 1 is an example of a channel structure of the first embodiment. Here, the horizontal axis and the vertical axis of each channel show time and power, respectively. Information signal is bandwidth-spread by a high-speed spreading code sequence, and the information signal whose bandwidth is expanded is transmitted by spreading codes Code1 through CodeN and time slots TS1 through TSM. At this occasion, a certain specific time slot is assigned to the reservation demand packet transmission.

In FIG. 1, among the spreading codes Code1 through CodeN and the time slots TS1 through TSM, the time slot TS1 is assigned to the reservation demand packet transmission and the other time slots TS2 through TSM are assigned to data packets.

The assignment to the reservation demand packet may be performed to part or all of the spreading codes.

Figure 2:
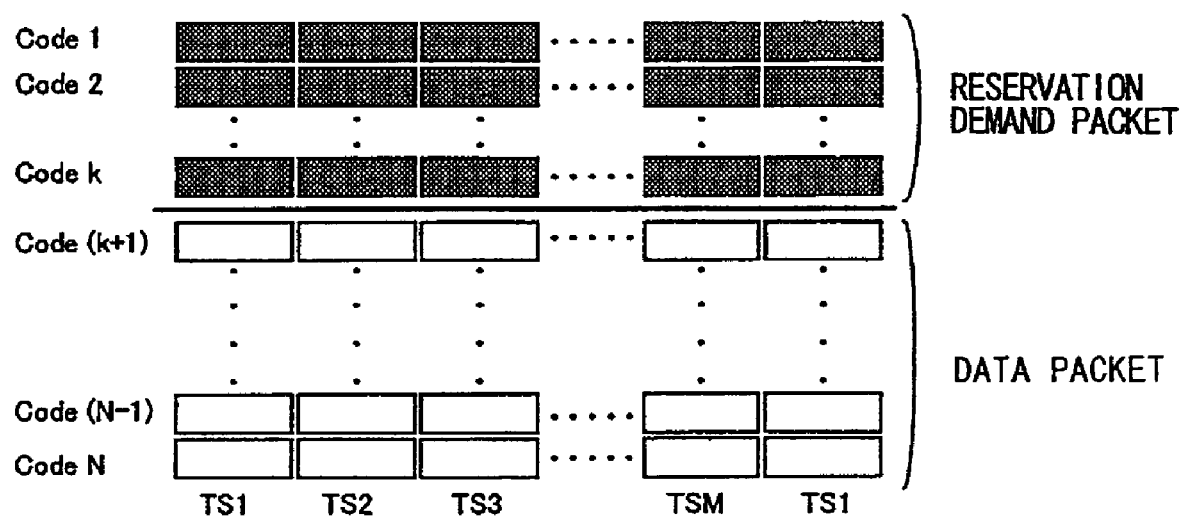
FIG. 2 is a drawing showing another example of the channel structure.

FIG. 2 is another example of the channel structure of the first embodiment.

Here, the horizontal axis and the vertical axis of each channel show time and power, respectively. Bandwidth expansion of the information symbol is carried out by the high-speed spreading code sequence, and the information signal of which bandwidth is expanded is transmitted by the spreading codes Code1 through CodeN and the time slots TS1 through TSM. Here, a certain specific spreading code is assigned to the reservation demand packet transmission.

In FIG. 2, among the spreading codes Code1 through CodeN and the time slots TS1 through TSM, the spreading codes Code1 through Codek are assigned to the reservation demand packet transmission, and the other spreading codes Code (k+1) through CodeN are assigned to the data packets.

Figure 3:
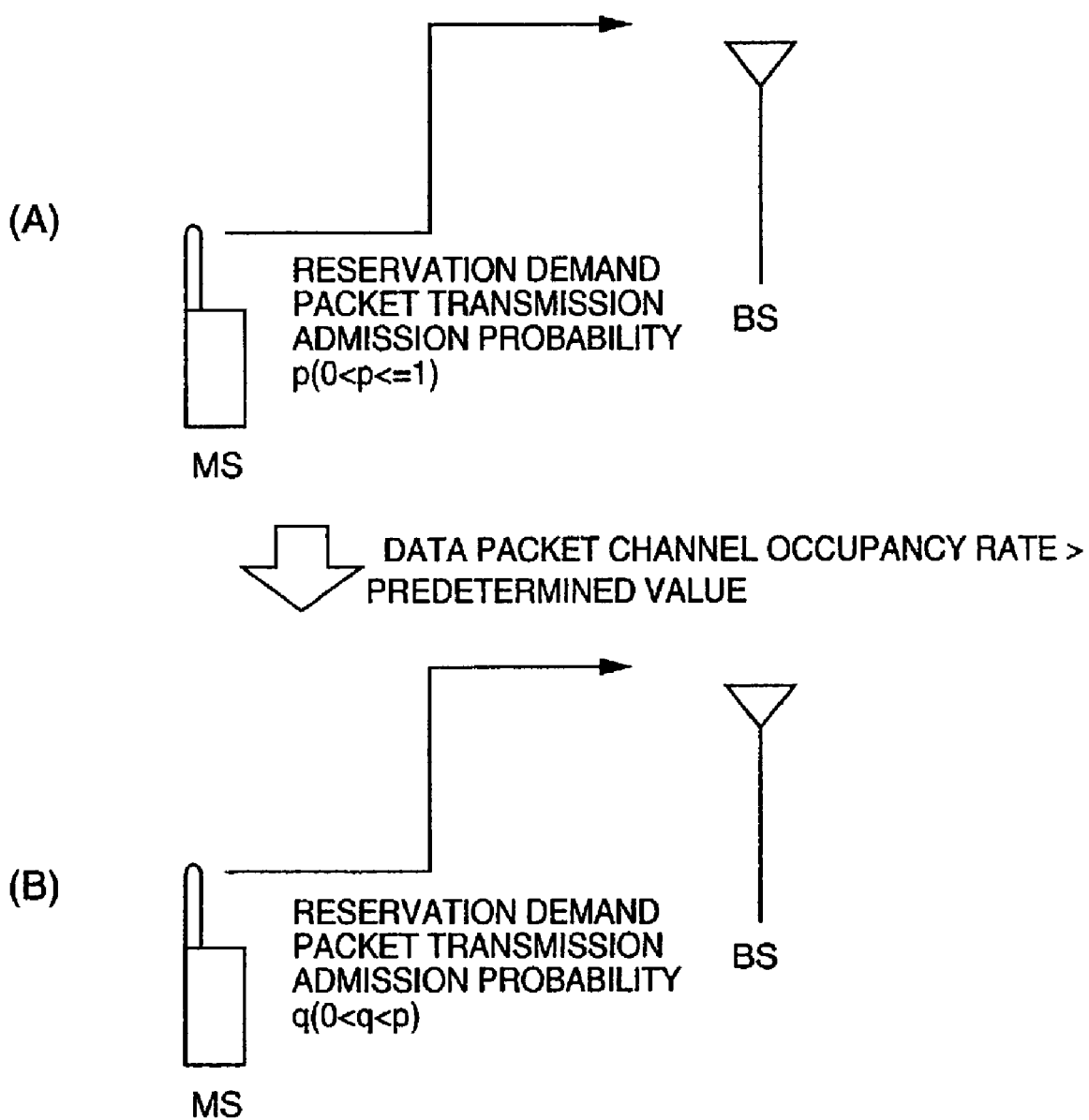
FIG. 3 is a drawing showing an example of controlling reservation demand packet transmission admission probability.

FIG. 3 is an example of transmission admission probability control for reservation demand packet.

Usually, as shown in FIG. 3(A), when a terminal (mobile station) requests to make a call, a reservation demand packet is transmitted at a certain transmission admission probability p (0<p<=1).

Here, when a channel occupancy rate of the data packets exceeds a predetermined value, the transmission admission probability is lowered to q (0<q<p), in order to avoid a collision of reservation demand packets, as shown in FIG. 3(B).

Thereby, the collision probability of the reservation demand packets can be reduced and transmission efficiency can be raised.

FIG. 4 is an example of assignment control of the number of spreading codes available to a reservation demand packet.

Here, the horizontal axis and the vertical axis of each channel show time and power, respectively. Bandwidth expansion of the information symbol is carried out by the high-speed spreading code sequence, and the spread code of which bandwidth is expanded is transmitted by the spreading codes Code1 through CodeN and the time slots TS1 through TSM. Here, a certain specific spreading code is assigned to reservation demand packet transmission.

Usually, as shown in FIG. 4(A), the spreading codes Code1 through Codek are assigned to the reservation demand packet transmission.

When the channel occupancy rate of the data packets exceeds a predetermined value at this time, as shown in FIG. 4(B), transmission efficiency can be raised by decreasing the number of the spreading codes currently assigned to the reservation demand packet, and increasing the number of the spreading codes assigned to the data packets.

In FIG. 4(B), m pieces of the spreading codes (m<k) are reassigned to the data-packet transmission from those assigned to the reservation demand packet transmission.

That is, transmission efficiency can be raised by using the spreading codes Code (k−m+1) through Codek previously assigned to the reservation demand packet will now be used by the data packet.

Figure 5:
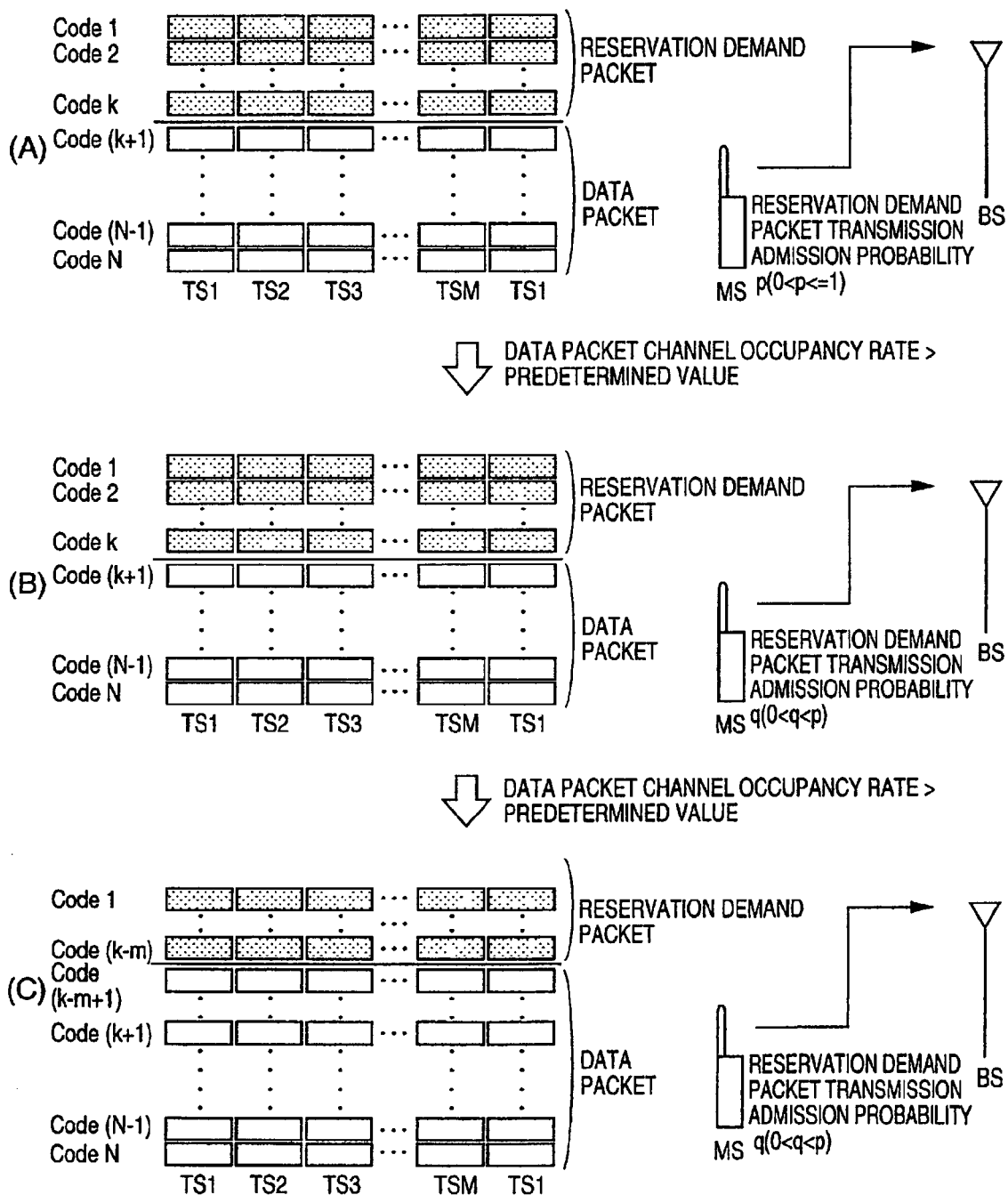
FIG. 5 is a drawing showing an example of the reservation demand packet transmission admission probability control and the assignment control of available number of the spreading codes for a reservation demand packet.

FIG. 5 is an example of assignment control of the number of the spreading codes available to the reservation demand packet transmission and the transmission probability of the reservation demand packet.

Here, the horizontal axis and the vertical axis of each channel show time and power, respectively. Bandwidth expansion of the information symbol is carried out by the high-speed spreading code sequence, and the spread code of which bandwidth is expanded is transmitted by the spreading codes Code1 through CodeN and the time slots TS1 through TSM. Here, a certain specific spreading code is assigned to reservation demand packet transmission.

Usually, as shown in FIG. 5(A), the spreading codes Code1 through Codek are assigned to the reservation demand packet transmission. Moreover, usually, when a terminal requests to make a call, a reservation demand packet is transmitted at a certain transmission admission probability p (0<p<=1).

In order to avoid a collision of reservation demand packets, when a channel occupancy rate of a data packet exceeds a predetermined value at this time, the transmission admission probability q (0<q<p) for the reservation demand packet is lowered first as shown in FIG. 5(B).

If the channel occupancy rate of the data packet still exceeds the predetermined value, the transmission efficiency is raised by decreasing the number of the spreading codes currently assigned to the reservation demand packet, and increasing the number of the spreading codes assigned to a data packet, as shown in FIG. 5(C).

In FIG. 5(C), m pieces of the spreading codes (m<k) are reassigned to the data packet from the reservation demand packet.

That is, transmission efficiency can be raised by the data packet using the spreading codes Code (k−m+1) through Codek currently assigned to the reservation demand packet.

Figure 6:
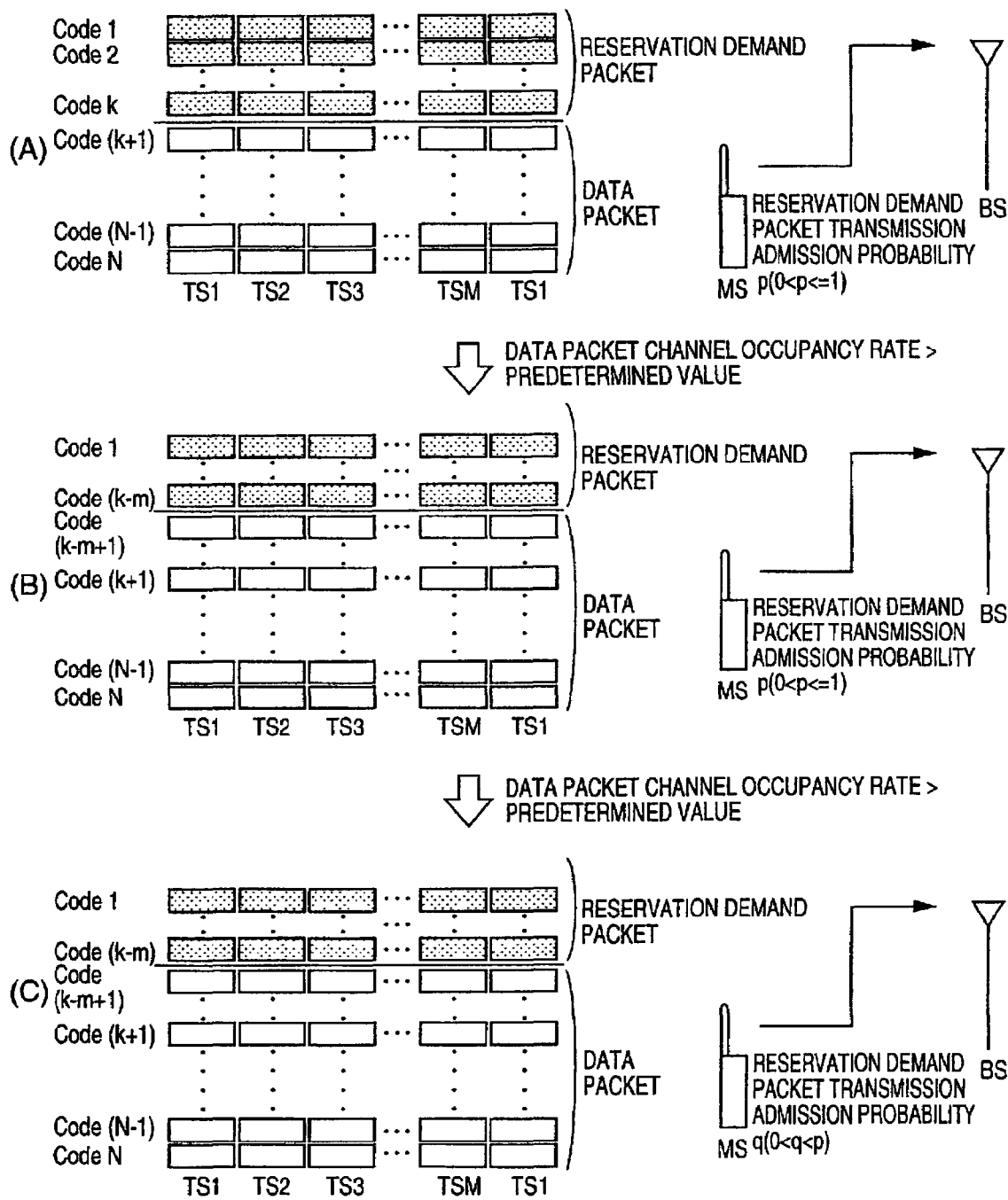
FIG. 6 is a drawing showing an example of the reservation demand packet transmission admission probability control and the assignment control of available number of the spreading codes for a reservation demand packet of the first embodiment.

FIG. 6 is an example of assignment control of the number of spreading codes available to the reservation demand packets and the reservation demand packet transmitting probability.

Here, the horizontal axis and the vertical axis of each channel show time and power, respectively. Bandwidth expansion of the information symbol is carried out by the high-speed spreading code sequence, and the information signal of which bandwidth is expanded is transmitted by the spreading codes Code1 through CodeN and the time slots TS1 through TSM.

Here, a certain specific spreading code is assigned to the reservation demand packet transmission.

Usually, the spreading codes Code1 through Codek are assigned to the reservation demand packet transmission beforehand as shown in FIG. 6(A). Moreover, usually, when a terminal requests to make a call, the terminal transmits the reservation demand packet at a certain transmission admission probability p (0<p<=1).

As shown in FIG. 6(B), when a channel occupancy rate of a data packet exceeds a predetermined value at this time, the number of the spreading codes currently assigned to the reservation demand packet is decreased, and the number of the spreading codes assigned to the data packet is increased. In FIG. 6(B), m pieces of the spreading codes (m<k) are reassigned to the data packet from the reservation demand packet.

If the channel occupancy rate of the data packet still exceeds the predetermined value, in order to avoid the collision of reservation demand packets, the transmission admission probability q (0<q<p) for the reservation demand packet is lowered as shown in FIG. 6(C).

In this manner, the collision probability of the reservation demand packets is reduced and transmission efficiency is raised.

Figure 7:
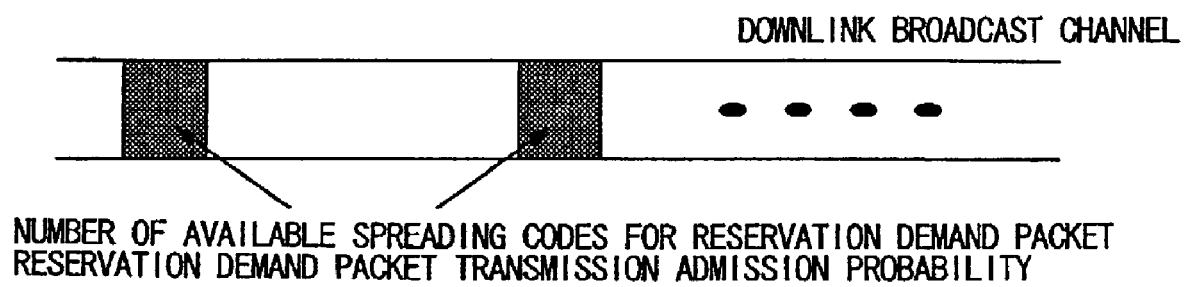
FIG. 7 is a drawing showing a channel structure of a broadcast channel in a downlink.

FIG. 7 is the example of a structure of the downlink broadcast channel in the first embodiment.

Here, the horizontal axis of a channel expresses time. Information about the number of spreading codes available to the reservation demand packet and the transmission admission probability is inserted into the broadcast channel, as a reservation demand packet by time-sharing.

The channel is specified by the spreading code and the time slot.

Figure 8:
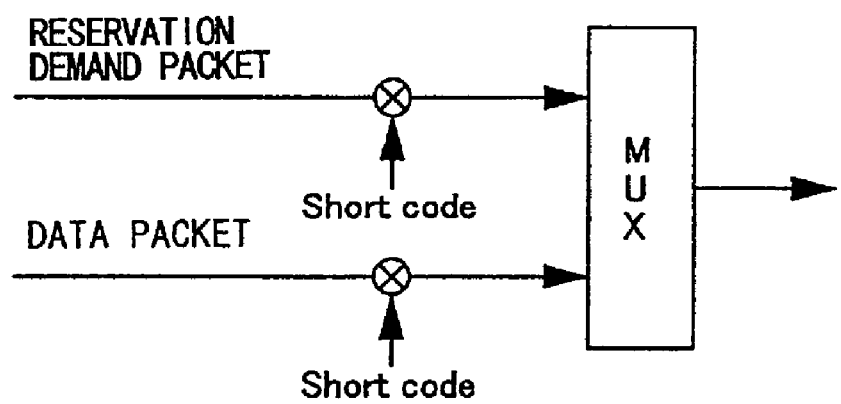
FIG. 8 is a drawing showing an example in which a reservation demand packet and a data packet are bandwidth-spread using a short repetition period spreading code.

FIG. 8 shows an example of a period of the spreading code for the bandwidth expansion of the reservation demand packet and the data packet in the first embodiment.

Here, both the reservation demand packet and the data packet are bandwidth-spread by a short repetition period spreading code.

Figure 9:
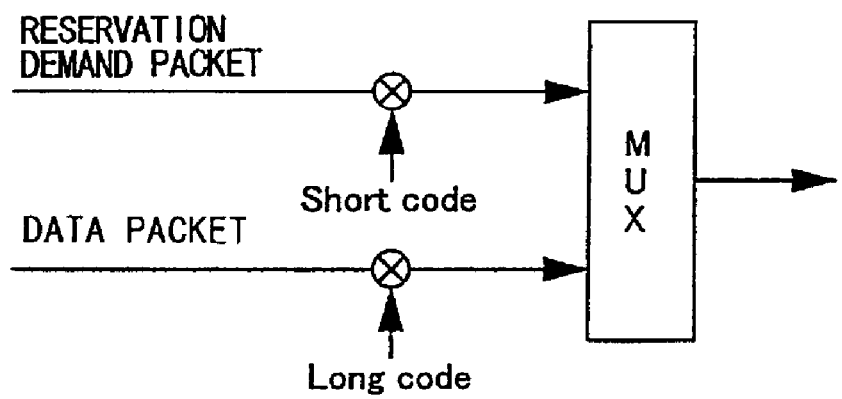
FIG. 9 is a drawing showing an example in which the reservation demand packet is spread by the short repetition period spreading code, and the data packet is spread by a long repetition period spreading code.

FIG. 9 is another example showing periods of the spreading code for the bandwidth expansion of the reservation demand packet and data packet in the first embodiment.

Here, the data packet is bandwidth-expanded by a long repetition period spreading code, and the reservation demand packet is bandwidth-expanded by the short repetition period spreading code.

The first implementation of multiplexing the reservation demand packet and data-packet in the single carrier/DS-CDMA uplink packet transmission by the first embodiment is shown in FIG. 10.

FIG. 10(A) shows a channel structure, FIG. 10(B) shows a normal situation, and FIG. 10(C) is a drawing that shows a control of the transmission admission probability for the reservation demand packet when a channel occupancy rate of a data packet exceeds a predetermined value.

FIG. 10 shows a control of the reservation demand packet transmission admission probability corresponding to FIG. 3, using the packet multiplexing method shown in FIG. 1 and the downlink broadcast channel structure shown in FIG. 7.

In the first implementation of the first embodiment, a certain specific time slot is assigned to the reservation demand packet transmission. In a situation where a terminal transmits at the reservation demand packet transmission admission probability p (0<p<=1), a base station measures a channel occupancy rate of the data packets, and when the value exceeds a predetermined value, the base station transmits a command which performs a control to lower the reservation demand packet transmission admission probability to q (0<q<p) by inserting the command into a downlink broadcast channel by the time-multiplexing.

The second implementation of multiplexing the reservation demand packet and the data-packet in the single carrier/DS-CDMA uplink packet transmission of the first embodiment is shown in FIG. 11.

FIG. 11(A) shows a channel structure, FIG. 11(B) shows a normal situation, and FIG. 11(C) is a drawing showing a reservation demand packet transmission admission probability control when the channel occupancy rate of the data packet exceeds a predetermined value.

FIG. 11 shows a control of the reservation demand packet transmission admission probability corresponding to FIG. 3, using the packet multiplexing method shown in FIG. 2 and the downlink broadcast channel structure shown in FIG. 7.

A certain specific spreading code is assigned to the reservation demand packet transmission in the second implementation of the first embodiment. In a situation where a terminal transmits at a reservation demand packet transmission admission probability p (0<p<=1), a base station measures a channel occupancy rate of a data packet, and when the value exceeds a predetermined value with, the base station transmits a command which performs control to lower the reservation demand packet transmission admission probability to q (0<q<p) by inserting the command into a downlink broadcast channel by the time-multiplexing.

FIG. 12 shows the third implementation of multiplexing a reservation demand packet and a data-packet of the first embodiment in the single carrier/DS-CDMA uplink packet transmission.

FIG. 12(A) shows a channel structure, FIG. 12(B) shows a normal situation, and FIG. 12(C) is a drawing showing control of the number of assigning spreading codes for the reservation demand packet transmission when a channel occupancy rate of the data packet exceeds a predetermined value.

FIG. 12 shows assignment control of the number of the spreading codes available to the reservation demand packet corresponding to FIG. 4, using the packet multiplexing method shown in FIG. 2 and the downlink broadcast channel structure in FIG. 7.

In the third implementation of the first embodiment, a certain specific spreading code to reservation demand packet transmission is assigned. In a situation where k pieces of spreading codes are assigned to the reservation demand packets, a base station measures the channel occupancy rate of the data packets, and when the value exceeds a predetermined value, the base station transmits a command which performs control to reduces the number of spreading codes assigned for reservation demand packet transmission to k−m (0<m<k) by inserting the command into the downlink broadcast channel by the time-multiplexing.

The fourth implementation of multiplexing the reservation demand packet and the data-packet in the single carrier/DS-CDMA uplink packet transmission by the first embodiment is shown in FIG. 13.

FIG. 13(A) shows a channel structure, FIG. 13(B) shows a normal situation, FIG. 13(C) shows the reservation demand packet transmission admission probability control when a channel occupancy rate of a data packet exceeds a predetermined value, and FIG. 13(D) shows assignment control of the number of spreading codes available to the reservation demand packet transmission when the channel occupancy rate of the data packet exceeds the predetermined value, even after the reservation demand packet transmission admission probability control is carried out.

FIG. 13 shows control of the reservation demand packet transmission admission probability and the number of spreading codes assignable for the reservation demand packet transmission corresponding to FIG. 5, using the packet multiplexing method shown in FIG. 2, and the downlink broadcast channel structure FIG. 7.

In the fourth implementation of the first embodiment, a certain specific spreading code is assigned to the reservation demand packet transmission. Where a terminal is transmitting at the reservation demand packet transmission admission probability p (0<p<=1) and the number of the spreading codes standing at k, a base station measures the channel occupancy rate of the data packet, and when the measured value exceeds a predetermined value, the base station transmits a command which performs control to lower the reservation demand packet transmission admission probability to q (0<q<p) by inserting the command into the downlink broadcast channel by the time-multiplexing.

When the channel occupancy rate of the data packet still exceeds the predetermined value even after this operation is performed, the base station transmits a command that performs control to reduce the number of spreading codes assigned for the reservation demand packet transmission to k−m (0<m<k) by inserting the command into the downlink broadcast channel by the time-multiplexing.

Figure 14:
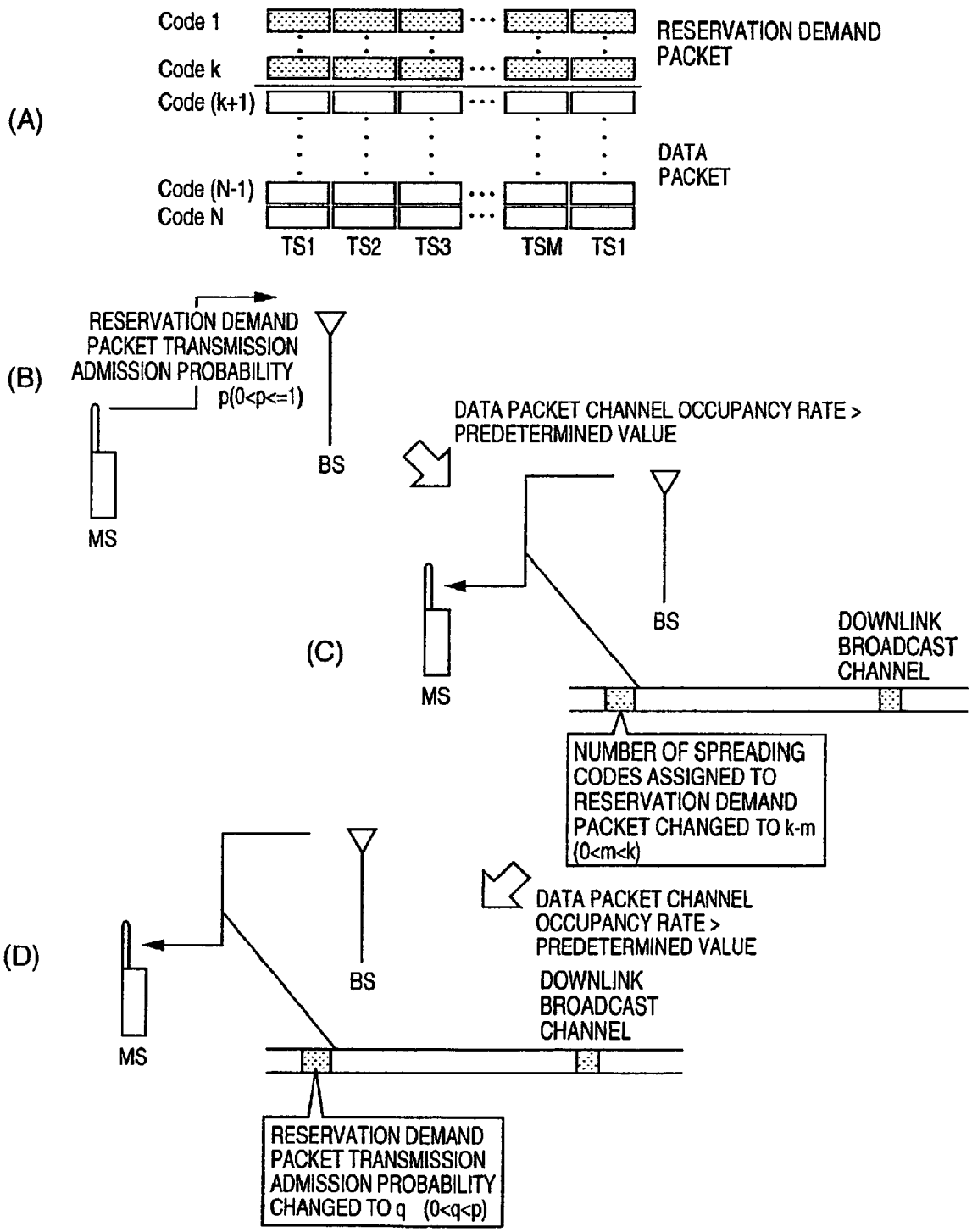
FIG. 14 is a drawing showing the fifth implementation

The fifth implementation of multiplexing a data-packet and a reservation demand packet in the single carrier/DS-CDMA uplink packet transmission of the first embodiment is shown in FIG. 14.

FIG. 14(A) shows a channel structure, FIG. 14(B) shows a normal situation, FIG. 14(C) shows assignment control of the number of spreading codes for the reservation demand packet transmission when a channel occupancy rate of a data packet exceeds a predetermined value, and FIG. 14(D) is a drawing showing the reservation demand packet transmission admission probability control when the channel occupancy rate of the data packet still exceeds the predetermined value even after the number of spreading code assignment control for reservation demand packet transmission has been carried out.

FIG. 14 shows the reservation demand packet transmission admission probability control corresponding to FIG. 6, and assignment control of the number of the spreading codes for the reservation demand packet transmission, using the packet multiplexing method shown in FIG. 2 and the downlink broadcast channel structure in FIG. 7.

In the fifth implementation of the first embodiment, a certain specific spreading code is assigned to the reservation demand packet transmission. While a terminal is transmitting at the reservation demand packet transmission admission probability p (0<p<=1) and the number of the spreading codes for the reservation demand packet transmission being k, a base station measures a channel occupancy rate of the data packet, and when the value exceeds a predetermined value, the base station transmits a command which performs assignment control to reduce the number of spreading codes for the reservation demand packet transmission to k−m (0<m<k) by inserting the command into the downlink broadcast channel by the time-multiplexing. If the channel occupancy rate of the data packet still exceeds the predetermined value after this operation is performed, the base station transmits a command that performs control to lower the reservation demand packet transmission admission probability to q (0<q<p) by inserting the command into the downlink broadcast channel by the time-multiplexing.

In addition, the first embodiment of the present invention is applicable to both an uplink packet transmission and a downlink packet transmission.

Moreover, in the first embodiment, when a base station determines the number of spreading codes available for a reservation demand packet, the base station notifies the information thereof to a mobile station, specifying the number of spreading codes, or a specific spreading code, as a reservation demand packet channel.

Next, the second embodiment of the present invention will be described.

The second embodiment is an embodiment concerning an uplink in a multi-carrier/DS-CDMA mobile communication system.

Figure 15:
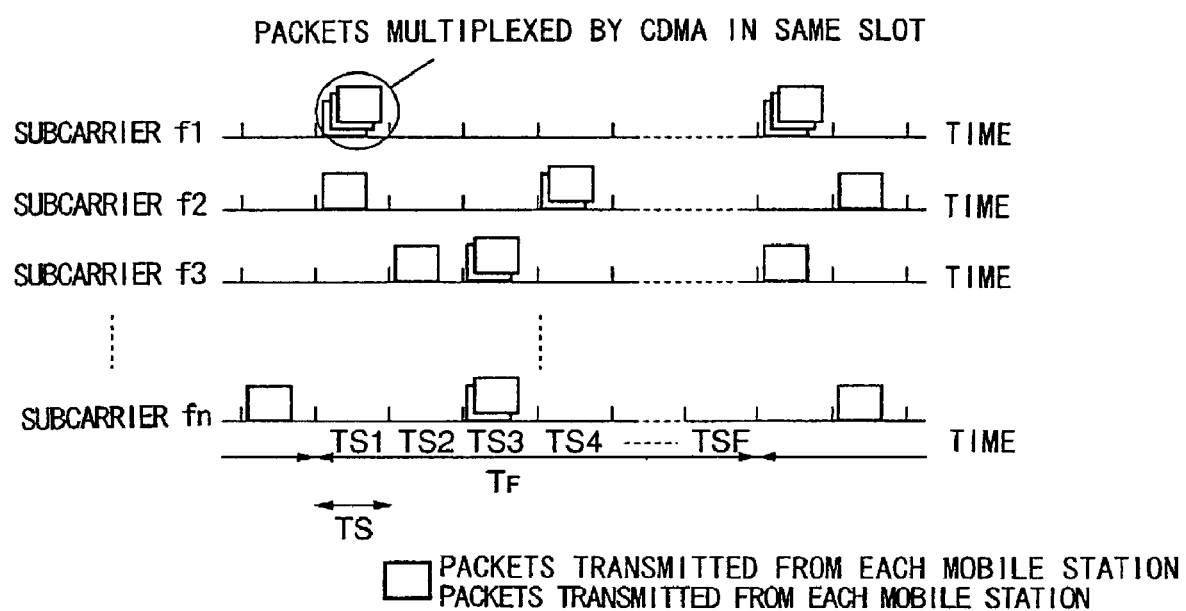
FIG. 15 is a drawing showing an example of the channel structure of the second embodiment between a mobile station and a base station in the multi-carrier/DS-CDMA method.

FIG. 15 is a drawing showing an example of a channel structure between a mobile station and a base station in the multi-carrier/DS-CDMA method.

A frequency bandwidth to be used is divided into n subcarriers f1-fn (n being a natural number of two or larger). Moreover, these subcarriers f1-fn are used by time-sharing. Therefore, frames are set up to each subcarrier. (A frame is a segment for every fixed time, and a frame length is set to $T_F$. The frames are common to all subcarriers.) Furthermore, the frames are divided into F pieces of time slots in time (F being a natural number of two or larger) TS1-TSF (1 time-slot length $TS=T_F/F$).

Therefore, over all subcarriers, there are F×n pieces of the time slots in one frame.

A mobile station transmits a packet according to the timing of this time slot. Moreover, within the same time slot, a packet is multiplexed by the principle of the code division (CDMA) by spreading with different spreading codes.

Therefore, by the channel structure of FIG. 15, simultaneous transmission of a plurality of packets, F×n× (the number of multiplex spreading codes) is attained.

In the example of FIG. 15, three packets are multiplexed by CDMA in the time slot TS1 of the subcarrier f1.

Figure 16:
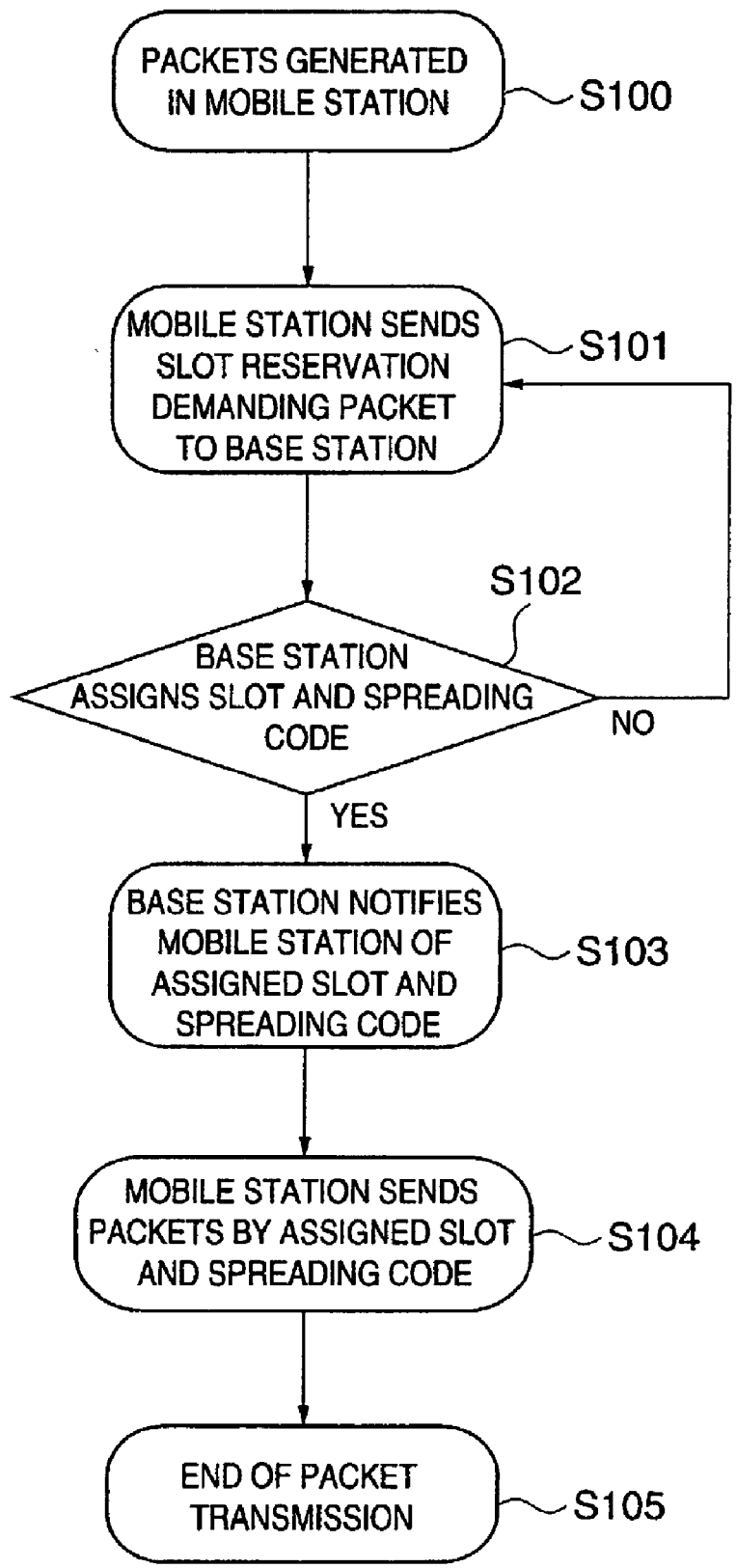
FIG. 16 is a drawing (No. 1) showing an example of an exchange of control performed between the mobile station and the base station when transmitting a packet from the mobile station to the base station in the second embodiment.

FIG. 16 shows an example of an exchange of control performed between a mobile station and a base station when packet transmission is carried out to the base station from the mobile station.

The mobile station first transmits a reservation demand packet to the base station, demanding an assignment of a time slot and a spreading code for transmitting a packet (S101). To the assignment demand from the mobile station, the base station assigns a time slot on a communication channel, and a spreading code (S102), and notifies the result to the mobile station (S103).

The mobile station spreads the packet with the assigned spreading code in the time slot assigned from the base station, and transmits (S104).

Thereby, only the mobile station which was assigned the time slot and the spreading code can transmit by spreading the packet using the assigned spreading code in the assigned time slot.

If a large number of the time slots or a large number of the spreading codes are assigned, a large number of packets can be transmitted simultaneously, making a transmission capacity large.

Moreover, even when one time slot and one spreading code are assigned, the mobile station uses the assigned spreading code and the time slot with priority, enabling a packet transmission in a large transmission volume as a result, if the transmission can be done periodically and reliably until information which the mobile station is to transmit is finished.

Figure 17:
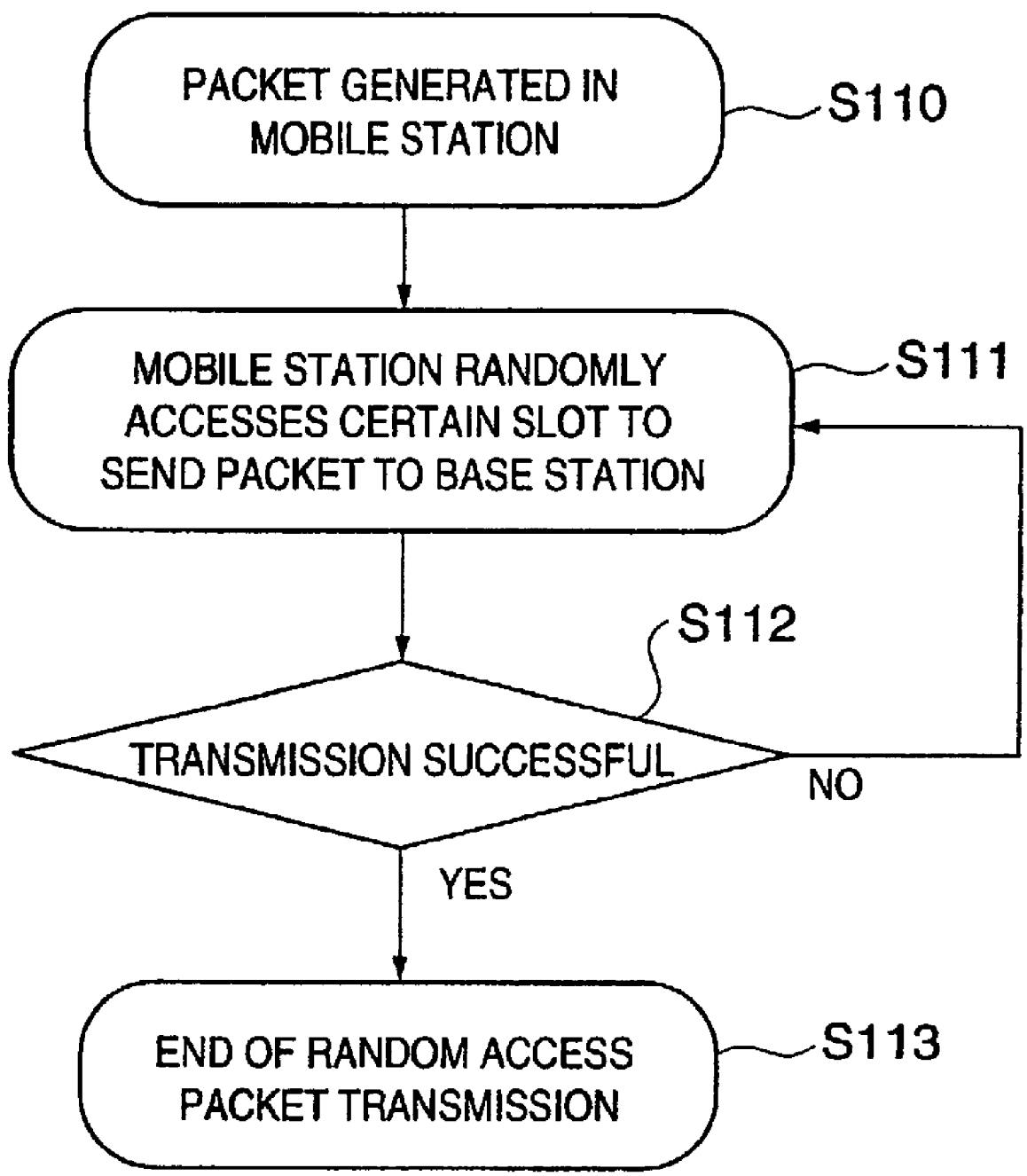
FIG. 17 is a drawing (No. 2) showing an example of an exchange of control performed between the mobile station and the base station when transmitting a packet from the mobile station to the base station.

FIG. 17 is a drawing showing an example of an exchange of control performed in a mobile station and a base station when packet transmission is carried out to the base station from the mobile station. The mobile station carries out a random access to one of time slots of a communication channel, and transmits a packet (S111).

Here, if it succeeds in transmission of a packet, the packet transmission will be ended (YES at S112). When it fails (NO at S112), the mobile station carries out a random access again to one of the time slots on the communication channel, and transmits the packet (S111).

Thus, the method, wherein the packet transmission of the mobile station is carried out by randomly accessing one of the time slots of the communication channels, without requiring a time slot assignment of the above-mentioned base station, is suitable when carrying out a packet transmission in a small transmission volume from the mobile station to the base station.

Figure 18:
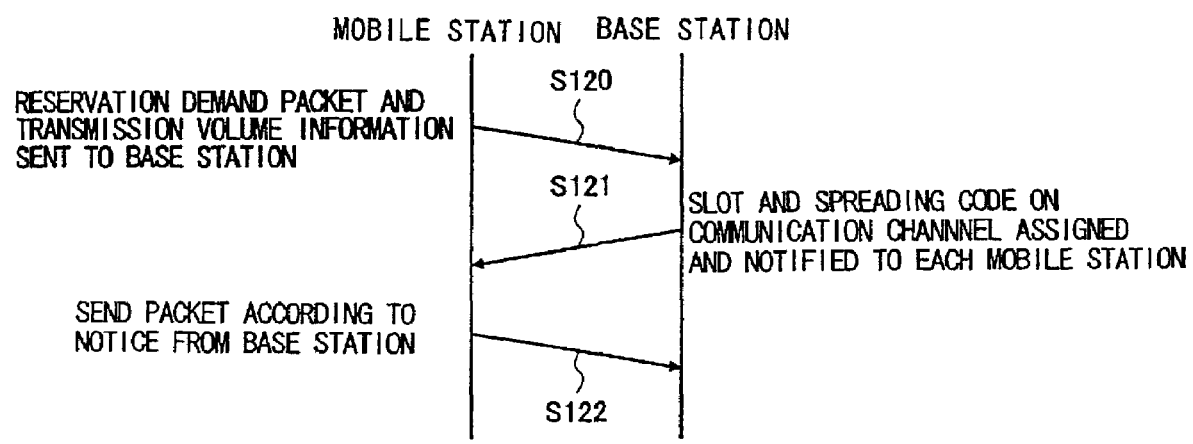
FIG. 18 is a drawing (No. 3) showing an example of an exchange of control performed between the mobile station and the base station when transmitting a packet from the mobile station to the base station.

FIG. 18 is a drawing showing an example of an exchange of control performed in the mobile station and the base station for changing a transmission speed according to a volume of packet transmissions that the mobile station is to transmit.

When the mobile station transmits a reservation demand packet to the base station and requires an assignment of a time slot and a spreading code first, the volume of the transmission is also communicated (S120).

Based on the information about the assignment demand and the transmission volume from the mobile station, the base station assigns a time slot and a spreading code on a communication channel according to the transmission volume of the mobile station, and notifies the result to the mobile station (S121).

The mobile station transmits packets based on the notified result (S122).

Thereby, it the transmission volume of the packets which the mobile station is to transmit is large, the base station will allocate a time slot that is capable of transmitting the big transmission volume (for example, two or more time slots) and a spreading code (for example, two or more spreading codes, and a spreading code of a small spreading factor), and if the transmission volume which the mobile station needs is small, the base station will allocate a time slot and a spreading code accordingly.

In this manner, the base station assigns a time slot and a spreading code adaptively according to the transmission volume of the mobile station.

As for the mobile station, a transmission speed according to the transmission volume is attained.

Next, a description will follow as to how the base station assigns a time slot and a spreading code for the reservation demand packet transmission, when the mobile station transmits the reservation demand packet to the base station.

From the mobile station to the base station, a simultaneous transmission of a plurality of packets of F×n× (the number of multiplexing of spreading codes) is attained as shown in FIG. 15.

In the present invention, some of these F×n× (the number of spreading multiplexing codes) are used for the reservation demand packet transmission.

Figure 19:
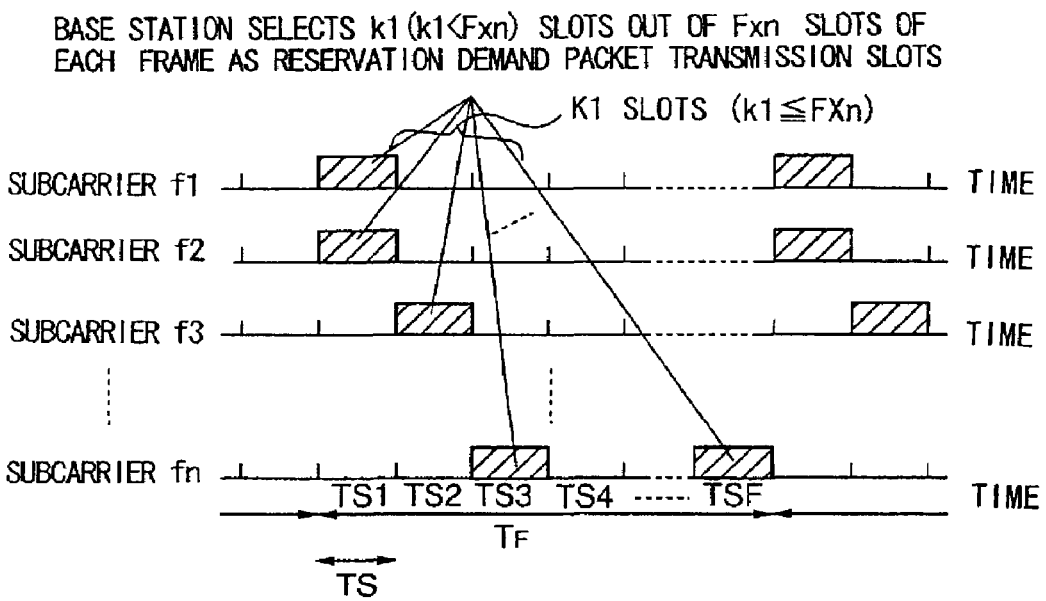
FIG. 19 is a drawing (No. 1) showing assignment of a reservation demand packet transmission slot in the second embodiment.

In FIG. 19, the base station assigns arbitrary k1 pieces (k1 being a natural number, and k1<=F×n) of time slots as the reservation demand packet transmission time slots out of the F×n pieces of time slots that are present in one frame. Then, the mobile station spreads the reservation demand packet by one of m1 pieces (m1 being a natural number, and m1<=total number of available spreading codes) of spreading codes determined beforehand by the base station and transmits the reservation demand packet in the time slot.

In FIG. 19, a time slot TS1 of a subcarrier f1, a time slot TS1 of a subcarrier f2, and a time-slot TS2 of a subcarrier f3 and the like are assigned as the reservation demand packet transmission time slots.

Figure 20:
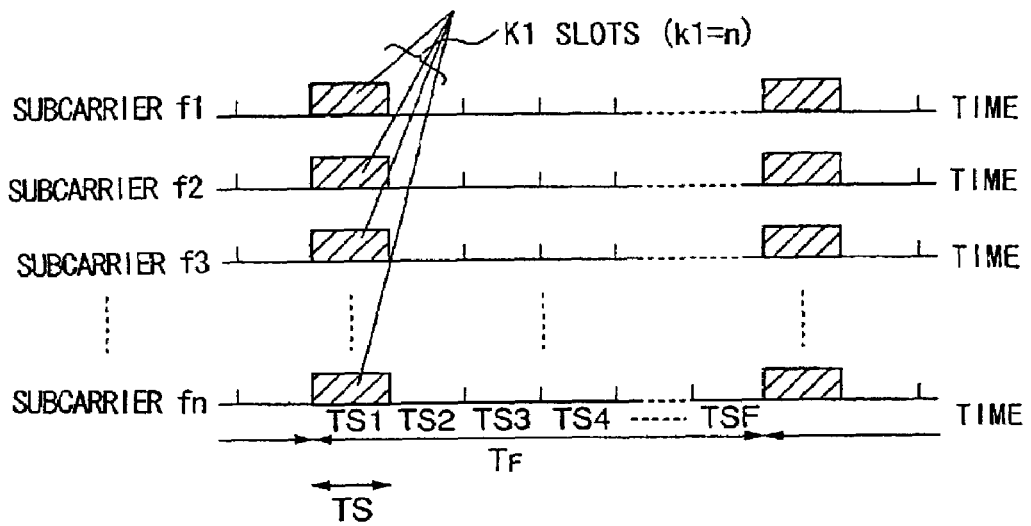
FIG. 20 is a drawing (No. 2) showing assignment of the reservation demand packet transmission slot.

In the case of FIG. 20, an example of the channel structure is shown wherein time slots TS1 generated for every frame in all subcarriers are set up as the reservation demand packet transmission time slots (k1=n).

FIG. 20 is the case where the time slots TS1 in all the subcarriers f1-fn are set up as the reservation demand packet transmission time slots.

Figure 21:
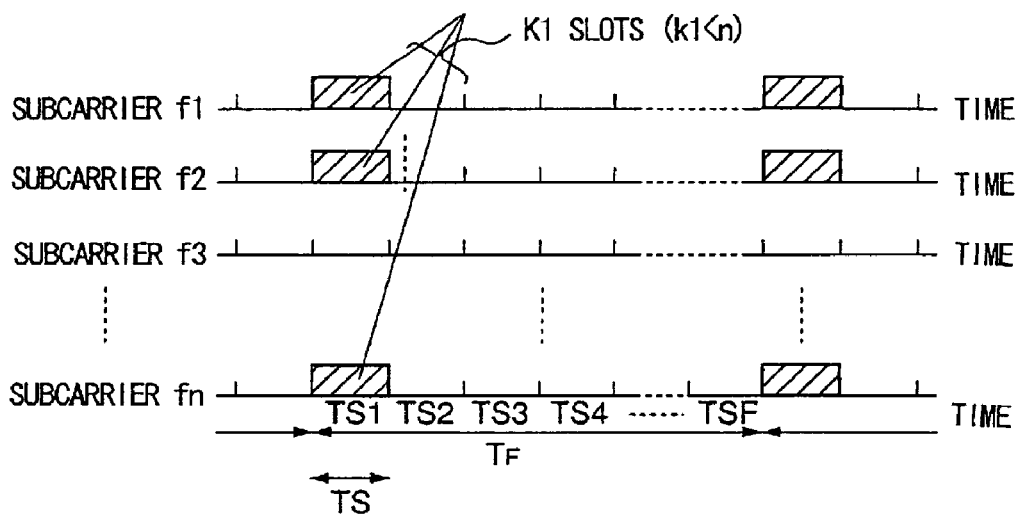
FIG. 21 is a drawing (No. 3) showing assignment of the reservation demand packet transmission slot.

In the case of FIG. 21, an example of the channel structure is shown, wherein part of the time slot TS1 is set up as the reservation demand packet transmission time slot (k1<n) in all subcarriers. Selection of the k1 pieces of the time slots may be dispersedly from any subcarriers, or may be continuously.

In FIG. 21, the time slot TS1 of the subcarrier f3 is not assigned as a reservation demand packet transmission time slot.

Figure 22:
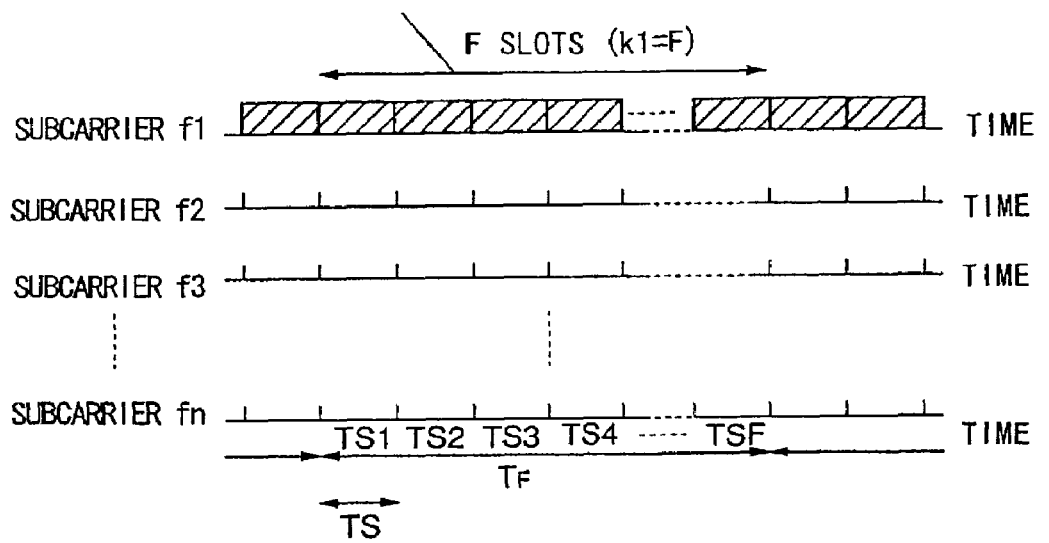
FIG. 22 is a drawing (No. 4) showing assignment of the reservation demand packet transmission slot.

In the case of FIG. 22, an example of the channel structure is shown, wherein all the time slots of one subcarrier are set up as the reservation demand packet transmission time slots (k1=F). Here, the number of subcarriers that set up reservation demand packet transmission time slots may be two or larger.

In FIG. 22, all the time slots of the subcarrier f1 are assigned as the reservation demand packet transmission time slots.

Figure 23:
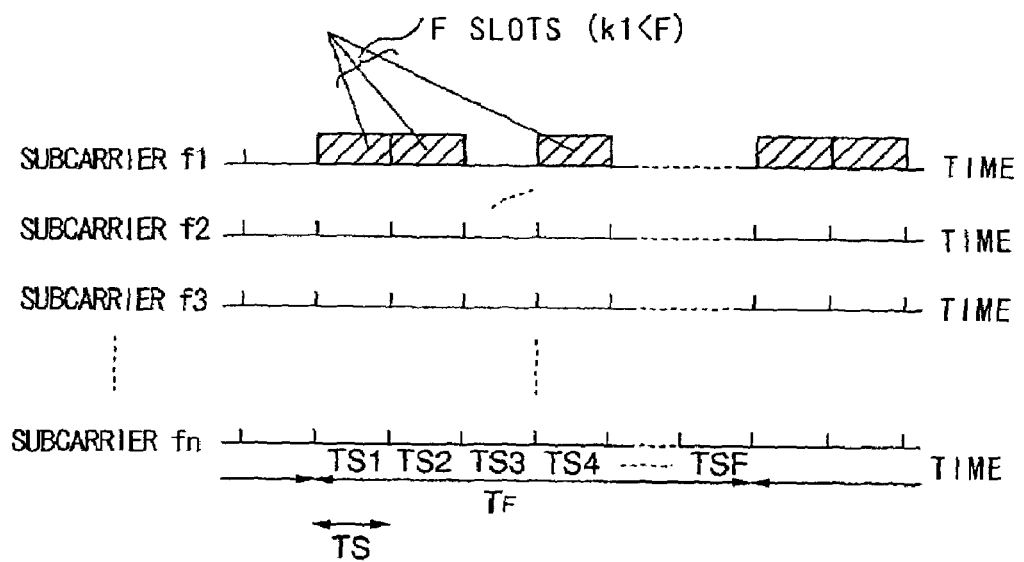
FIG. 23 is a drawing (No. 5) showing assignment of the reservation demand packet transmission slot.

In the case of FIG. 23, an example of the channel structure is shown, wherein some of the time slots of one subcarrier are set up as the reservation demand packet transmission time slots (k1<F). Selection of k1 pieces of the time slots may be from dispersed time slots, or continuous time slots.

In FIG. 23, TS1, TS2, TS4, and the like of the subcarrier f1 are assigned as the reservation demand packet transmission time slots.

When there are numerous reservation demand packets during a predetermined period from a mobile station, a reservation demand may not be responded. Then, according to the number of the reservation demand packets the number of time slots, the number of spreading codes, and the like for the reservation demand packet transmission are changed.

Figure 24:
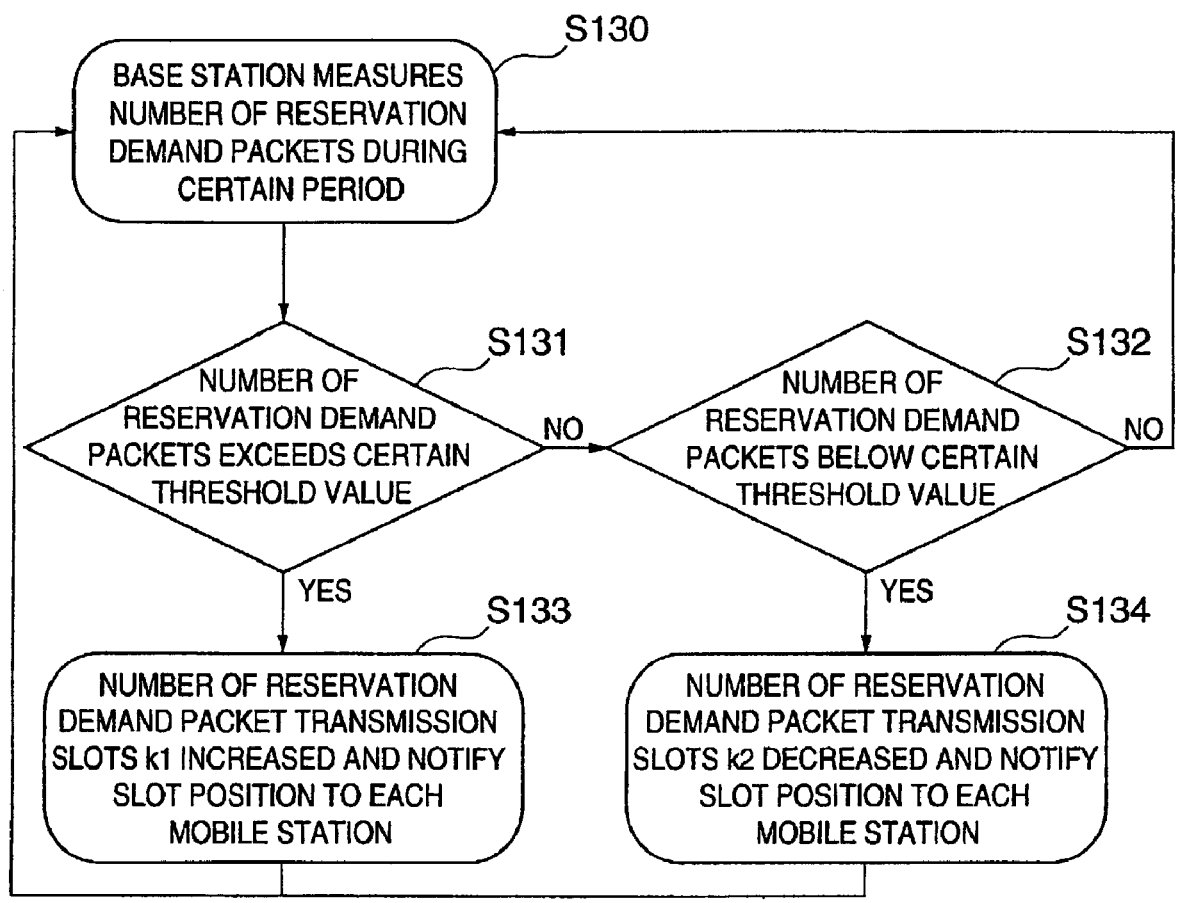
FIG. 24 is a drawing showing changes of the number of time slots for the reservation demand packet transmission.

In the case of FIG. 24, it is a drawing showing an example of control performed in the base station when the base station is changing the number of reservation demand packet transmission time slots k1 (k1 being a natural number, k1<=F×n) according to the number of the reservation demand packets during a predetermined period from the mobile station.

The base station measures the number of the reservation demand packets transmitted from the mobile station during the predetermined period (S130).

If the measuring result indicates that the number of the reservation demand packets is larger than a certain threshold (YES in S131), the number of the reservation demand packet transmission slots is increased, and the position of the time slot is notified to the mobile station (S133).

If the measuring result indicates that the number of the reservation demand packets is below the threshold (YES in S132), the number of the reservation demand packet transmission slots is decreased, and the position of the time slot is notified to the mobile station (S134).

If the number of the reservation demand packets is not larger than the threshold (NO in S131) and the number of the reservation demand packets is not below the threshold (NO in S132), the number of the reservation demand packet transmission slots is not changed.

The mobile station transmits a reservation demand packet according to the position of the reservation demand packet transmission time slot notified from the base station.

Figure 25:
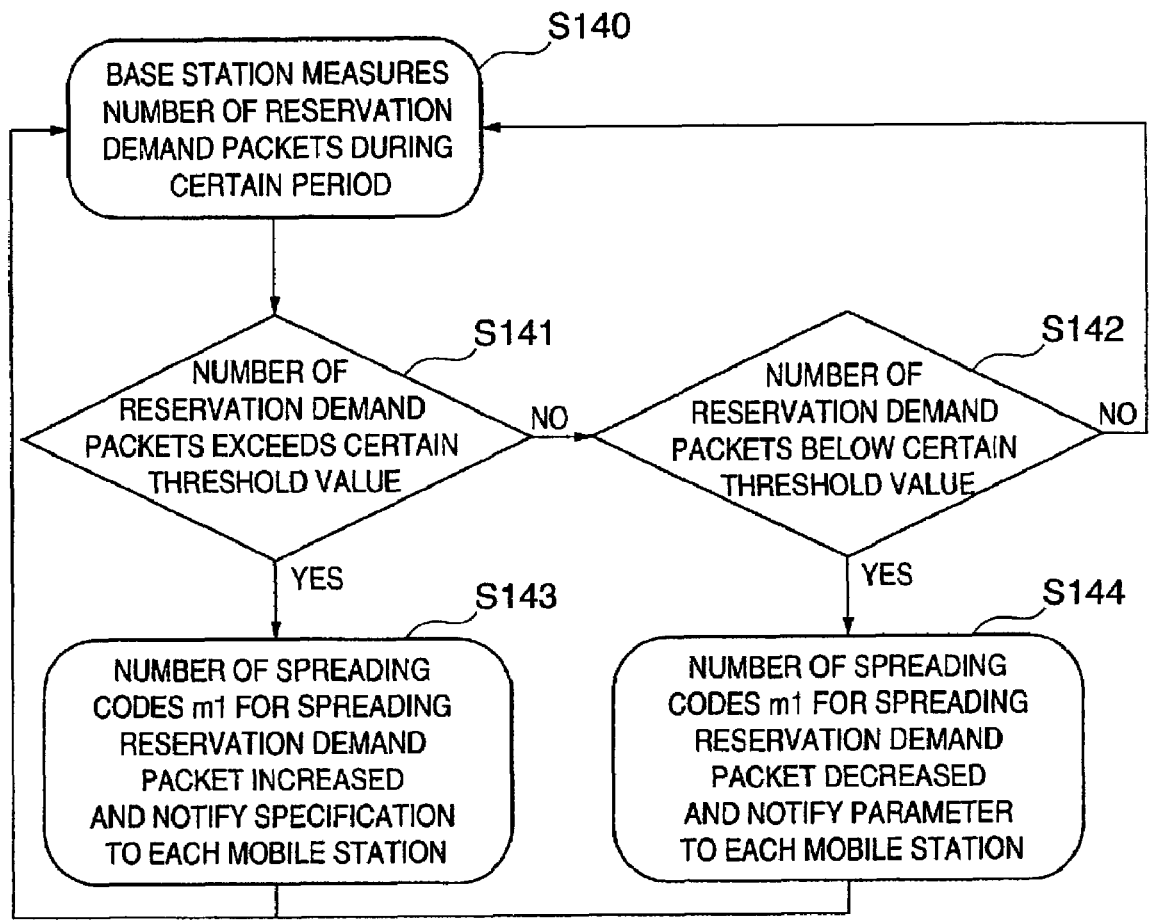
FIG. 25 is a drawing showing changes of the number of spreading codes for the reservation demand packet transmission.

FIG. 25 is a drawing showing an example of control performed in the base station when the base station changes the number m1 (m1 being a natural number, and m1<=total number of available spreading codes) of the spreading codes for the reservation demand packet transmission according to the number of the reservation demand packets from the mobile station during the predetermined period.

The base station measures the number of the reservation demand packets transmitted from the mobile station during the predetermined period (S140).

If the measuring result indicates that the number of the reservation demand packets is larger than a certain threshold (YES in S141), the spreading code m1 for spreading a reservation demand packet is increased, and its specification is notified to the mobile station (S143).

If the measuring result indicates that the number of the reservation demand packets is below the threshold (YES in S142), the number m1 of spreading codes for spreading the reservation demand packet is decreased, and its parameter is notified to the mobile station (S144).

When the number of the reservation demand packets is not larger than the threshold (NO in S141) and the number of the reservation demand packets is not below the threshold (NO in S142), the spreading code for spreading the reservation demand packet is not changed.

The mobile station chooses one from the spreading codes for the reservation demand packet transmission notified from the base station, and spreads and transmits the reservation demand packet.

Figure 26:
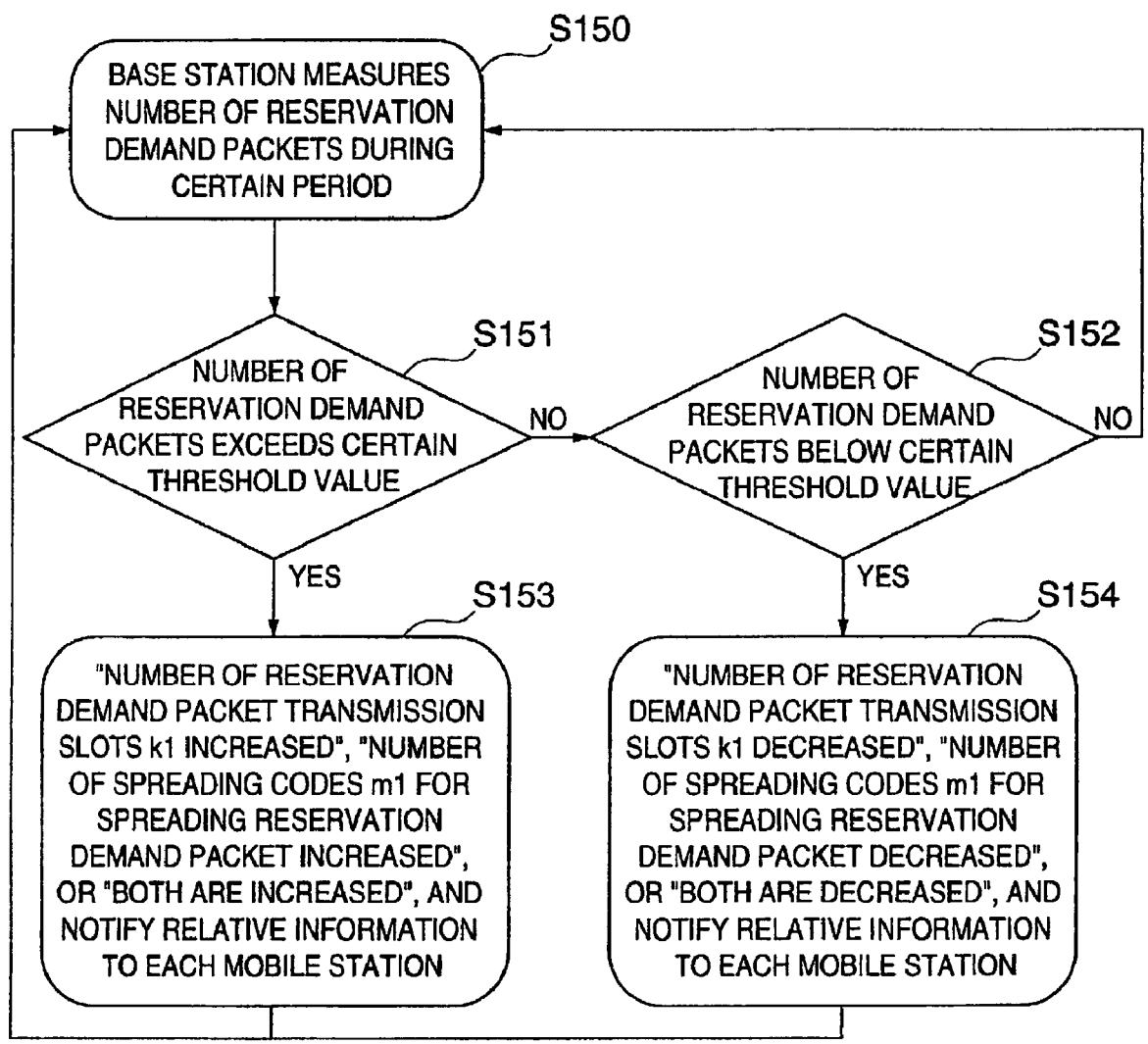
FIG. 26 is a drawing showing changes of the number of time slots, and the number of spreading codes for the reservation demand packet transmission.

FIG. 26 is a drawing showing an example of control performed in the base station when the base station changes the number of the above-mentioned reservation demand packet transmission time slots k1 (k1 being a natural number, and k1<=F×n), and the number of the spreading codes for the reservation demand packet transmission m1 (m1 being a natural number, and m1<=total number of available spreading codes) according to the number of the reservation demand packets from the mobile station during the predetermined period.

The base station measures the number of the reservation demand packets transmitted from the mobile station during the predetermined period (S150).

If the measuring result indicates that the number of the reservation demand packets is more than a certain threshold (YES in S151), "the number of spreading codes m1 for spreading a reservation demand packet is increased", "the number of reservation demand packet transmission slots k1 is increased" or "both are increased", and the fact is notified to the mobile station (S153).

If the measuring result indicates that the number of the reservation demand packets is below the threshold (YES in S152), "the number of spreading codes m1 for spreading a reservation demand packet is decreased", "the number of reservation demand packet transmission slots k1 is decreased" or "both are decreased", and the fact is notified to the mobile station (S154).

When the number of the reservation demand packets is not larger than the threshold (NO in S151) and the number of the reservation demand packets is not below the threshold (NO in S152), "the number of spreading codes for spreading a reservation demand packet" and "the number of reservation demand packet transmission slots" are not changed.

The mobile station chooses one from the positions of the reservation demand packet transmission time slots and spreading codes for the reservation demand packet transmission notified from the base station for spreading and transmitting a reservation demand packet.

Figure 27:
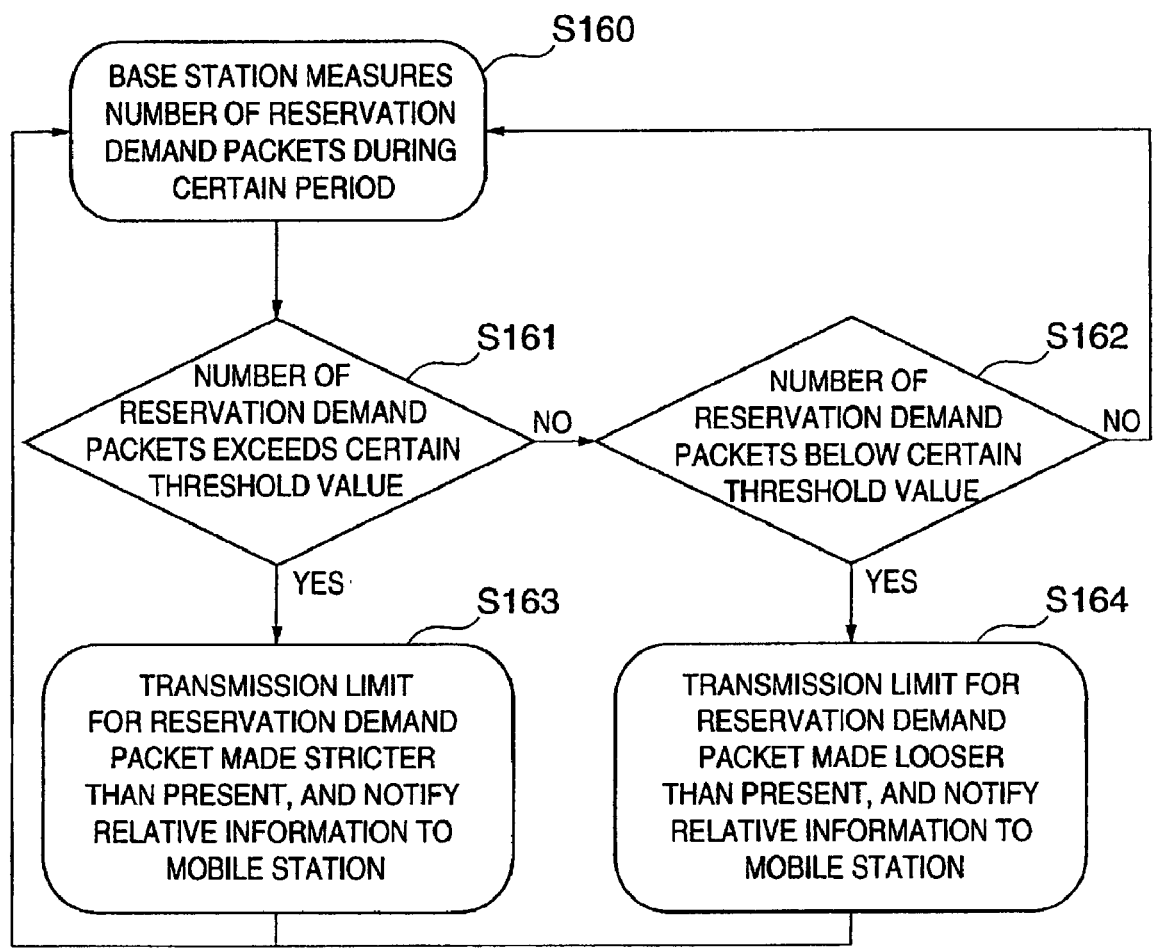
FIG. 27 is a drawing showing a transmission limit of the reservation demand packet.

FIG. 27 is a drawing showing an example of control performed in the base station in the case of the base station limiting transmission of a reservation demand packet from the mobile station (for example, transmission of a reservation demand packet being restricted temporarily) since a possibility of inaccurate transmission of a reservation demand packet increases when the number of the reservation demand packets increases, and the mobile station transmitting a reservation demand packet according to the limit.

The base station measures the number of the reservation demand packets transmitted from the mobile station during a predetermined period (S160).

If the measuring result indicates that the number of the reservation demand packets is larger than a certain threshold with (YES in S161), a transmission limit for a reservation demand packet is made stricter than the current condition, and the fact is notified to the mobile station (S163).

If the measuring result indicates that the number of the reservation demand packets is below the threshold (YES in S162), the transmission limit of the reservation demand packet is made looser than the current condition, and the fact is notified to the mobile station (S164).

If the number of the reservation demand packets is not larger than the threshold (NO in S161) and the number of the reservation demand packets is not below the threshold, the transmission limit is not changed (NO in S162).

For a mobile station making a random access, the base station assigns k2 pieces (k2 being a natural number, and k2<=F×n) of time slots for the packet transmission, and further assigns m2 pieces (m2 being a natural number, and m2<=total number of available spreading codes) of spreading codes for spreading a random access packet.

The mobile station spreads the random access packet by one of the assigned spreading codes and transmits in the assigned time slot.

As shown in FIG. 28, the base station assigns arbitrary k2 pieces (k2 being a natural number, and k2<=F×n) as random access packet transmission time slots out of the of the F×n time slots that are present in one frame. And the mobile station spreads the random access packet by one of the m2 pieces (m2 being a natural number, and m2<=total number of available spreading codes) of spreading codes determined by the base station beforehand and transmits in the random access packet transmission time slots.

In FIG. 28, the time slot TS1 of the subcarrier f1, the time slot TS1 of the subcarrier f2, and the time-slot TS2 of the subcarrier f3 and the like are assigned as the random access packet transmission time slots.

Figure 29:
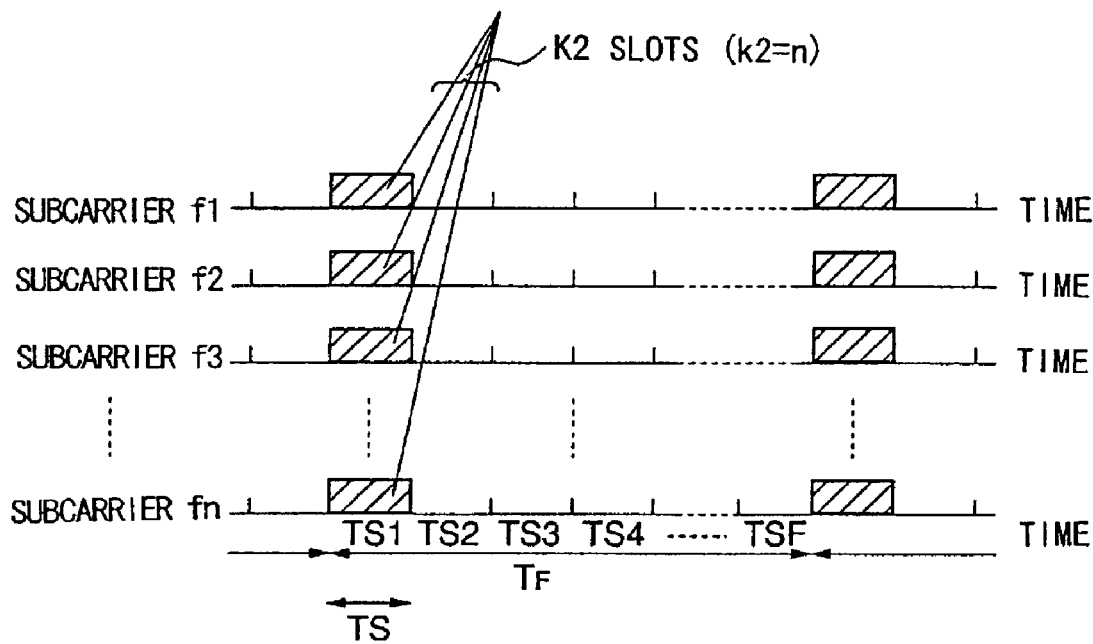
FIG. 29 is a drawing (No. 2) showing assignment of the random access packet transmission slot.

FIG. 29 shows an example of the channel structure wherein time slots of the time slot TS1 in all subcarriers generated for every frame are set up as the random access packet transmission time slots (k2=n).

In FIG. 29, the time slots TS1 of all subcarriers are assigned as the random access packet transmission time slots.

Figure 30:
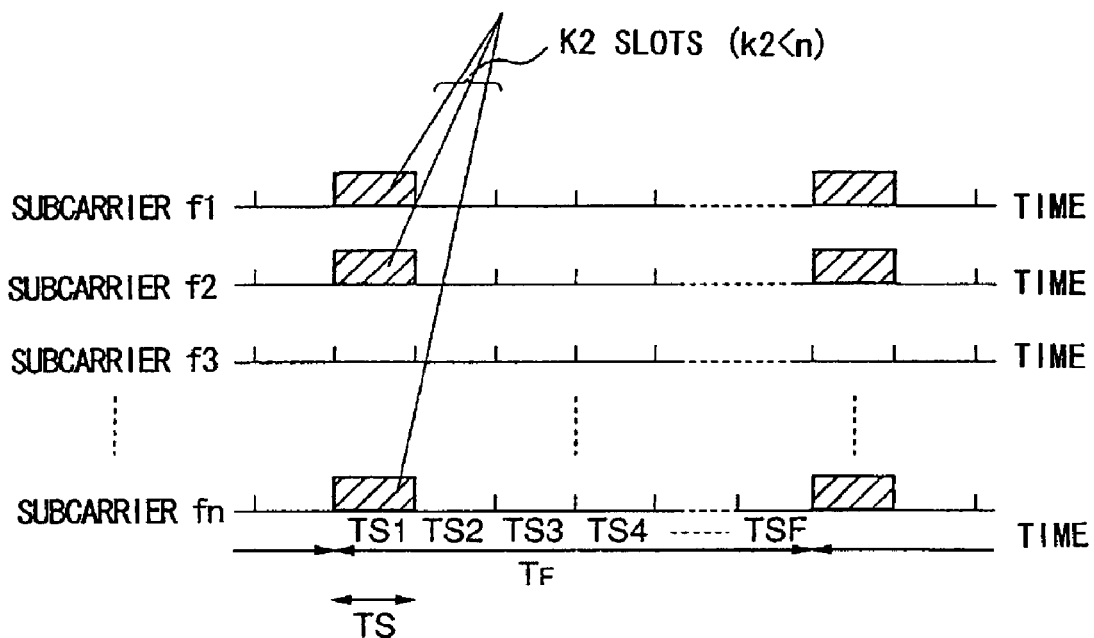
FIG. 30 is a drawing (No. 3) showing assignment of the random access packet transmission slot.

FIG. 30 shows an example of the channel structure where the time slots of the time slot TS1 generated for every frame of some subcarriers are set up as the random access packet transmission time slots (k2<n). Selecting the k2 pieces of the time slots may be from dispersed subcarriers, or from subcarriers adjacent each other.

In FIG. 30, the time slot TS1 of the subcarrier f3 is not assigned as a random access packet transmission time slot.

Figure 31:
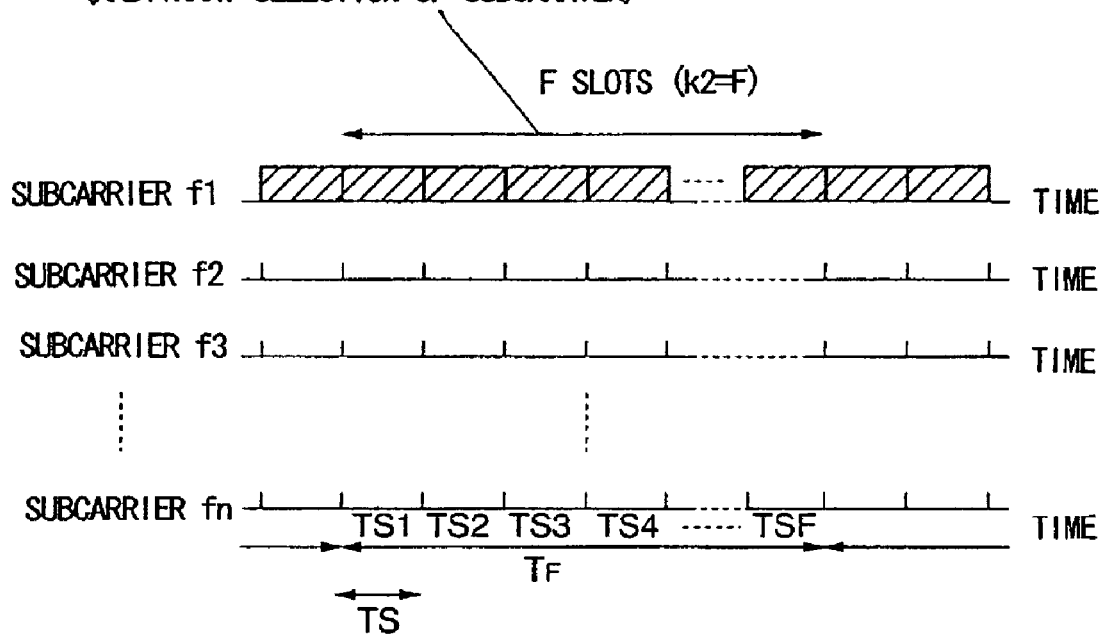
FIG. 31 is a drawing (No. 4) showing assignment of the random access packet transmission slot.

FIG. 31 shows an example of the channel structure where all the time slots of one subcarrier are set up as the random access packet transmission time slots (k2=F).

In FIG. 31, all the time slots of the subcarrier f1 are assigned as the random access packet transmission time slots.

Figure 32:
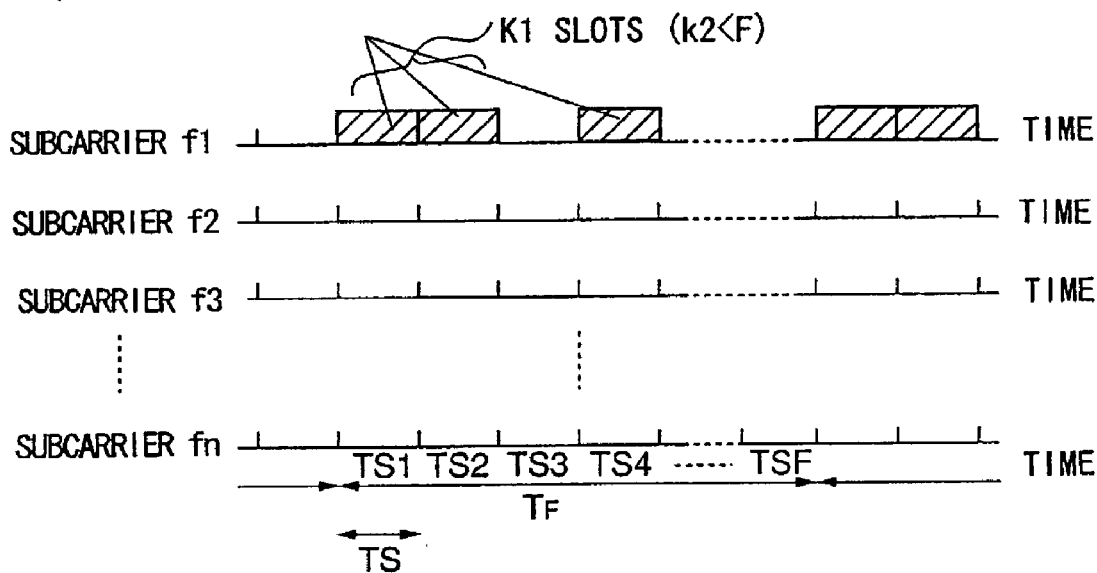
FIG. 32 is a drawing (No. 5) showing assignment of the random access packet transmission slot.

FIG. 32 shows an example of the channel structure where part of time slots of one subcarrier are set up as the random access packet transmission time slots (k2<F).

In FIG. 32, the time slot TS1, the time slot TS2, and the time-slot TS4 and the like of the subcarrier f1 are assigned as the random access packet transmission time slots.

Selecting the k2 pieces of time slots may be from dispersed time slots, or time slots adjacent each other.

If there are numerous random access packets during the predetermined period from mobile stations, a chance may arise that communication is not available. Then, according to the number of random access packets during the predetermined period, the number of random access packet transmission time slots, a spreading code, and the like are changed.

Figure 33:
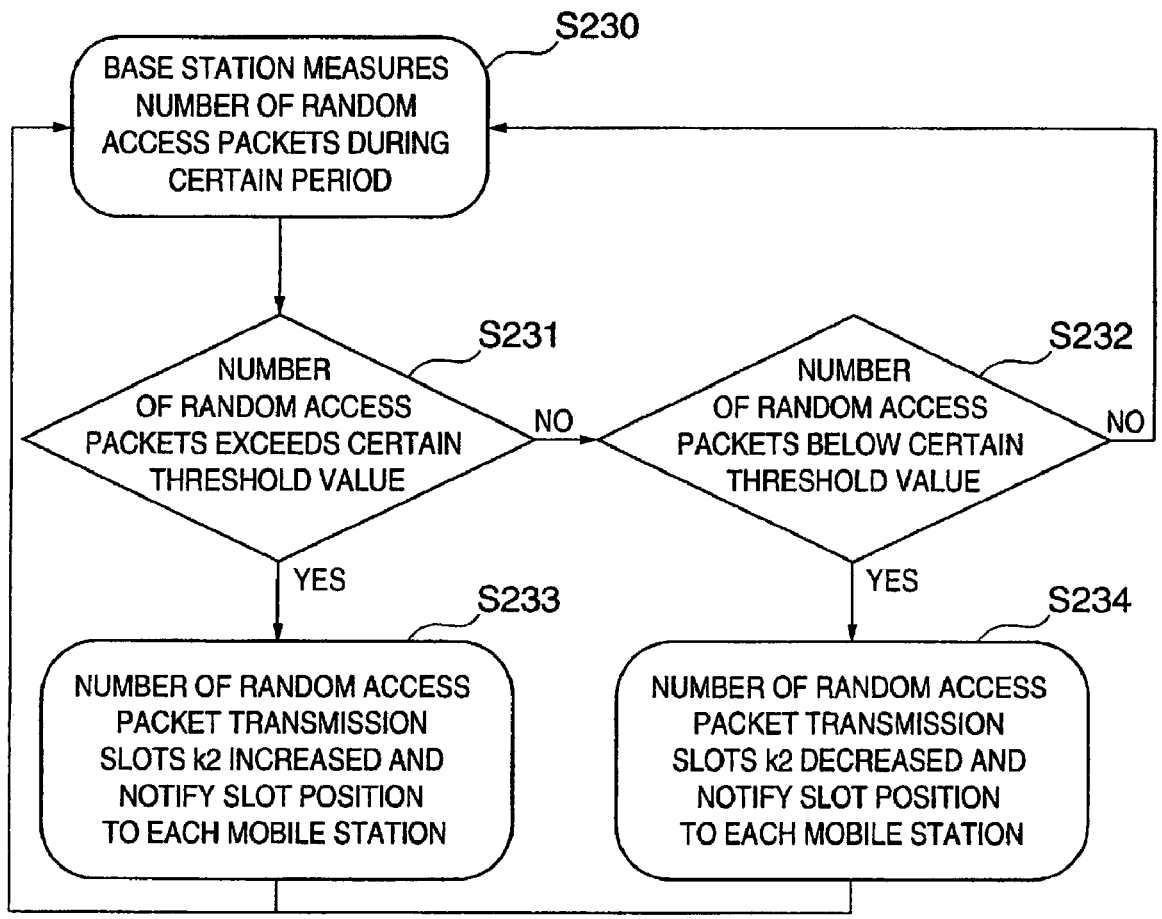
FIG. 33 is a drawing showing changes of the number of time slots for the random access packet transmission.

In the case of FIG. 33, it is a drawing showing an example of control performed in the base station when the base station changes the number of random access packet transmission time slots k2 (k2 being a natural number, and k2<=F×n) according to the number of random access packets from the mobile stations during the predetermined period.

The base station measures the number of random access packets transmitted from the mobile stations during the predetermined period (S230).

If the measuring result indicates that the number of the random access packets is more than a certain threshold (YES in S231), the number of random access packet transmission slots is increased, and the position of the time slot is notified to the mobile stations (S233).

If the measuring result indicates that the number of random access packets is below the threshold (YES in S232), the number of the random access packet transmission slots is decreased, and the position of the time slot is notified to the mobile stations (S234).

If the number of the random access packets is not more than the threshold (NO in S231) and the number of the random access packets is not below the threshold (NO in S232), the number of the random access packet transmission slots is not changed.

Figure 34:
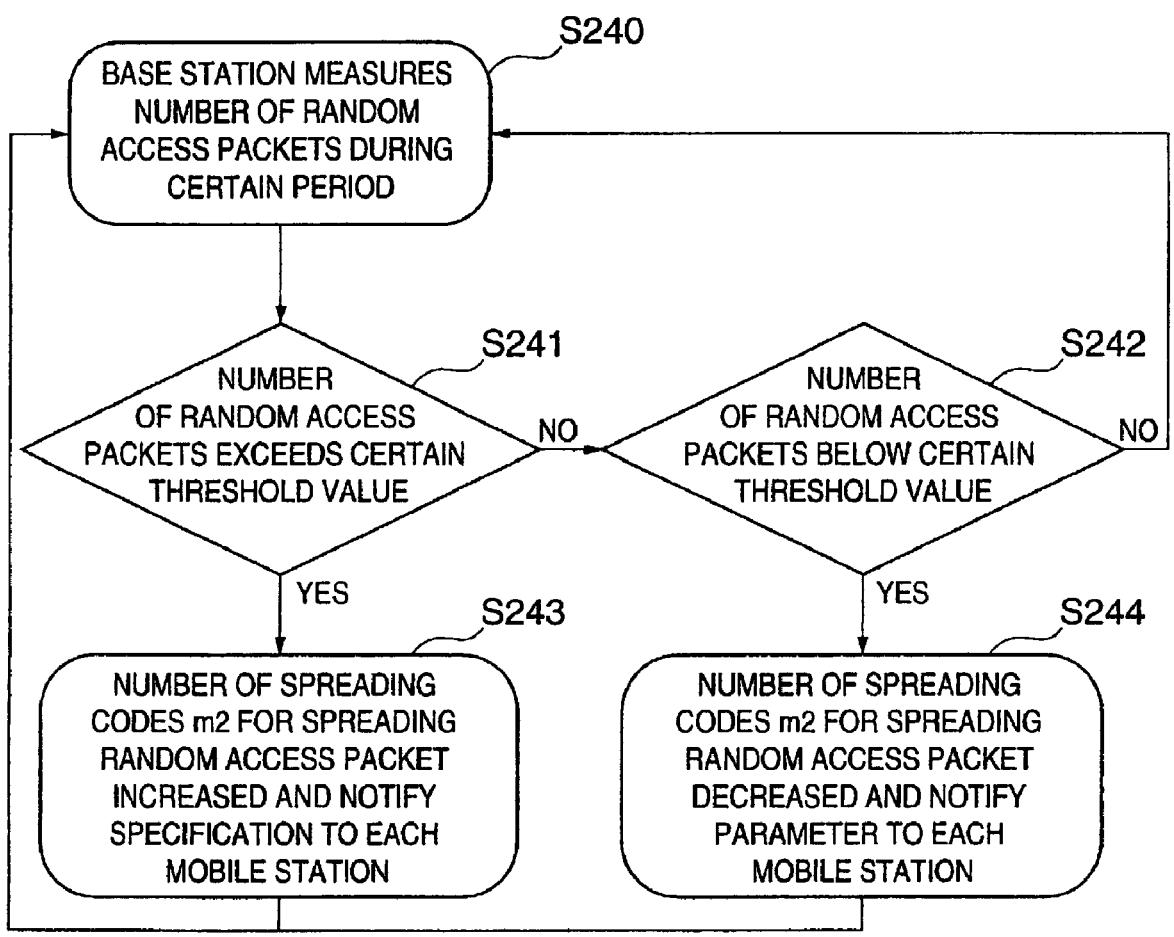
FIG. 34 is a drawing showing changes of the number of spreading codes for the random access packet transmission.

The mobile station transmits a random access packet according to the position of the random access packet transmission time slot notified from the base station FIG. 34 is a drawing showing an example of control performed in the base station when the base station changes the number of the spreading codes m2 (m2 being a natural number, and m2<=total number of available spreading codes) for the random access packet transmission according to the number of random access packets from the mobile station during the predetermined period.

The base station measures the number of the random access packets transmitted from the mobile stations during a predetermined period (S240).

If the measuring result indicates that the number of random access packets is larger than a certain threshold (YES in S241), the number of spreading codes m2 for spreading a random access packet is increased, and its parameter is notified to the mobile station (S243).

If the measuring result indicates that the number of the random access packets is below the threshold (YES in S242), the number of the spreading codes m2 for spreading the random access packet is decreased, and its specification is notified to the mobile station (S244).

When the number of random access packets is not more than the threshold (NO in S241) and the number of the random access packets is not below the threshold (NO in S242), the number of the spreading codes for spreading the random access packet is not changed.

The mobile station chooses one from the spreading codes notified from the base station for the random access packet transmission, and spreads and transmits the random access packet.

Figure 35:
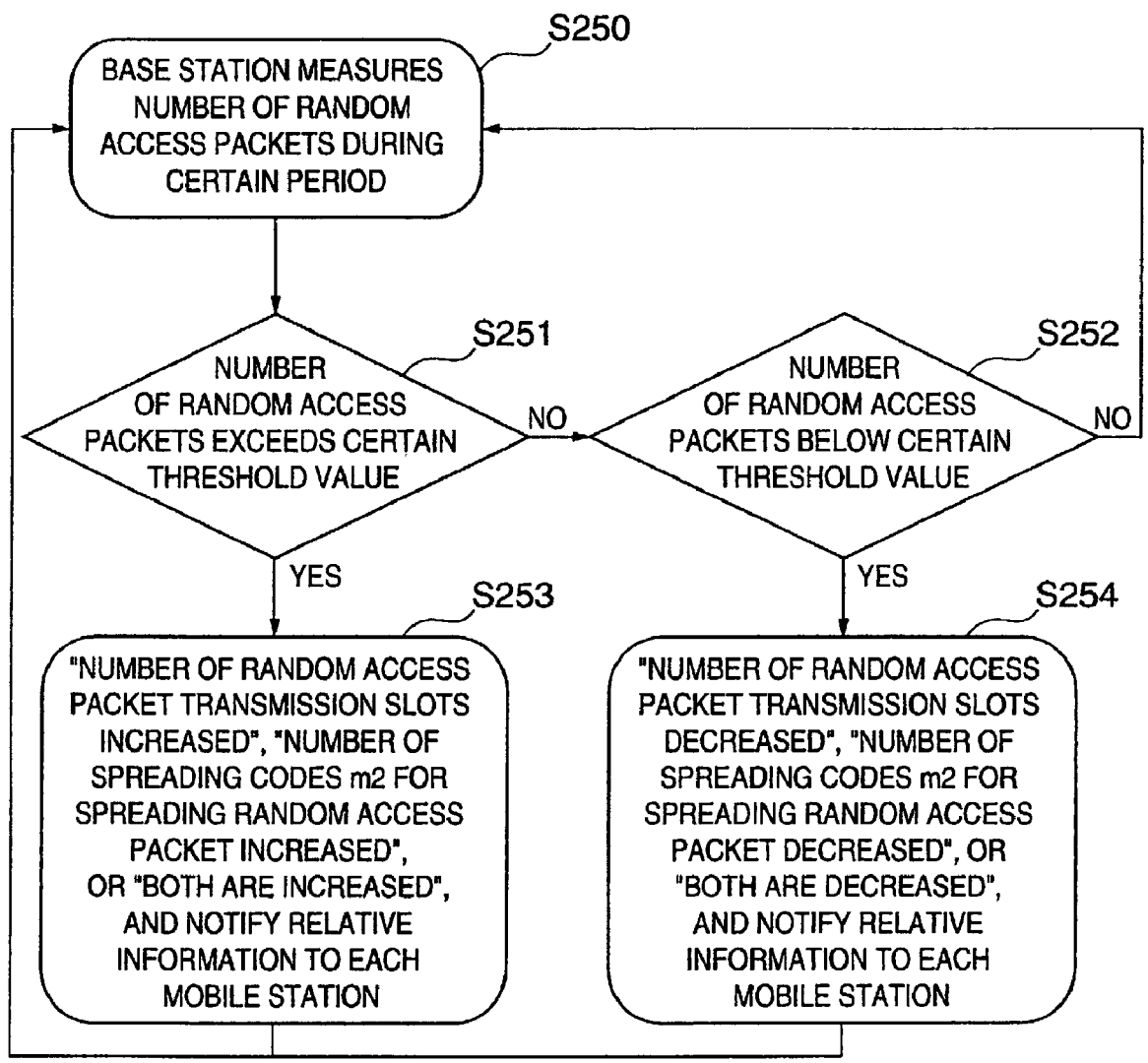
FIG. 35 is a drawing showing changes of the number of time slots, and the number of spreading codes for the random access packet transmission.

FIG. 35 is a drawing showing an example of control performed in the base station when the base station changes the number of the above-mentioned random access packet transmission time slots k2 (k2 being a natural number, and k2<=F×n), and the number of the spreading codes for the random access packet transmission m2 (m2 being a natural number, and m2<=total number of available spreading codes) according to the number of the random access packets from the mobile station during the predetermined period.

The base station measures the number of the random access packets transmitted from the mobile stations during the predetermined period (S250).

If the measuring result indicates that the number of the random access packets is larger than the threshold (YES in S251), "the number of the spreading codes for spreading the random access packet m2 is increased" or "the number of the random access packet transmission slots k2 is increased" or "both are increased", and the fact thereof is notified to the mobile station (S253).

If the measuring result indicates that the number of the random access packets is below the threshold (YES in S252), "the number of the spreading codes for spreading the random access packet m2 is decreased" or "the number of the random access packet transmission slots k2 is decreased" or "both are decreased", and the fact thereof is notified to the mobile station (S254).

If the number of the random access packets is not more than the threshold (NO in S251) and the number of the random access packets is not below the threshold (NO in S252), "the number of the spreading codes for spreading the random access packet" and "the number of the random access packet transmission slots" are not changed.

The mobile station chooses one from the positions of the random access packet transmission time slots and the spreading codes for the random access packet transmission, which are notified from the base station, and spreads and transmits the random access packet.

Figure 36:
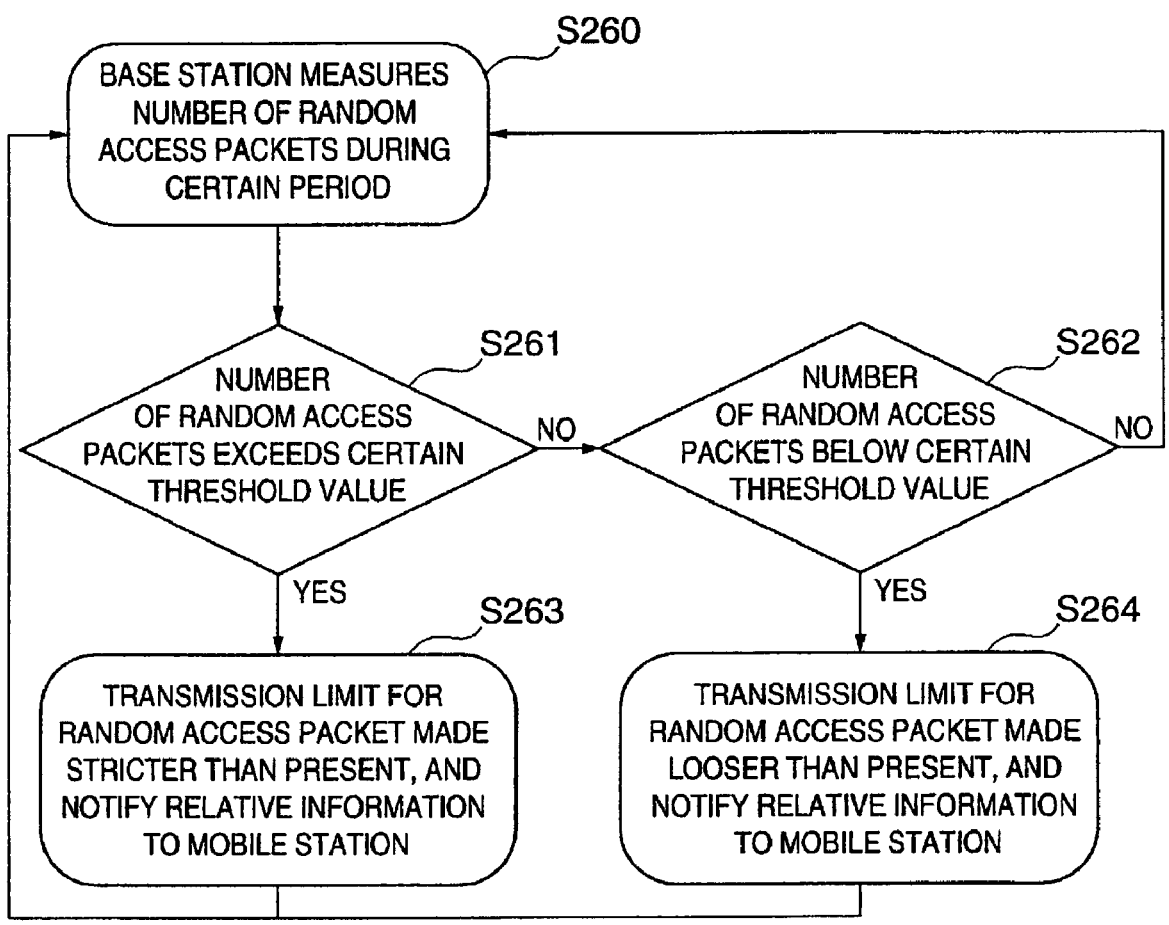
FIG. 36 is a drawing showing a transmission limit of the random access packet.

FIG. 36 shows an example of control performed in the base station when the base station restricts transmission of a random access packet from a mobile station (for example, transmission is restricted temporarily) and the mobile station transmits the random access packet according to the limit, when the number of the random access packets increases, since there is a possibility that transmission of the random access packets may not be performed accurately.

The base station measures the number of the random access packets transmitted from the mobile station during the predetermined period (S260).

If the measuring result indicates that the number of the random access packets is larger than the threshold (YES in S261), a transmission limit of the random access packet is made stricter than the current condition, and the fact thereof is notified to the mobile station (S263).

If the measuring result indicates that the number of the random access packets below the threshold (YES in S262), the transmission limit of a random access packet is made looser than the current condition, and the fact thereof is notified to the mobile station (S264).

The transmission limit is not changed, when the number of the random access packets is not larger than the threshold (NO in S261) and the number of the random access packets is not below the threshold (NO in S262).

In the second embodiment of the present invention, a mobile station changes a transmission speed according to the magnitude of the transmission volume of packets that the mobile station is to transmit. In the following, a mode of the change of the transmission speed according to the transmission volume is shown.

Figure 37:
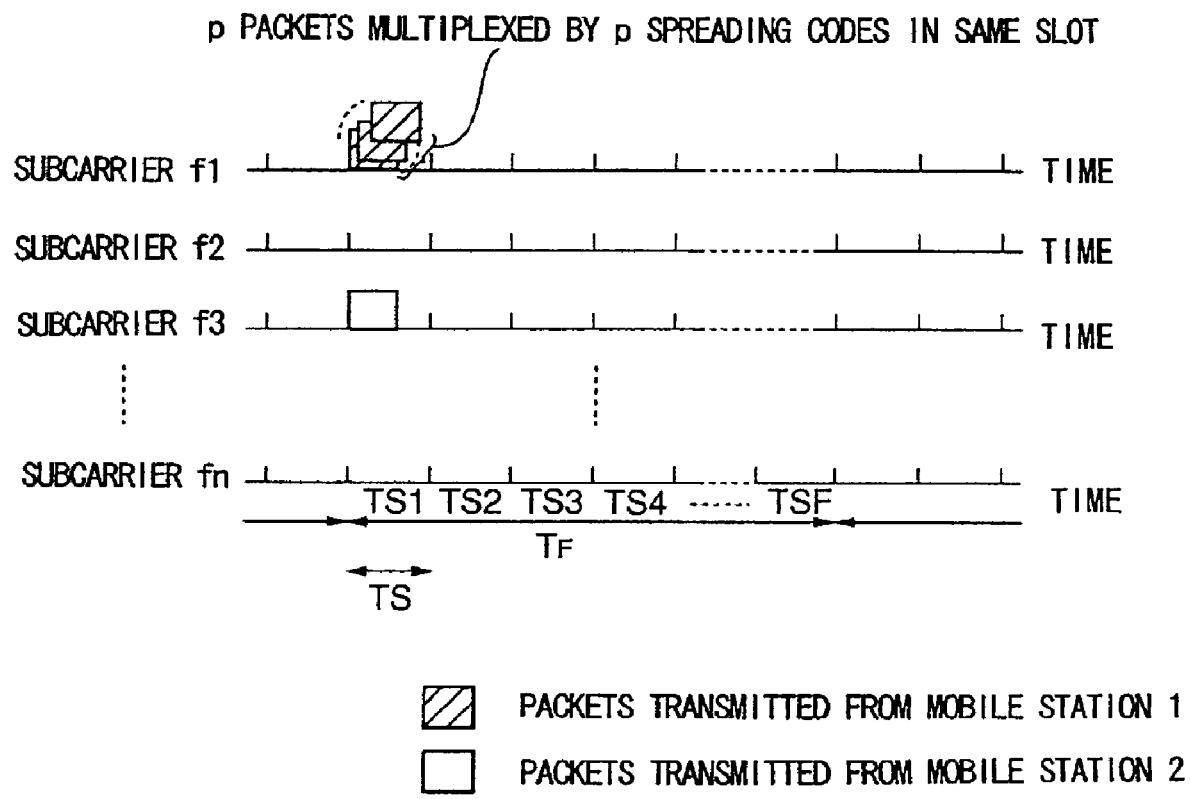
FIG. 37 is a drawing (No. 1) showing assignment of spreading codes according to a transmission volume.

In FIG. 37, an example is shown wherein a mobile station 1 uses p pieces of spreading codes for packet multiplexing and transmits the packets at a transmission speed p times as fast in comparison with a transmission speed of a mobile station 2.

Figure 38:
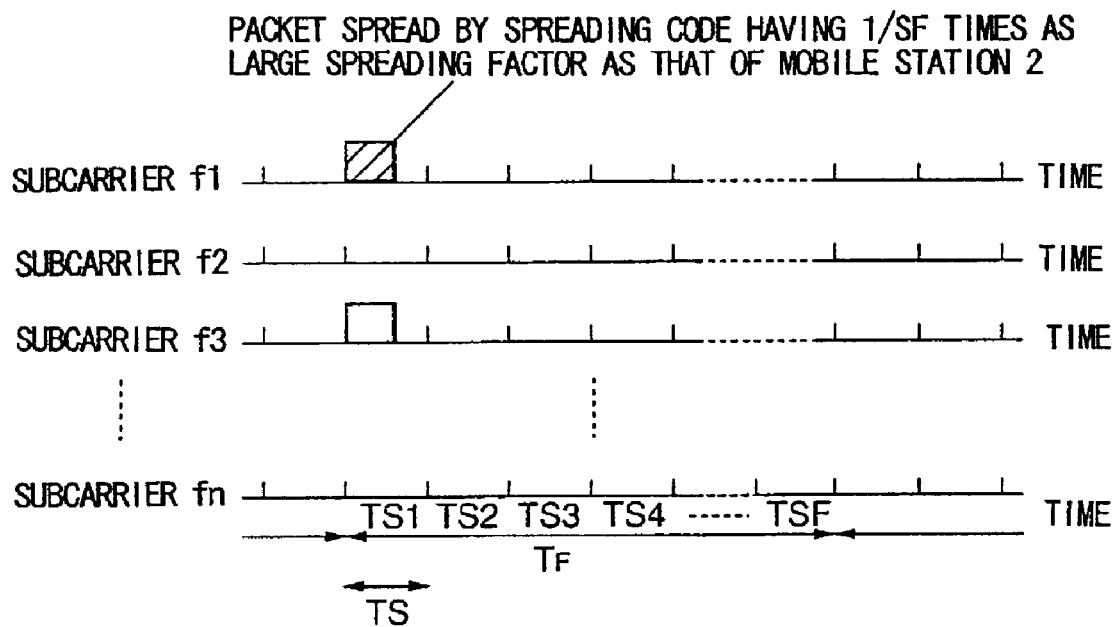
FIG. 38 is a drawing (No. 2) showing assignment of the spreading code according to the transmission volume.

FIG. 38 is a drawing showing an example which realizes a variable transmission speed by a base station assigning a mobile station a spreading code, spreading factor of which is changed according to the transmission volume of the mobile station within one time slot TS of a communication channel.

FIG. 38 shows how the transmission speed of the mobile station 1 is made SF times as fast as compared with the mobile station 2 (a chip rate being the same) by using a spreading code, spreading factor of which is 1/SF of the spreading code for the mobile station 2, for spreading packets of the mobile station 1.

Figure 39:
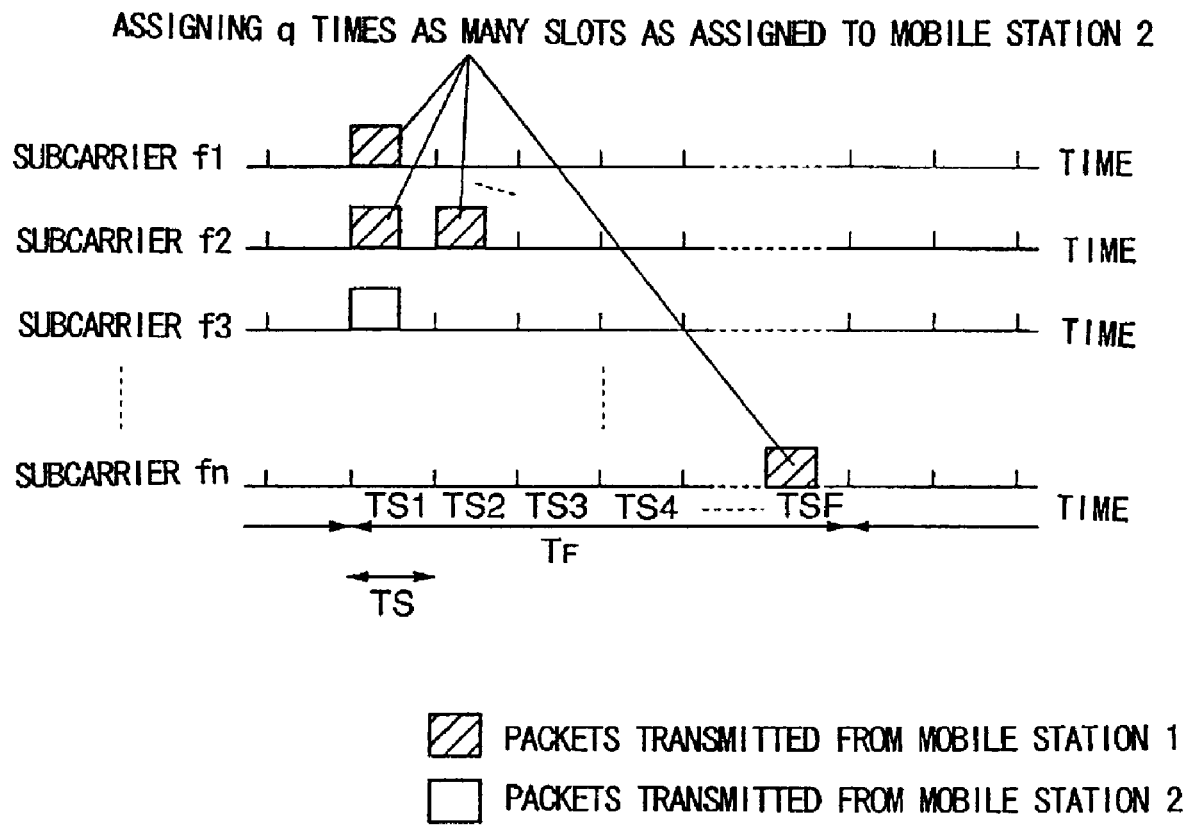
FIG. 39 is a drawing showing assignment of the number of time slots according to the transmission volume.

FIG. 39 is a drawing showing an example which realizes a variable transmission speed by the base station assigning arbitrary q pieces of time slots (q being a natural number, and q<=F×n) to a mobile station within one frame of a communication channel according to a transmission volume of the mobile station.

FIG. 40, FIG. 41, FIG. 42, and FIG. 43 describe an embodiment wherein how the base station performs an assignment by changing at least two of the number of spreading codes p, a spreading factor of the spreading code, the number of time slots q, according to the transmission volume of the mobile station.

Figure 40:
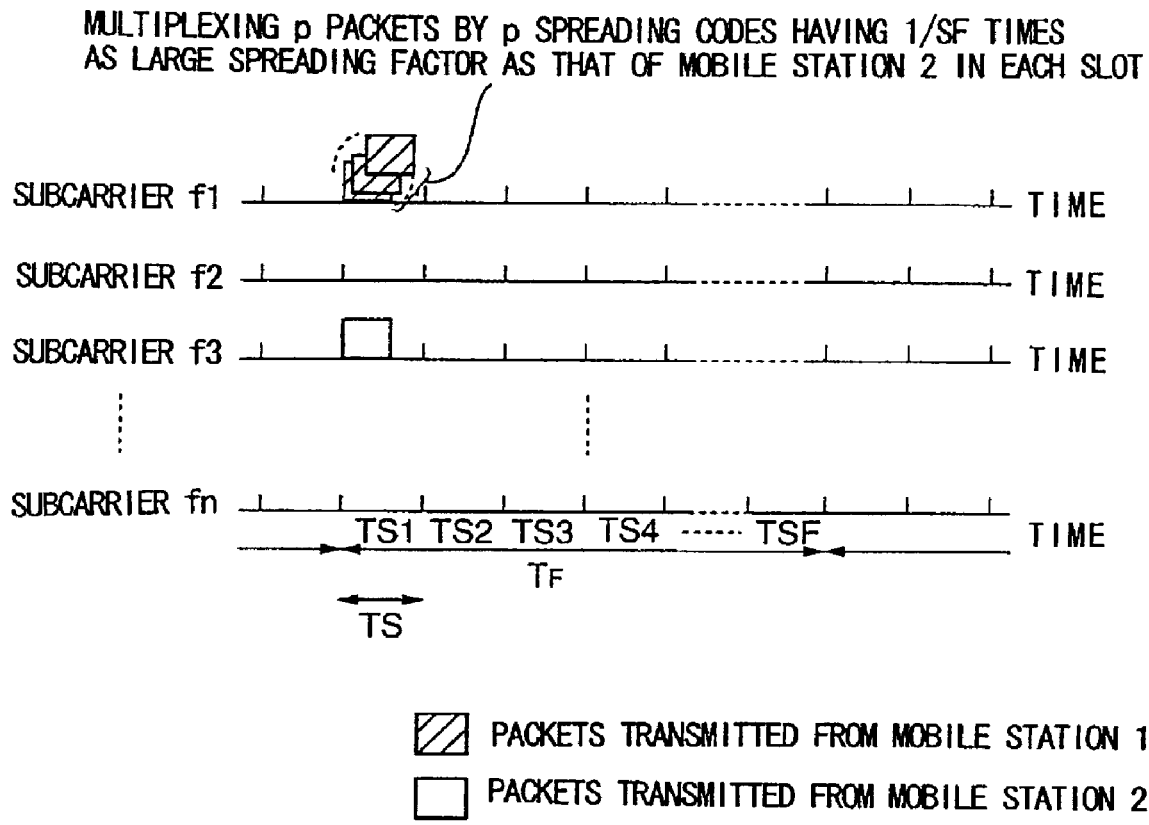
FIG. 40 is a drawing (No. 3) showing assignment of the spreading code according to the transmission volume.

In FIG. 40, the transmission speed of the mobile station 1 is set at p×SF times in comparison with the mobile station 2, by assigning the mobile station 1 spreading codes that have a 1/SF spreading factor of the spreading factor of the spreading code of the mobile station 2, in addition to as described in FIG. 38

Figure 41:
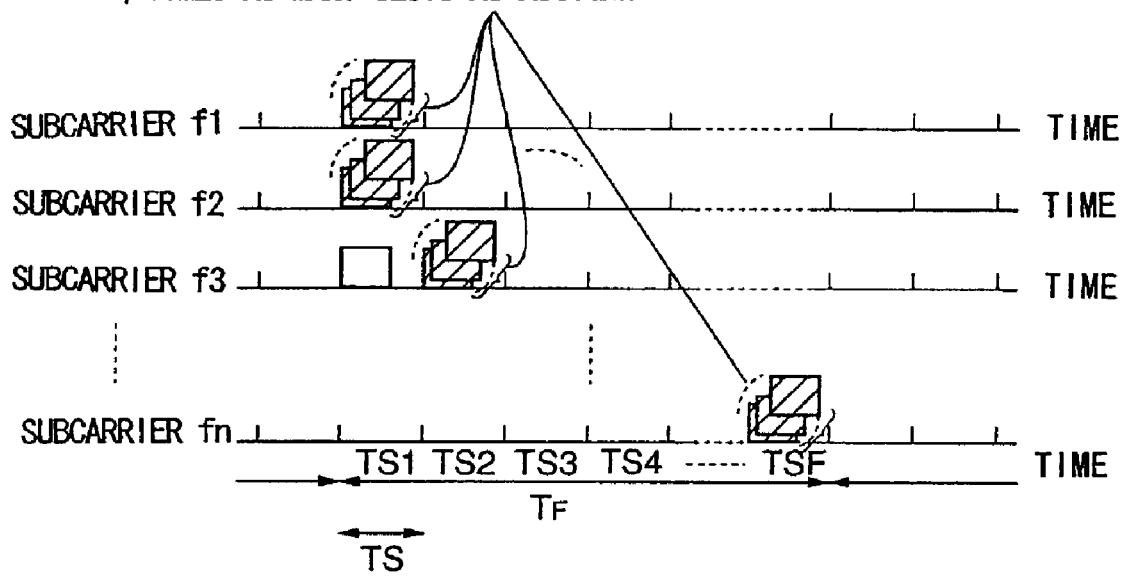
FIG. 41 is a drawing (No. 1) showing assignment of the time slot and a spreading code according to the transmission volume in the second embodiment.

In FIG. 41, the transmission speed of the mobile station 1 is further set at p×q times of the mobile station 2 by assigning p spreading codes to each time slot of the mobile station 1, in addition to as described in FIG. 39.

Figure 42:
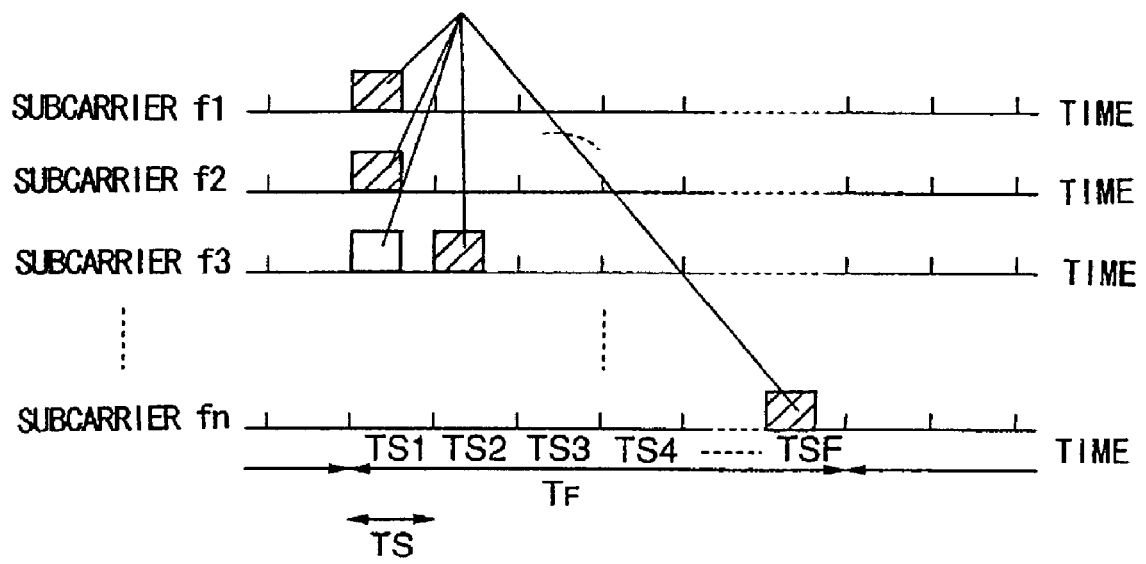
FIG. 42 is a drawing (No. 2) showing assignment of the time slot and a spreading code according to the transmission volume.

FIG. 42 shows an example wherein the transmission speed of the mobile station 1 is set at q×SF times of the mobile station 2 by assigning the mobile station 1 spreading codes that have a 1/SF spreading factor of the spreading factor of the spreading code of the mobile station 2, and further assigning q times as many time slots.

Figure 43:
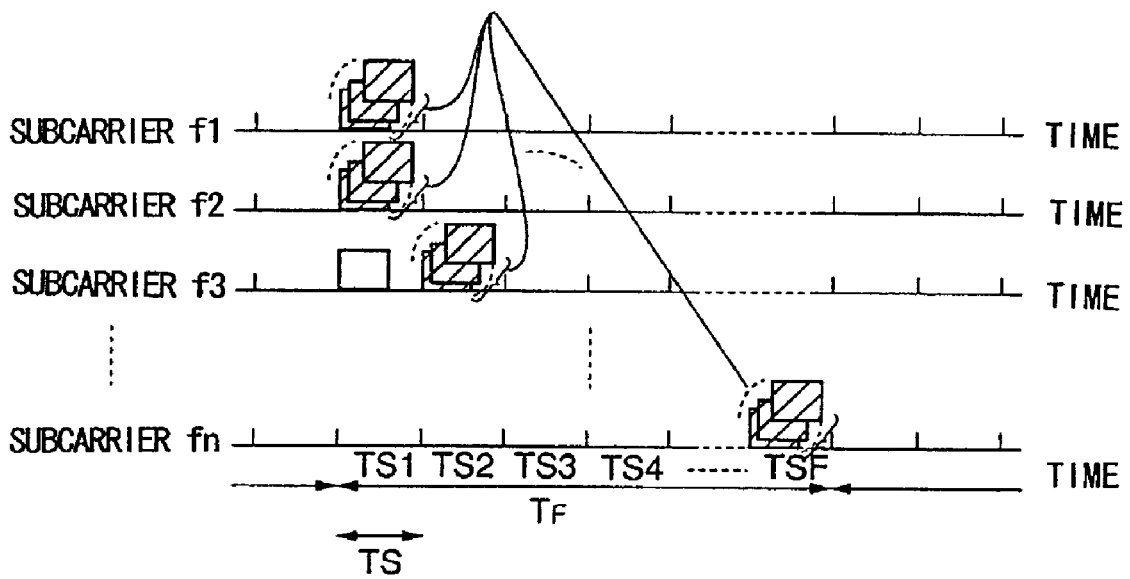
FIG. 43 is a drawing (No. 3) showing assignment of the time slot and a spreading code according to the transmission volume.

FIG. 43 shows an example wherein the transmission speed of the mobile station 1 is set at p×q×SF times of the mobile station 2 by assigning q times as many time slot as the mobile station 2 to the mobile station 1, and further assigning p pieces of spreading codes that have a 1/SF spreading factor of the spreading factor of the spreading code of the mobile station 2 in each time slot of the mobile station 1.

Next, the third embodiment of the present invention will be described.

The third embodiment is an embodiment relative to downlinks in a multi-carrier/DS-CDMA mobile communication system.

Figure 44:
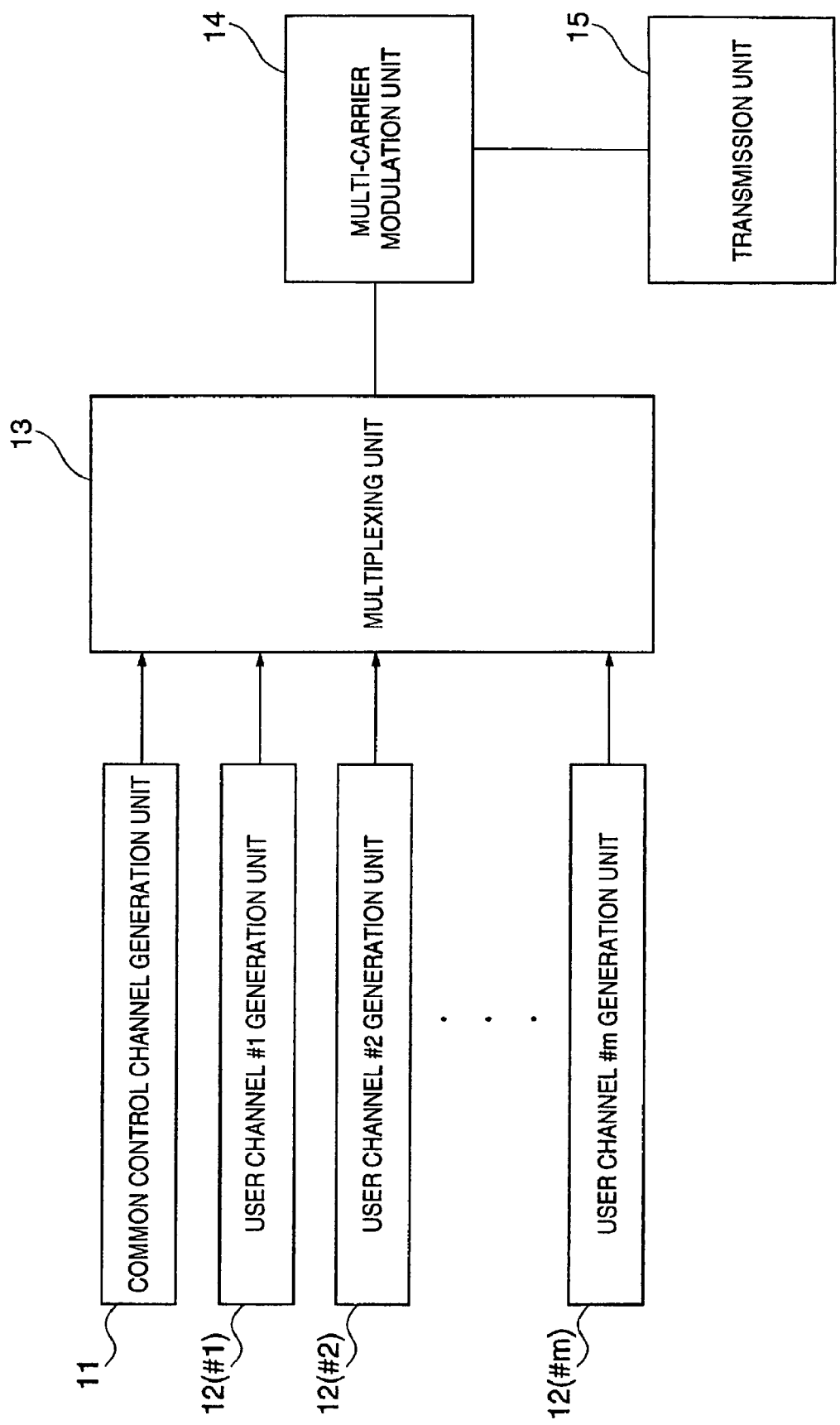
FIG. 44 is a block diagram showing a fundamental structure of a base station in the third embodiment of the present invention.

A base station transmitting information to each user with a downlink channel structure of the third embodiment of the present invention is configured as shown in FIG. 44, for example. The multi-carrier/DS-CDMA method is used for this base station as an access method.

In FIG. 44, this base station includes a common-control channel generation unit 11, user channel generation units 12 (#1) through 12 (#m), a multiplexing unit 13, a multi-carrier modulation unit 14, and a transmitting unit 15. The common-control channel generation unit 11 carries out bandwidth expansion of a control information symbol of each user according to a specific spreading code sequence, and generates a spreading code corresponding to the control information symbol. Each of the user channel generation units 12 (#1) through 12 (#m) carries out the bandwidth expansion of the information symbol which is to be transmitted to each user according to the spreading code sequence corresponding to each user, and generates the spreading code corresponding to the information symbol.

The multiplexing unit 13 synthesizes the spread codes corresponding to the information symbol from each user channel generation units 12 (#1)-12 (#m), then the synthesized signal and the spread codes corresponding to the control information symbol from the above-mentioned common-control channel generation unit 11 are multiplexed according to a predetermined algorithm. The algorithm of this multiplexing can be set up arbitrarily. For example, information can be multiplexed using time multiplexing wherein information is inserted periodically in every fixed period, frequency multiplexing wherein information is inserted into a certain specific subcarrier, or code multiplexing wherein multiplexing is performed by a certain specific code, or any combination thereof.

The multi-carrier modulation unit 14 modulates so that the multiplexed signal from the multiplexing unit 13 is distributed over a plurality (n pieces) of subcarrier (multi-carrier) components (the inverse discrete Fourier transform: IDFT). Then, the signal containing the two or more subcarrier components obtained in this multi-carrier modulation unit 14 is transmitted to the transmitting unit 15 one by one, and the above-mentioned signal is transmitted from this transmitting unit 15 to each user (mobile station). A frequency interval of the subcarriers used in the above-mentioned multi-carrier modulation unit 14 is set up at p times (p being a positive real number) of an updating frequency (chip rate) of each spreading code sequence used in the common-control channel generation unit 11 and each of the user channel generation units 12 (#1) through 12 (#m).

Figure 45:
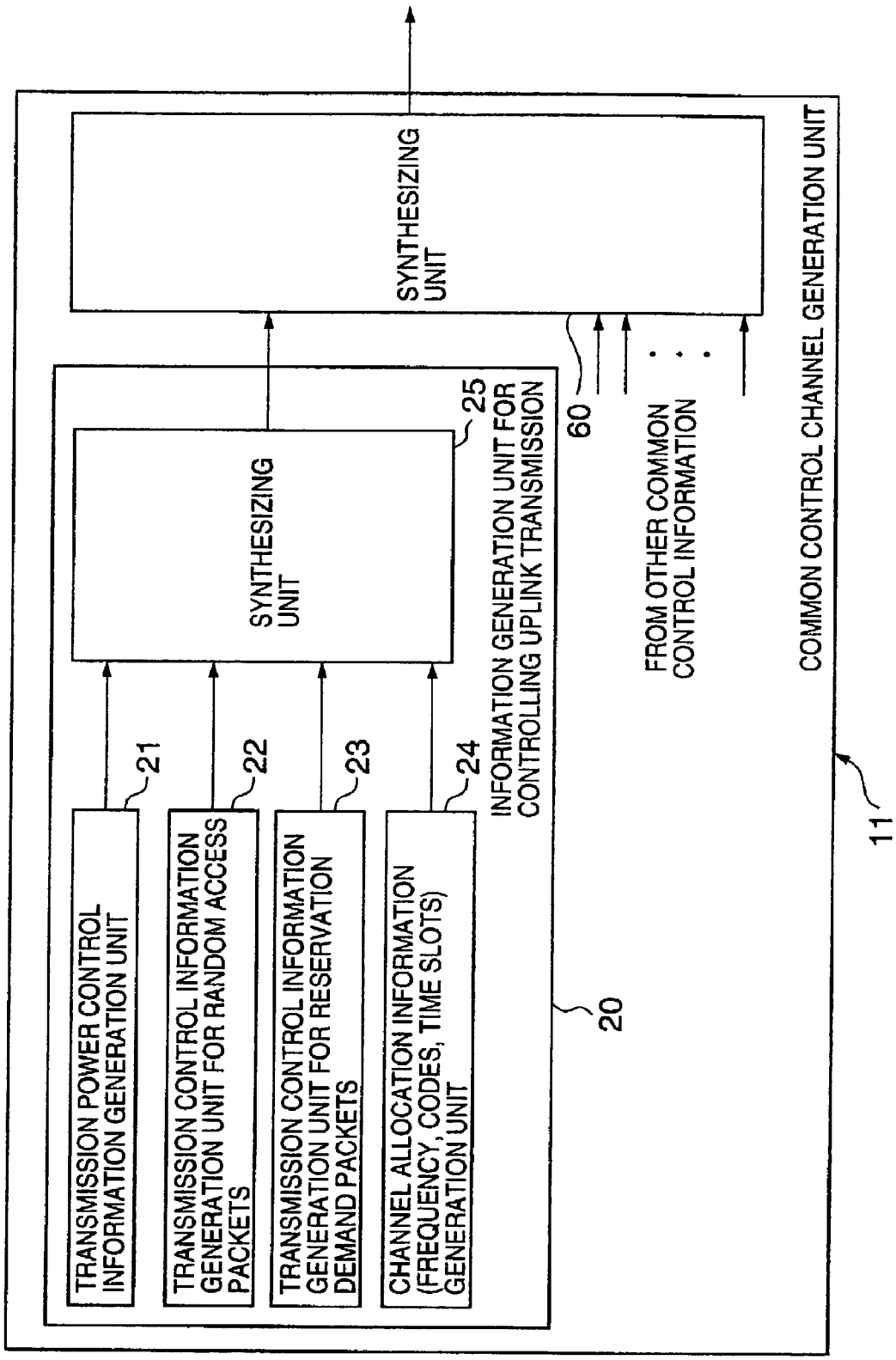
FIG. 45 is a block diagram showing the first structure example of a common-control channel generation unit in the third embodiment.

The above-mentioned common-control channel generation unit 11 is structured as shown in FIG. 45.

In FIG. 45, the common-control channel generation unit 11 includes an uplink transmission-control information generation unit 20 and a synthesizing unit 60. The uplink transmission-control information generation unit 20 generates information for controlling a transmission from each user (mobile station), and includes a transmission power control information generation unit 21, a first transmission-control information generation unit 22, a second transmission-control information generation unit 23, a channel allocation information generation unit 24, and a synthesizing unit 25.

The transmission power control information generation unit 21 generates a transmission power control command to perform the transmission power control of an uplink of the user. The first transmission-control information generation unit 22 generates control information, such as frequency, the number of codes, a time slot, and transmitting permission probability of random access that are to be assigned to a random access, based on traffic information and the like. The second transmission-control information generation unit 23 generates control information, such as frequency, the number of codes, a time slot, and transmitting permission probability of random access that are to be assigned to a reservation demand packet, based on the traffic information and the like. The channel allocation information generation unit 24 generates information, such as frequency, a code (a spreading factor is also included), and a time slot that are assigned to a user to whom a permission of transmission is to be issued in response to a reservation demand packet.

The transmission power control command from the above-mentioned transmission power control information generation unit 21 varies according to a state of a communication transmission channel between each user (mobile station), and serves as control information peculiar to each user. On the other hand, each control information from the first transmission-control information generation unit 22 and the second transmission-control information generation unit 23 and information about the channel allocation from the channel allocation information control unit 24 are pieces of information common to each user.

The synthesizing unit 25 synthesizes each information bit from the transmission power control information generation unit 21, the first transmission-control information generation unit 22, the second transmission-control information generation unit 23, and the channel allocation information generation unit 24 according to a predetermined algorithm. The synthesized signal acquired in this synthesizing unit 25 is outputted from the uplink transmission-control information generation unit 20 as uplink transmission control information. The control information from this uplink transmission-control information generation unit 20 and other common-control information are synthesized in the synthesizing unit 60, and the synthesized signal is outputted from the common-control channel generation unit 11 as information for controlling the transmission from each user.

Here, in the above, although a description about a bandwidth expansion process by a spreading code has been omitted, the bandwidth expansion process by the spreading code sequence of the above-mentioned synthesized signal is performed in the latter part of the above-mentioned synthesizing unit 60, and the above-mentioned control information is outputted from the common-control channel generation unit 30 concerned as a spreading code as mentioned above.

Figure 46:
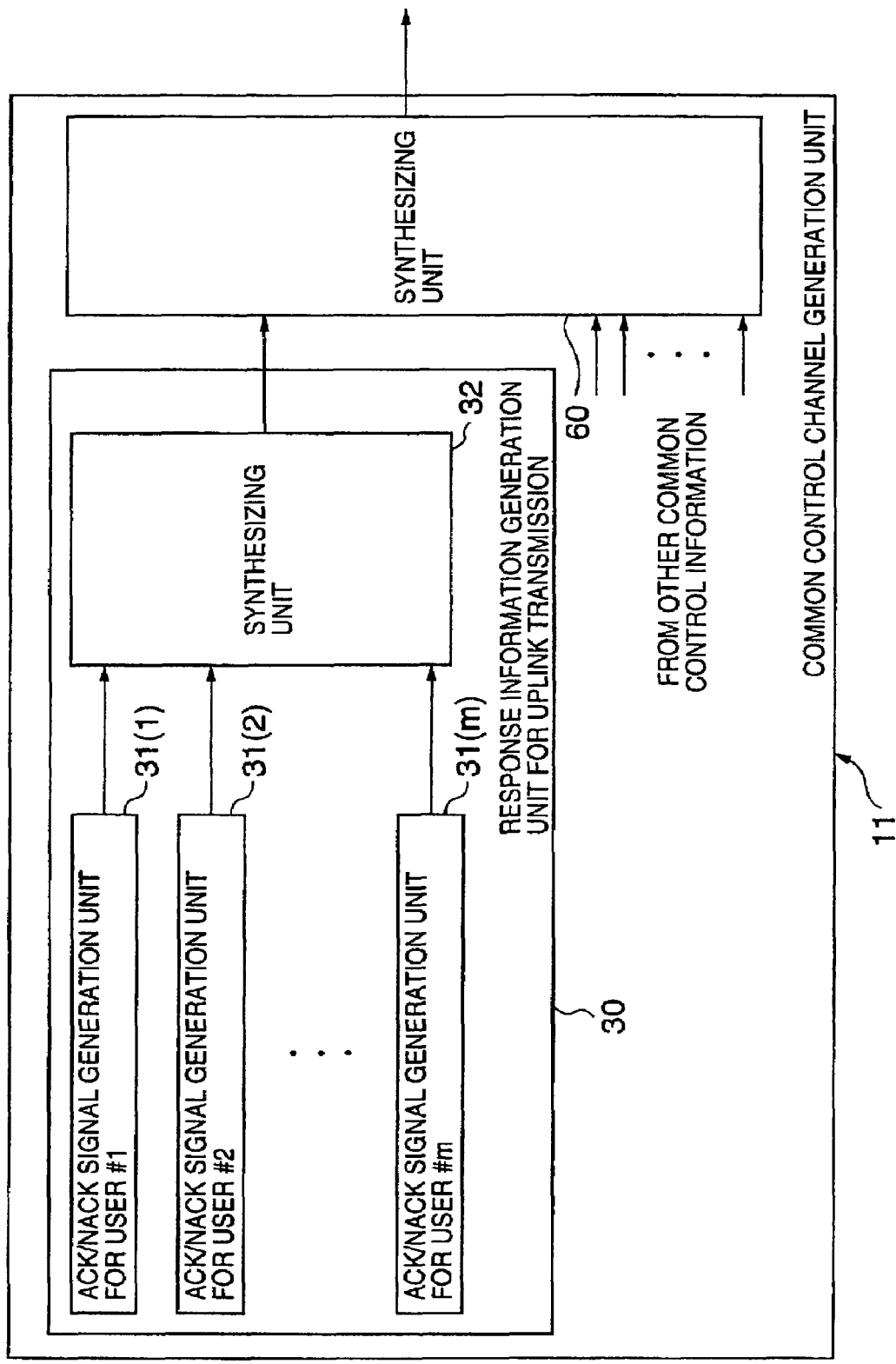
FIG. 46 is a block diagram showing the second structure example of the common-control channel generation unit.

Further, as shown in FIG. 46, the above-mentioned common channel generation unit 11 can be structured so that it includes a response information generation unit 30.

In FIG. 46, the response information generation unit 30 generates the response information corresponding to uplink transmissions of each user, and includes user response information generation units 31 (1) through 31 (m) corresponding to each user and a synthesizing unit 32. Each of the user response information generation units 31 (1) through 31 (m) generates response commands ACK and NACK to the uplink packet from a corresponding user. The synthesizing unit 32 synthesizes information bits relative to the response commands from each of the user response information generation units 31 (1) through 31 (m) according to a predetermined algorithm.

The synthesized signal from the synthesizing unit 32 is outputted from the response information generation unit 30 as response information for an uplink transmission. Here, the response information is synthesized with other common-control information (the control information from the uplink transmission-control information generation unit 20 shown in FIG. 45 may be included) in the synthesizing unit 60.

Figure 47:
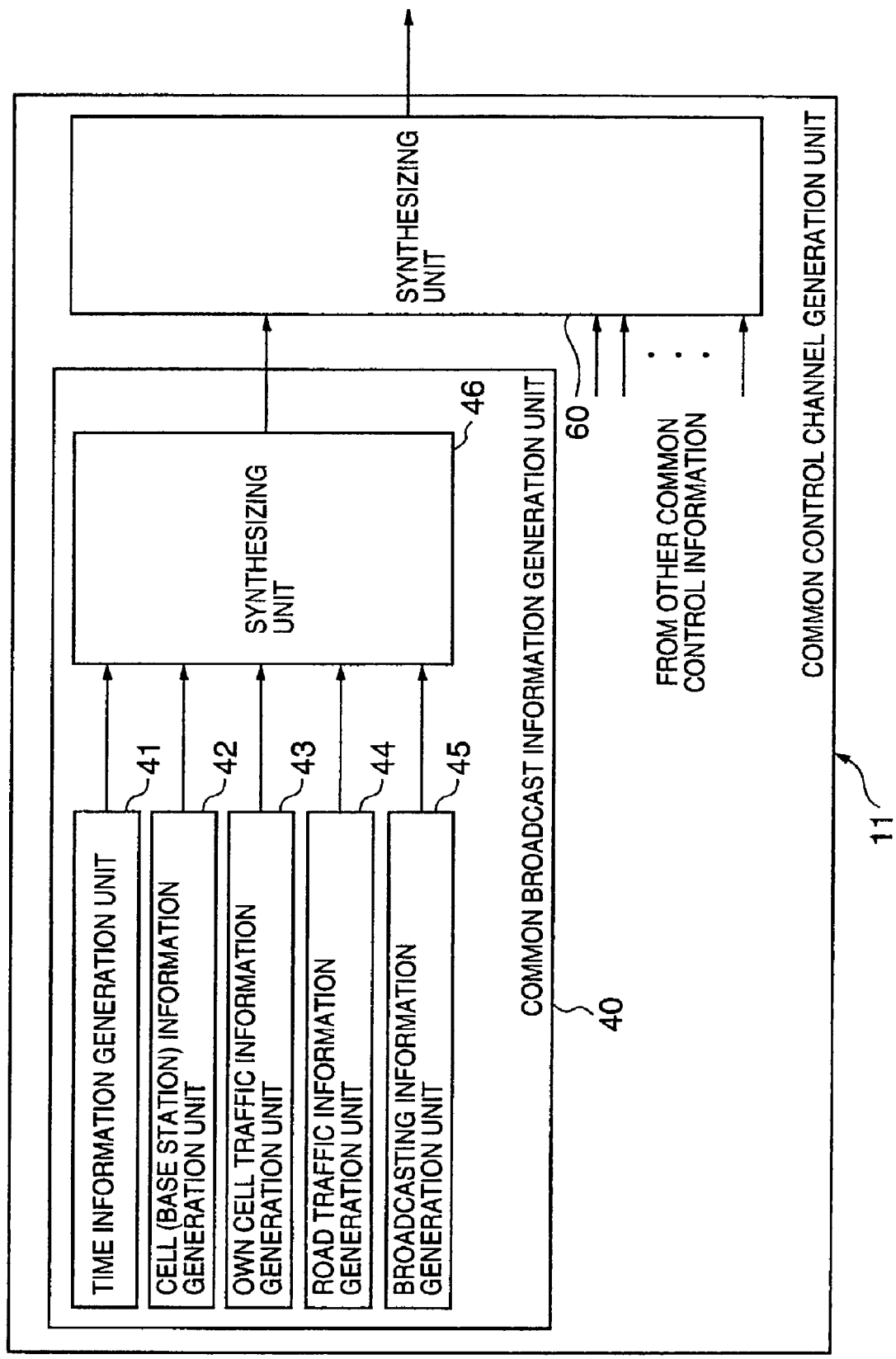
FIG. 47 is a block diagram showing the third structure example of the common-control channel generation unit.

Further, as shown in FIG. 47, the common channel generation unit 11 can be structured such that a common broadcast information generation unit 40 is included.

In FIG. 47, the common broadcast information generation unit 40 includes a time information generation unit 41, a cell information generation unit 42, a traffic information generation unit 43, a road traffic information generation unit 44, a broadcasting information generation unit 45, and a synthesizing unit 46. The time information generation unit 41 generates the time information indicating the absolute time. The cell information generation unit 42 generates information such as ID information which specifies the cell (base station) concerned, information showing the position of the base station concerned, and information about base stations near the base station concerned.

The traffic information generation unit 43 generates traffic information based on uplink and downlink communication situations in the cell of the base station. The road traffic information generation unit 44 generates information indicating road traffic situations of roads in the area of the cell (base station) concerned. The broadcasting information generation unit 45 generates other information, such as television information and circumference information.

Each of the information generation units 41, 42, 43, 44, and 45 above-mentioned does not need to synchronize in generating the information. The information may be generated with different periods according to the kind of the information.

Information bits generated at one or more of the information generation units 41, 42, 43, 44, and 45 mentioned above are synthesized by the synthesizing unit 46 according to a predetermined algorithm. The synthesized signal from this synthesizing unit 46 is outputted from the common broadcast information generation unit 40 as common broadcast information. Further, the common broadcast information is synthesized in the synthesizing unit 60 with other common-control information (which may include either or both of the response information from the response information generation unit 30 shown in FIG. 46 and the control information from the uplink transmission-control information generation unit 20 as shown in FIG. 45).

Figure 48:
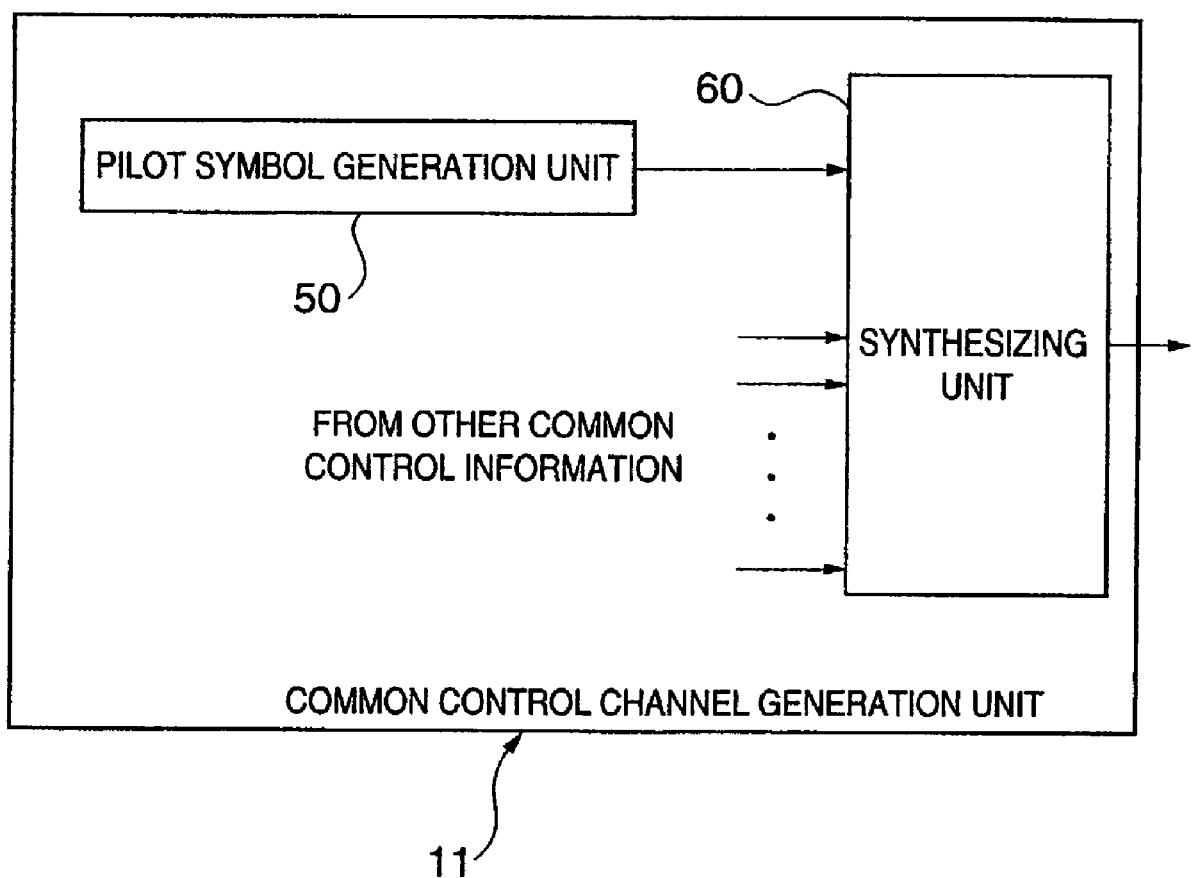
FIG. 48 is block diagram showing the fourth structure example of the common-control channel generation unit.

Further, the common channel generation unit 11 can also be configured as shown in FIG. 48.

In FIG. 48, this common-control channel generation unit 11 includes a pilot symbol generation unit 50 and a synthesizing unit 60. The pilot symbol generation unit 50 generates a pilot symbol known to all users in common for synchronization, channel estimation, and the like. The pilot symbol from this pilot symbol generation unit 50 is synthesized by the synthesizing unit 60 with other common-control information (which may include at least a kind of information of the control information from the uplink transmission-control information generation unit 20 shown in FIG. 45, the response information from the response information generation unit 30 shown in FIG. 46, and the common broadcast information from the common broadcast information generation unit 40 shown in FIG. 47).

Figure 49:
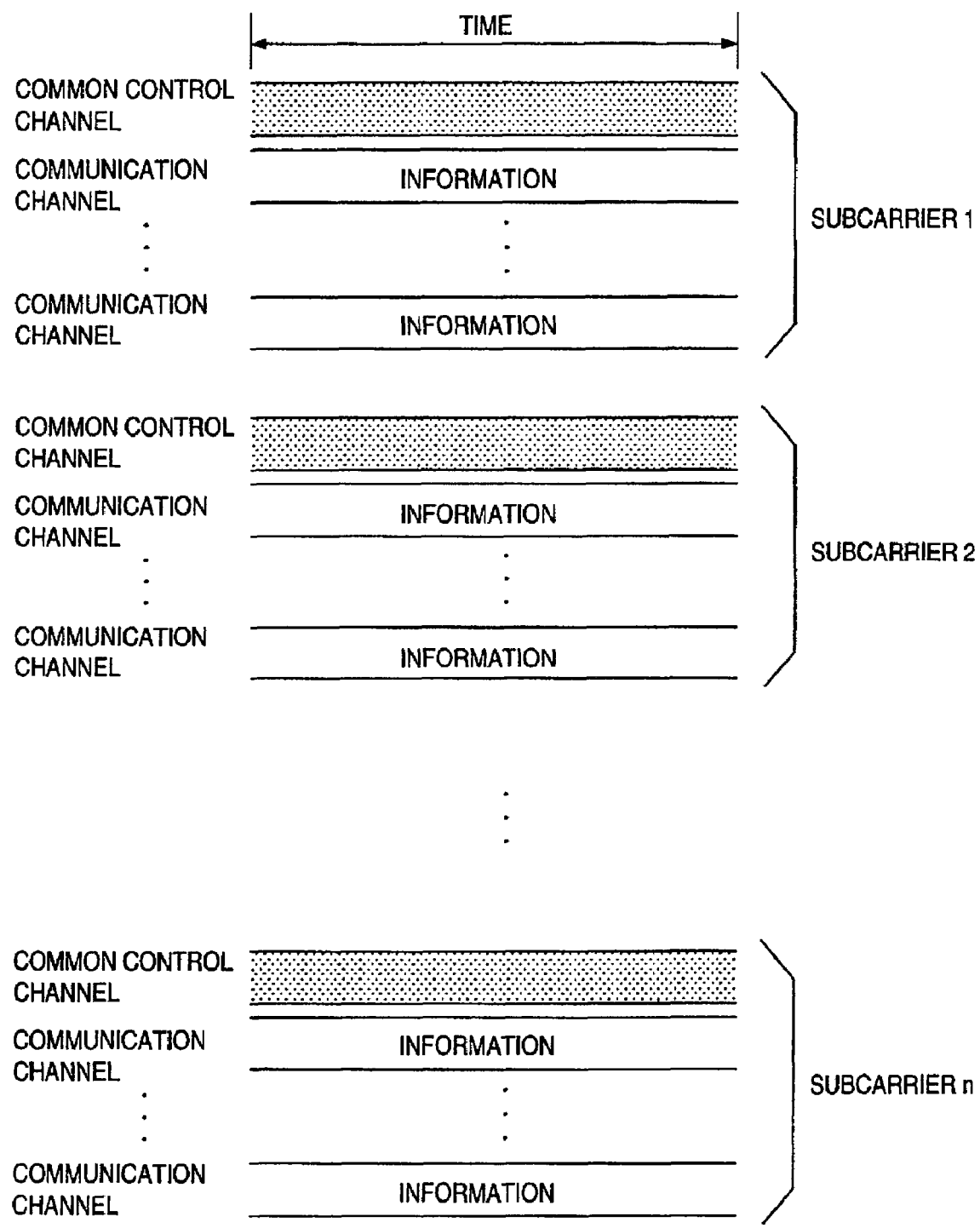
FIG. 49 is a drawing showing the first example a downlink channel structure in the third embodiment.

Structure of the downlink channel formed in the base station that is configured as mentioned above, and employs the multi-carrier/DS-CDMA method is shown in FIG. 49.

In the example shown in FIG. 49, in each time frame at a predetermined time, while a common-control channel is assigned to one code channel in each of n subcarriers 1 through n, communication channels are assigned to a plurality of code channels. Each channel (a common-control channel and communication channels) in each subcarrier is distinguished by the spreading code sequences (code) used in the common-control channel generation unit 11 and the user channel generation units 12 (#1) through 12 (#m) mentioned above.

The common-control channel includes the information generated in the common-control channel generation unit 11 that may include any one of or any combination of, for example, the pilot symbol (generated by the pilot symbol generation unit 50), the uplink transmission control information (generated by the uplink transmission-control information generation unit 20), the response information to the uplink transmission (generated by the response information generation unit 30), the common broadcast information (the common broadcast information generation unit 40).

Information (transmission data) which should be transmitted to a user is assigned to each communication channel such that the information generated in each of the user channel generation units 12 (#1)-12 (#m) is included in the corresponding communication channel.

In addition, channels of one or a plurality of the subcarriers can be assigned to each user.

In the downlink channel structure mentioned above, a common-control channel of each subcarrier can be arbitrarily set up as to what information is included, and as to whether information is included in the common channel of all the subcarriers.

In the following, another example of the downlink channel structure that is similar to the example shown in FIG. 49 is described, where a common-control channel is assigned to one code channel in each time frame in each of the n subcarriers 1 through n, and communication channels are assigned to a plurality of code channels.

Figure 50:
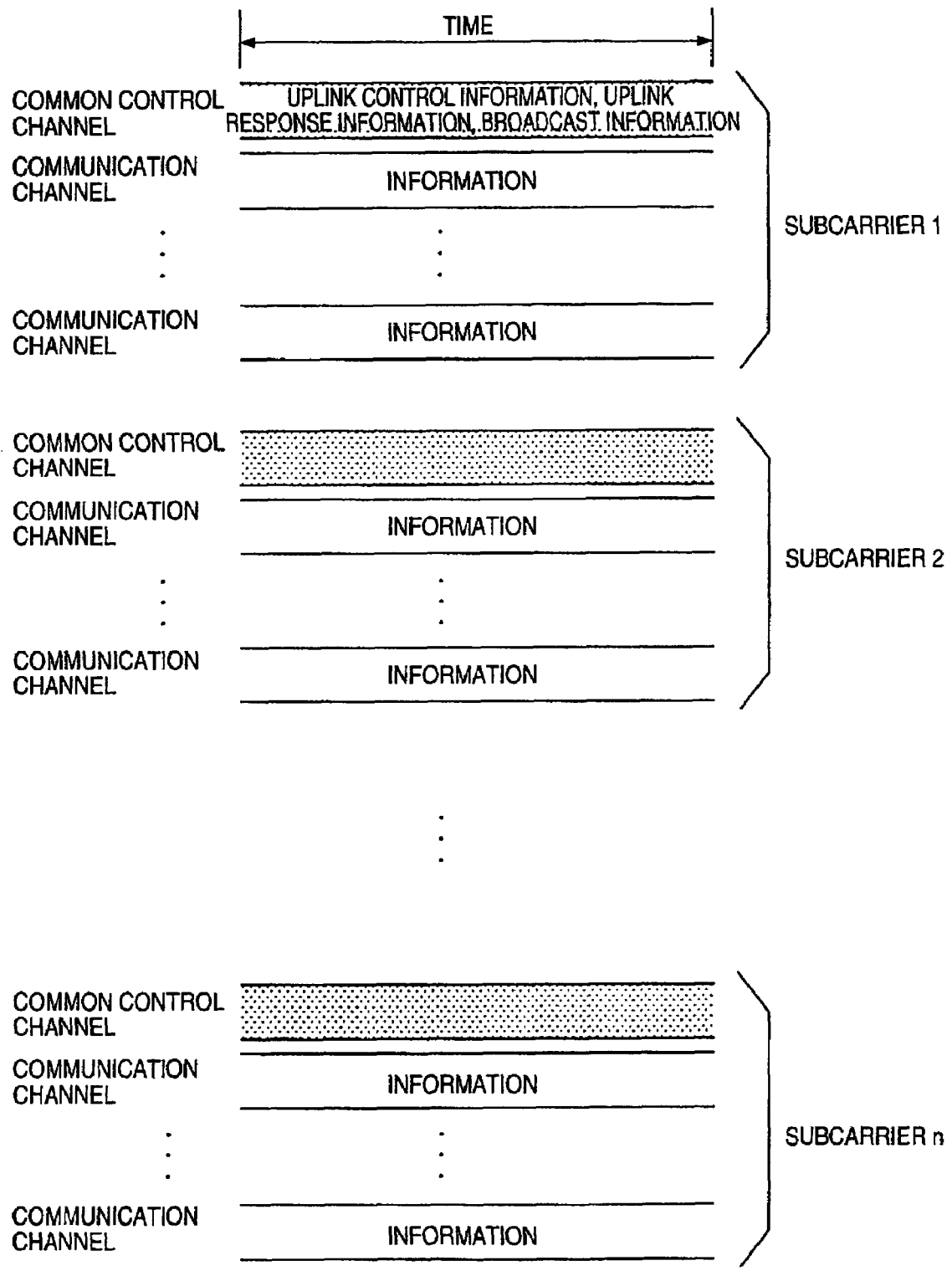
FIG. 50 is a drawing showing the second example of the downlink channel structure.

In the example shown in FIG. 50, information other than the pilot symbol (uplink-control information, uplink response broadcast information) is included in the common-control channel of a specific subcarrier (for example, the subcarrier 1). The pilot symbol may be included in the common-control channel of all the subcarriers, or in the common-control channel of discontinuous subcarriers.

Figure 51:
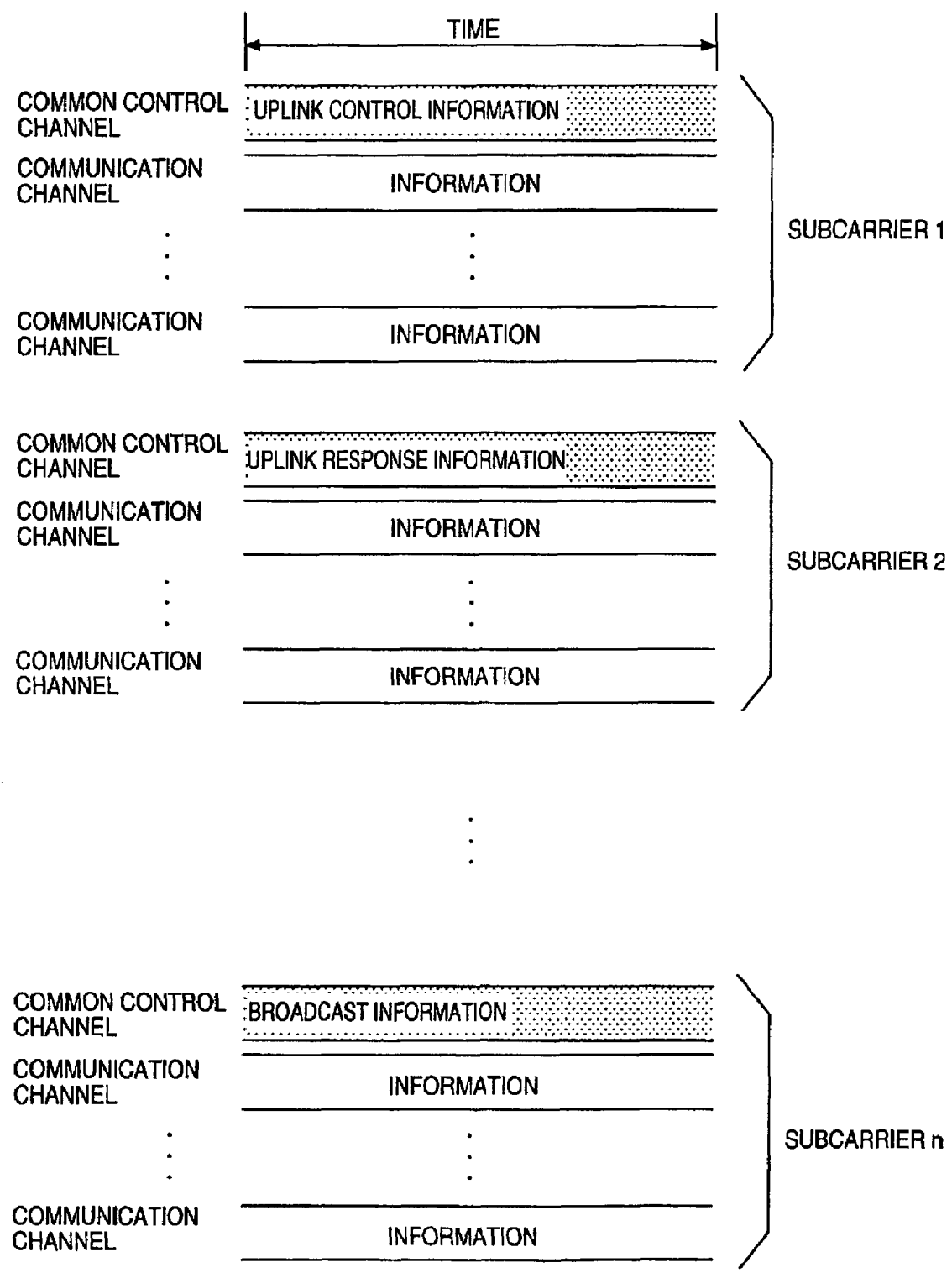
FIG. 51 is a drawing showing the third example of the downlink channel structure.

In an example shown in FIG. 51, different subcarriers are assigned to common-control channels according to the kind of information to be included. For example, the uplink-control information is included in the common-control channel in the subcarrier 1, the uplink response information is included in the common-control channel in the subcarrier 2, and the broadcast information is included in the common-control channel in the subcarrier n. Like the example shown in FIG. 50, this example also allows the pilot symbol to be included in the common-control channel of all the subcarriers, or in the common-control channel of each discontinuous subcarrier.

Figure 52:
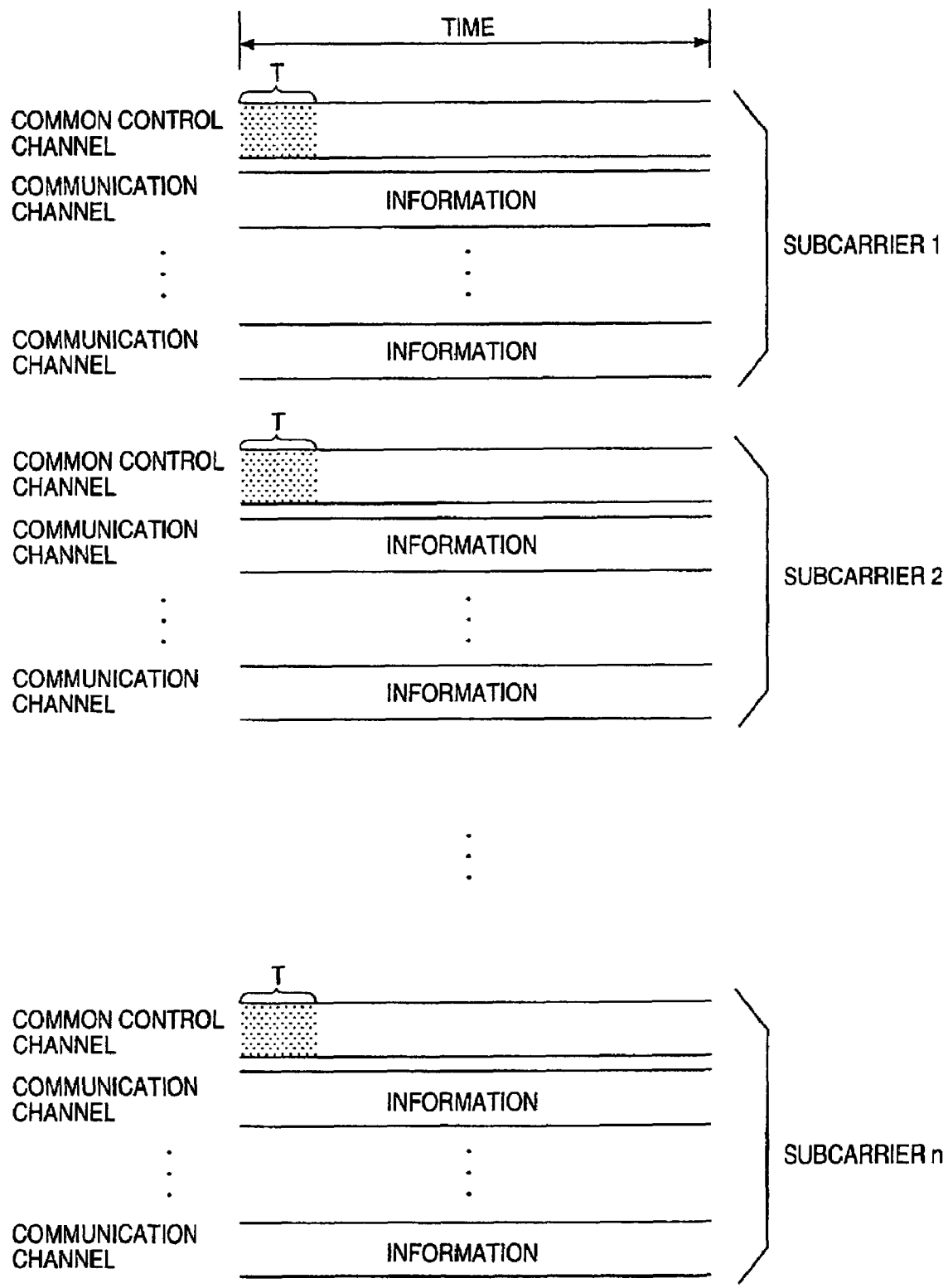
FIG. 52 is a drawing showing the fourth example of the downlink channel structure.

In an example shown in FIG. 52, any of or any combination of the above-mentioned pilot symbol, the uplink-control information, the uplink response information and the broadcast information is included in the common-control channel of each subcarrier, not in each whole time frame but in a predetermined time zone T. Consequently, the information included in the common-control channel in each subcarrier is transmitted for every predetermined period to the same timing.

Figure 53:
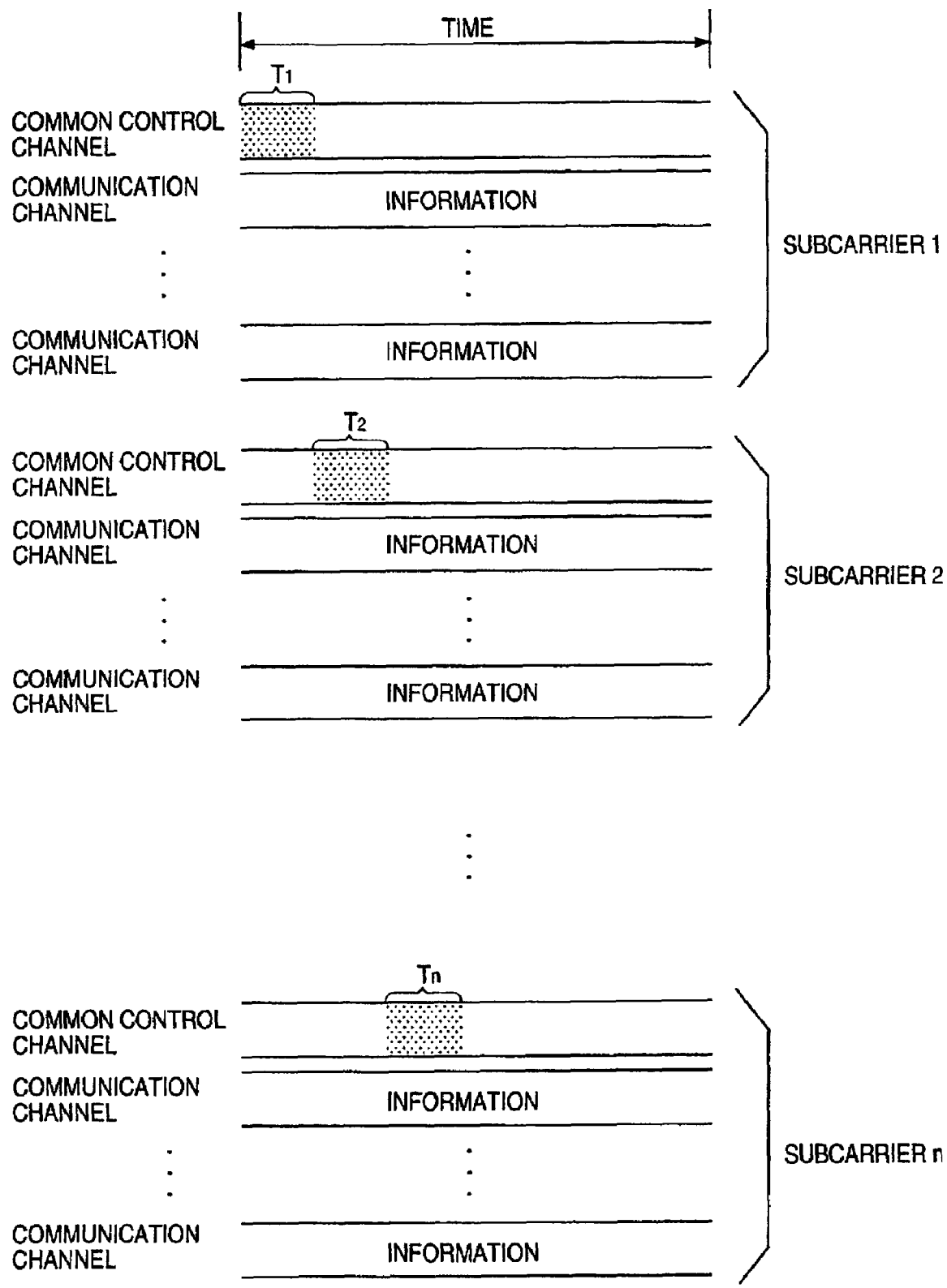
FIG. 53 is a drawing showing the fifth example of the downlink channel structure.

In the example shown in FIG. 53, above-mentioned information is included in the common-control channel in each subcarrier, not in each whole time frame but in some time zones, like the example shown in FIG. 52. In this example, however, the time zones T1, T2 through Tn differ for every subcarrier. Consequently, the information included in the common-control channel in each subcarrier is transmitted for every predetermined period at different timings.

According to the downlink channel structure in the multi-carrier/DS-CDMA mobile communication system, as mentioned above, since various information can be transmitted to each user by including the information in the common-control channel that can be commonly used by all users, efficient transmission is attained compared with the case where the information is transmitted by an individual channel peculiar to a user.

If information (for example, the transmission power control information, the response information to each user, the channel allocation information, and the like) peculiar to each user is further included in the common-control channel, the peculiar information to a plurality of users can be transmitted now by one common-control channel, and efficient information transmission will be attained.

In the third embodiment, in each example mentioned above, although the common-control channel was assigned to one code channel of all subcarriers, the present invention is not limited to this. It is possible to assign a control channel to one, two or more code channels of two or more subcarriers, partly or wholly.

According to the first embodiment of the present invention, efficient multiplexing of a reservation demand packet and a data packet is realized by using a time slot and a spreading code in a single carrier/DS-CDMA uplink packet transmission method. Further by the first embodiment, changes in traffic amount can be flexibly met also by controlling the number of the spreading codes available to a reservation demand packet and the reservation demand packet transmission admission probability.

Moreover, the packet transmission method in the multi-carrier/DS-CDMA of the second embodiment of the present invention realizes time-slot reservation type packet transmission, random access type packet transmission, and packet transmission of a variable transmission speed, enabling efficient transmission of signals of various transmission volumes.

Further, according to the third embodiment of the present invention, any of information peculiar to each user and information common to all users can be included and transmitted by inserting the information into the common-control channel in each above-mentioned subcarrier in a multi-carrier/DS-CDMA mobile communication system when information is transmitted from a base station to each user (mobile station). Therefore, efficient transmission of control information to each user is now available even when there is an asymmetry in transmission information volumes between the uplink and the downlink in a multi-carrier/DS-CDMA mobile communication system.

What is claimed is:

1. A single carrier/DS-CDMA packet transmission method that expands a bandwidth of information symbols by a sequence of spreading codes, and transmits packets by use of spreading signals having an expanded bandwidth, comprising:

assigning a predetermined fixed time slot in a data frame for dedicated use for transmission of a reservation demand packet, the reservation demand packet being a request for an allocation of a spreading code and/or a time slot;

assigning, in said data frame, slots other than the predetermined fixed time slot for a transmission of data packets;

code-multiplexing said data frame with one of the spreading codes so as to code-multiplex information in the predetermined fixed time slot and information in the slots other than the predetermined fixed time slot; and transmitting the code-multiplexed data frame containing the reservation demand packet and data packets.

2. The packet transmission method as claimed in claim 1, wherein reservation demand packet transmission admission probability determined in advance is lowered when a channel occupancy rate of the data packets exceeds a predetermined value.

3. A mobile-radio packet transmission method using the packet transmission method of claim 2, wherein a base station measures the channel occupancy rate of the data packet, and determines the reservation demand packet transmission admission probability and a number indicative of how many spreading codes are available for the reservation demand packets.

4. The mobile-radio packet transmission method of claim 3, wherein the base station inserts the number of spreading codes available for the reservation demand packets and the reservation demand packet transmission admission probability into an information channel of a downlink by time-sharing.

5. A single carrier/DS-CDMA packet transmission method that expands a bandwidth of information symbols by a sequence of spreading codes, and transmits packets by use of spreading signals having an expanded bandwidth, comprising:
assigning one of k (0<k<N) spreading codes among N total spreading codes as a fixed code for dedicated use for reservation demand packet transmission, the reservation demand packet being a request for an allocation of a spreading code and/or a time slot,
assigning another one of the k (0<k<N) spreading codes as a fixed code for dedicated use for data packet transmission, and
transmitting the reservation demand packet encoded with the one of the k (0<k<N) spreading codes and the data packet encoded with the another one of the k (0<k<N) spreading codes.

6. The packet transmission method as claimed in claim 5, wherein the spreading codes assigned to the reservation demand packet transmission are decreased in number, and the spreading codes assigned to data-packet transmission are increased in number when a channel occupancy rate of the data packets exceeds a predetermined value.

7. The packet transmission method as claimed in claim 5, wherein the reservation demand packet transmission admission probability determined in advance is lowered first when a channel occupancy rate of the data packets exceeds a predetermined value, and, subsequently, the spreading codes assigned to the reservation demand packet transmission are decreased in number while the spreading codes assigned to data-packet transmission are increased in number when the channel occupancy rate of the data packets still exceeds the predetermined value even after the reservation demand packet transmission admission probability is lowered.

8. The packet transmission method as claimed in claim 5, wherein the spreading codes assigned to the reservation demand packet transmission are decreased in number first when a channel occupancy rate of the data packets exceeds a predetermined value, and, subsequently, the reservation demand packet transmission admission probability determined in advance is lowered if the channel occupancy rate of the data packets still exceeds the predetermined value even after the spreading codes assigned to the reservation demand packet transmission were decreased in number.

9. A single carrier/DS-CDMA packet transmission system, comprising:
a base station and a mobile station, wherein the base station is configured
to assign a predetermined fixed time slot in a data frame for dedicated use for transmission of a reservation demand packet, the reservation demand packet being a request for an allocation of a spreading code and/or a time slot, and
to assign, in said data frame, slots other than the predetermined fixed time slot for a transmission of data packets; and
the mobile station is configured
to code-multiplex information in the predetermined fixed time slot and information in the slots other than the predetermined fixed time slot with one of the spreading codes and
to transmit the data frame containing the reservation demand packet and data packets.

10. A single carrier/DS-CDMA packet transmission system, comprising:
a base station and a mobile station, wherein the base station is configured
to assign one of k (0<k<N) spreading codes among all N total spreading codes as a fixed code for dedicated use for reservation demand packet transmission, the reservation demand packet being a request for an allocation of a spreading code and/or a time slot,
to assign another one of the k (0<k<N) spreading codes as a fixed code for dedicated use for data packet transmission, and
to notify the mobile station of an assigned reservation demand packet channel; and
the mobile station is configured to transmit a reservation demand packet via the one of k (0<k<N) spreading codes and data packets via the another one of the k (0<k<N) spreading codes.

11. A single carrier/DS-CDMA packet transmission system comprising a base station and a plurality of mobile stations, wherein the base station comprises:
a measurement unit configured to measure a channel occupancy rate of a data packet; and
a unit configured to determine a reservation demand packet transmission admission probability and a number indicative of how many spreading codes are available for reservation demand packets for notification to the mobile station,
wherein the base station determines the number of spreading codes available for reservation demand packets and the reservation demand packet transmission admission probability based on the measurement by the measurement unit, and notifies the mobile station of the determined number of spreading codes and the determined admission probability through a downlink broadcast channel by time-multiplexing.

* * * * *